US010965785B2

(12) United States Patent
King

(10) Patent No.: US 10,965,785 B2
(45) Date of Patent: Mar. 30, 2021

(54) LANGUAGE-AGNOSTIC GRAPH-BASED COMBINATORIAL APPLICATION FRAMEWORK

(71) Applicant: Exaptive, Inc., Oklahoma City, OK (US)

(72) Inventor: David King, Oklahoma City, OK (US)

(73) Assignee: Exaptive, Inc., Oklahoma City, OK (US)

( * ) Notice: Subject to any disclaimer, the term of this patent is extended or adjusted under 35 U.S.C. 154(b) by 0 days.

(21) Appl. No.: 15/047,411

(22) Filed: Feb. 18, 2016

(65) Prior Publication Data
US 2016/0248888 A1   Aug. 25, 2016

Related U.S. Application Data

(62) Division of application No. 14/029,587, filed on Sep. 17, 2013, now Pat. No. 10,530,894.

(Continued)

(51) Int. Cl.
*G06F 9/44* (2018.01)
*H04L 29/06* (2006.01)
(Continued)

(52) U.S. Cl.
CPC ............ *H04L 67/42* (2013.01); *G06F 8/30* (2013.01); *G06F 16/212* (2019.01);
(Continued)

(58) Field of Classification Search
CPC ......... H04L 67/02; H04L 67/34; H04L 67/42; G06F 16/206; G06F 16/212;
(Continued)

(56) References Cited

U.S. PATENT DOCUMENTS 5,187,787 A   2/1993  Skeen et al.
5,666,553 A   9/1997  Crozier
(Continued)

OTHER PUBLICATIONS

Quan, How to Make a Semantic Web Browser, WWW 2004, May 17-22, 2004, New York, New York, USA, ACM 1-58113-844-X/04/0005.

(Continued)

*Primary Examiner* — Lewis A Bullock, Jr.
*Assistant Examiner* — Tina Huynh
(74) *Attorney, Agent, or Firm* — Dunlap Codding, P.C.

(57) ABSTRACT

A computer-implemented schema-independent method of modeling data from diverse sources is described. A server transmits to a client computer a blueprint for visualizing and interacting with data, wherein the blueprint defines an application, for visualizing and interacting with data. The application may operate on the client computer within a web browser and may include program code or scripts that operate within the web browser and transmit data and commands to and from the server. In response to receiving a data fetch message from the application, the server receives data from a selected one of a plurality of domains. The server then transforms the received data into a semantic data format. The transformed data is then stored by the server as a first data set. The first data set can then be transmitted to the client computer for further processing and visualization by the application using the blueprint.

6 Claims, 42 Drawing Sheets

Related U.S. Application Data

(60) Provisional application No. 61/816,107, filed on Apr. 25, 2013, provisional application No. 61/701,941, filed on Sep. 17, 2012.

(51) Int. Cl.

| | | |
|---|---|---|
| *G06F 16/26* | (2019.01) | |
| *G06F 16/21* | (2019.01) | |
| *G06F 16/25* | (2019.01) | |
| *H04L 29/08* | (2006.01) | |
| *G06F 16/958* | (2019.01) | |
| *G06F 8/30* | (2018.01) | |
| *G06T 11/20* | (2006.01) | |

(52) U.S. Cl.
CPC ............ *G06F 16/258* (2019.01); *G06F 16/26* (2019.01); *G06F 16/958* (2019.01); *G06T 11/206* (2013.01); *H04L 67/02* (2013.01); *H04L 67/34* (2013.01)

(58) Field of Classification Search
CPC ........ G06F 16/258; G06F 16/26; G06F 16/30; G06F 16/958; G06F 8/30; G06T 11/206
See application file for complete search history.

(56) References Cited

U.S. PATENT DOCUMENTS

| | | | |
|---|---|---|---|
| 5,754,849 A | 5/1998 | Dyer | |
| 5,966,531 A | 10/1999 | Skeen et al. | |
| 5,987,480 A | 11/1999 | Donohue | |
| 6,324,568 B1 | 11/2001 | Diec | |
| 6,584,464 B1 | 6/2003 | Warthen | |
| 6,711,579 B2 | 3/2004 | Balakrishnan | |
| 6,948,117 B2 | 9/2005 | Van Eaton | |
| 6,964,034 B1 | 11/2005 | Snow | |
| 6,988,109 B2 | 1/2006 | Stanley | |
| 7,058,671 B2 | 6/2006 | Calvo | |
| 9,959,415 B1* | 5/2018 | Rodriguez | G06F 21/606 |
| 2002/0184401 A1* | 12/2002 | Kadel, Jr. | G06F 8/76 719/315 |
| 2004/0015783 A1* | 1/2004 | Lennon | G06F 17/30389 715/235 |
| 2004/0088688 A1* | 5/2004 | Hejlsberg | G06F 8/51 717/143 |
| 2004/0128296 A1* | 7/2004 | Krishnamurthy | G06F 17/30595 |
| 2004/0199905 A1* | 10/2004 | Fagin | G06F 17/2247 717/136 |
| 2004/0216030 A1* | 10/2004 | Hellman | G06F 17/30557 715/239 |
| 2005/0071850 A1 | 3/2005 | Ittel et al. | |
| 2005/0149552 A1* | 7/2005 | Chan | G06F 16/211 |
| 2005/0155027 A1 | 7/2005 | Wei | |
| 2005/0160104 A1* | 7/2005 | Meera | G06F 8/20 |
| 2005/0216421 A1 | 9/2005 | Barry et al. | |
| 2006/0031187 A1 | 2/2006 | Pyrce | |
| 2006/0206863 A1 | 9/2006 | Shenfield et al. | |
| 2006/0218563 A1 | 9/2006 | Grinstein | |
| 2007/0198564 A1* | 8/2007 | Blackstone | G06F 19/324 |
| 2008/0052378 A1* | 2/2008 | Matsuyama | H04L 41/22 709/218 |
| 2008/0134139 A1* | 6/2008 | Krouse | G06F 8/10 717/105 |
| 2008/0208820 A1* | 8/2008 | Usey | G06F 16/313 |
| 2010/0115023 A1 | 5/2010 | Peled | |
| 2010/0162152 A1 | 6/2010 | Allyn | |
| 2010/0198787 A1* | 8/2010 | Robertson | G06F 21/316 707/634 |
| 2010/0321407 A1* | 12/2010 | Mital | G06T 11/206 345/643 |
| 2010/0325196 A1 | 12/2010 | Beckman et al. | |
| 2012/0101975 A1* | 4/2012 | Khosravy | G06Q 30/02 706/55 |
| 2012/0323940 A1 | 12/2012 | Davis et al. | |

OTHER PUBLICATIONS

Gee, Universal Visualization Platform, Visualization and Data Analysis 2005, Electronic Imaging, SPIE vol. 5669, Feb. 3, 2011, p. 274-283.

United States Patent and Trademark Office, Office Action Summary dated Jun. 1, 2016.

USPTO Office Action regarding U.S. Appl. No. 14/029,587 dated Apr. 20, 2017, 15 pages.

USPTO Office Action regarding U.S. Appl. No. 15/047,351 dated May 4, 2017, 12 pages.

USPTO Office Action regarding U.S. Appl. No. 15/047,351 dated Feb. 14, 2019, 12 pages.

USPTO Office Action regarding U.S. Appl. No. 14/029,587 dated Feb. 25, 2019, 20 pages.

USPTO Office Action regarding U.S. Appl. No. 15/047,351 dated Oct. 31, 2019, 12 pages.

* cited by examiner

```
<!DOCTYPE HTML>
<html>
<head>
<title>CAF</title>
<script src=" client/exaptive.js"></script>        ─530
<script>
    exaptive.init("123456", "server");
</script>
</head>
<body>
<div  data-xap="CAFApplication1"  style="width:480px;"></div>    ─515
</body>

<script>
exaptive.component("Label")
    .div()
    .init(function()
    {
        this.labelID = this.id + "Label";
        this.labelSelector = "#"+this.labelID;
        $(this.div).height("30");
        $(this.div).css("background-color","#DDD");
        var html ='<span id="' + this.labelID + '" style="margin-right:5px;"> ' + " " + '</span>';
        $(this.div).append(html);
    })
    .inEvent("Text",function(data)
    {
        $(this.labelselector).empty();
        $(this.labelSelector).append(data.asString());
    });

exaptive.defineXap("CAFApplication1")                                                                                                                  ─900
    .div()
    .addComponent("Label1","Label")
    .addComponent("TextBox1","exaptive-2.0/xap/Basic HTMLComponents, js#TextBox",{Caption:"Enter some text to have it appear in the label above."})
    .addConnection("TextBox1","Value", "Label1","Text")
;
exaptive.createXap("CAFAppliction1")        ─910
    .run();
</script>
</html>
```

Big Huge Thesaurus ← 2400

Thesaurus, Blog post ideas, Story plot/loglines

[car] [Lookup]

noun auto  automobile  machine  motorcar  railcar  railway car  railroad car  gondola  elevator car
cable car  automotive vehicle  compartment  motor vehicle  wheeled vehicle sounds kind of like caesar  caesarea  caesura  cager  cairo  caraway  care  career  carew  carrece  carrier
carry  carryaway  carva  casara  cashier  cassiter  cassiri  cassowary  causerie  cer  cere
cero  chair  char  chara  chari  charr  chary  chaser  chaucer  checker  checkrow  cheer
cheerer  cheerio  cheery  chequer  cheery  chewer  chickeree  chicory  chigger  chirr
chiwere  choir  chokecherry  choker  chooser  chore  chorea  chukker  churr  cicer  cicero
cigar  cira  cirio  co-occur  coaxer  cockcrow  cocker  cocksure  cohere  coir  cooccur
cooker  cookery  cookie jar  cookware  cookyjar  cora  core  corer  corrie  cosher  cougar
courier  cower  cowrie  cowry  cr  craw  cree  crew  crier  cro  crore  crow  cry  cur
curare  cure  curia  curie  curio  currier  curry  czar rhymes with adar  ajar  ar  are  bar  bazaar  bazar  bizarre  char  cigar  czar  dakar  dinar  disbar
far  gar  guitar  jaffar  jar  mar  myanmar  par  parr  gatar  r  renoir  scar  spar  star
starr  superstar  tar  tsar About this site | API | Privacy | Sign in Copyright © 2013 John Watson, LLC. All Right Reserved.

FIG. 24

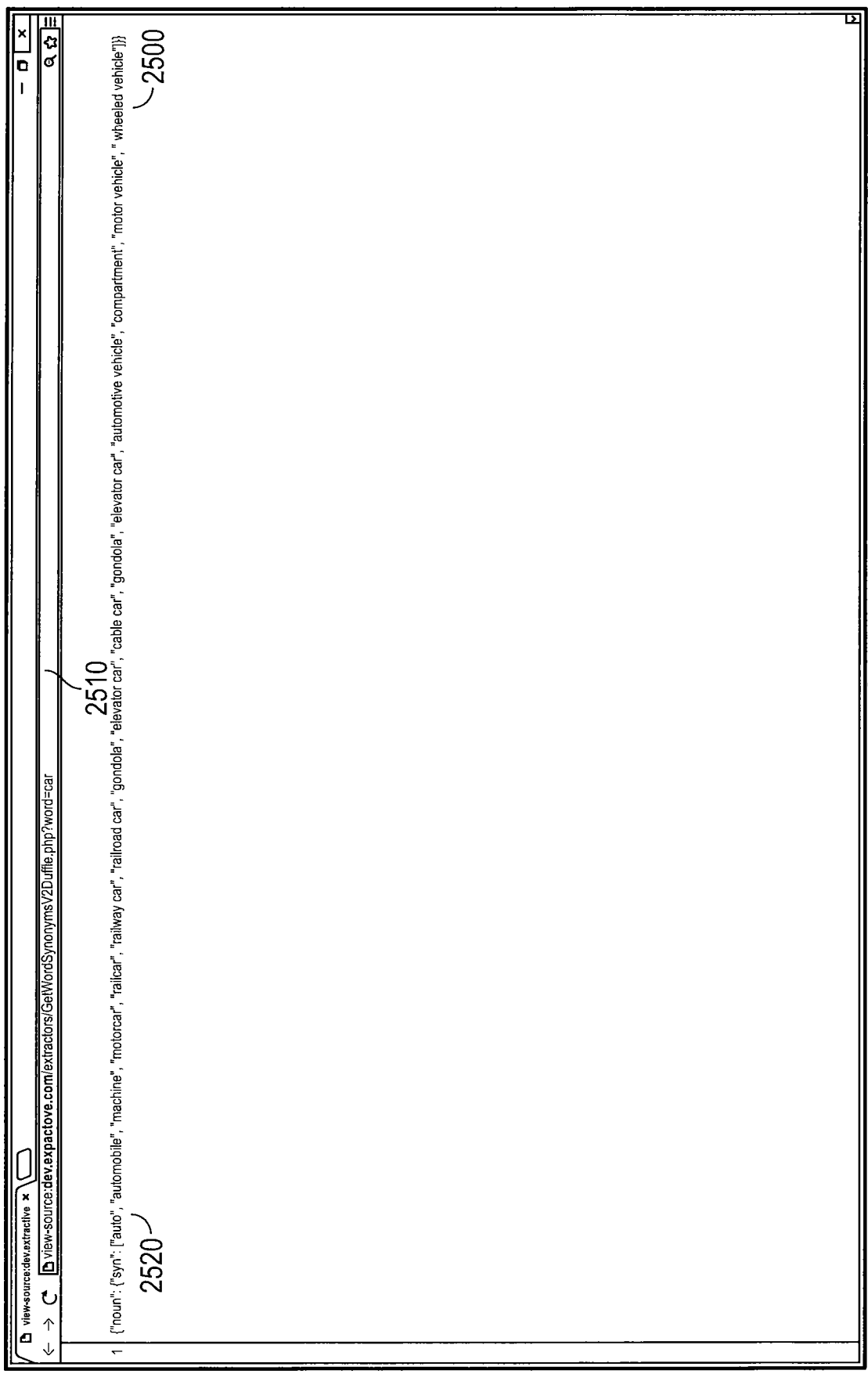

FIG. 27

| | A | B | C |
|---|---|---|---|
| 1 | Words | Google Trends Score | SearchCategory |
| 2 | auto | 74 | Consumer |
| 3 | automobile | 24 | Consumer |
| 4 | back | 42 | Consumer |
| 5 | being | 81 | Consumer |
| 6 | book | 13 | Consumer |
| 7 | book stores | 46 | Consumer |
| 8 | buy | 60 | Consumer |
| 9 | college | 56 | Consumer |
| 10 | compartment | 85 | Enterprise |
| 11 | copies | 44 | Enterprise |
| 12 | cost | 89 | Consumer |
| 13 | distribution | 81 | Enterprise |
| 14 | end | 86 | Consumer |
| 15 | expensive | 85 | Consumer |
| 16 | from | 98 | Enterprise |
| 17 | going | 3 | Consumer |
| 18 | gondola | 81 | Consumer |
| 19 | less | 15 | Consumer |
| 20 | lower | 12 | Enterprise |
| 21 | machine | 69 | Enterprise |
| 22 | most | 6 | Consumer |
| 23 | motorcar | 17 | Consumer |
| 24 | new | 10 | Consumer |
| 25 | off-campus | 95 | Consumer |
| 26 | offer | 15 | Enterprise |
| 27 | often | 47 | Consumer |
| 28 | other | 71 | Consumer |
| 29 | pear | 25 | Consumer |
| 30 | prices | 29 | Consumer |
| 31 | prices | 34 | Enterprise |
| 32 | purchase | 90 | Consumer |
| 33 | purchased | 65 | Enterprise |
| 34 | railcar | 37 | Consumer |
| 35 | re-used | 81 | Consumer |
| 36 | relief | 75 | Enterprise |
| 37 | rising | 61 | Consumer |
| 38 | school | 30 | Consumer |
| 39 | school | 39 | Enterprise |
| 40 | seek | 40 | Consumer |
| 41 | Students | 89 | Enterprise |
| 42 | tend | 19 | Consumer |
| 43 | term | 78 | Enterprise |
| 44 | textbooks | 27 | Enterprise |
| 45 | will | 1 | Consumer |

LANGUAGE-AGNOSTIC GRAPH-BASED COMBINATORIAL APPLICATION FRAMEWORK

INCORPORATION BY REFERENCE

The present U.S. Patent Application is a divisional patent application from U.S. Ser. No. 14/029,587, filed on Sep. 17, 2013 now U.S. Pat. No. 10,530,894, which claims priority from U.S. Provisional Patent Application No. 61/816,107 filed on Apr. 25, 2013 entitled "Interactive Visual Environment for Data-Driven Application Development and Associated Specific Techniques" and from U.S. Provisional Patent Application No. 61/701,941 filed on Sep. 17, 2012, entitled "A Combinatorial Software Platform for Data Exploration and Associated Specific Techniques" naming David King as the inventor, the content of all three applications are incorporated herein by reference in its entirety.

TECHNICAL FIELD

The present invention relates to modeling of data, and more particularly to the visualization of data sets across domains wherein the data sets are made schema-independent.

BACKGROUND ART

In a browser-based web environment, due to the same-origin policy restriction that the web-browser places on server calls accessing data across domains poses a challenge. The same-origin policy prevents a web-browser from fetching information from a web-domain that is different from the domain specified in the URL of the web browser. This provides a restrictive constraint for applications that must synthesize data from multiple sources that are not located on the same domain. Solutions to this problem included prebuilding an aggregated data-warehouse on a single domain and having an application, such as a web application, communicate only with the data warehouse. This solution requires that all information domains are known at design time for the application for creating a visualization of the data, and prevents dynamic user-based configurations at run-time. This solution does not work with data-sources that are computed at query time, like the results of simulations or algorithms.

Another solution to the accessing data in a multiple domains includes using same-origin policy headers to tell the browser to make specific exceptions to the same-origin policy. This solution requires coordination between both the sources and consumers of data, and static configuration on both sides, thus preventing the easy dynamic inclusion of new domains.

Another solution includes the use of JSON-with-padding (JSONP) calls to accomplish cross-domain communication. This leverages the interpreted nature of client-side Javascript to disguise cross-domain data as anonymous (lambda) functions whose execution results in the desired data being loaded into memory. This is an exploit of security vulnerability in the web-browser, and not a safe or long-term option to cross-domain calling.

A final solution is the use of inline-frame HTML element (iframe) embedded within web-pages to make cross-domain information accessible. This approach can make cross-domain information accessible from the perspective of the user, but cannot make it accessible to the underlying shared program memory where it can be synthesized with other data.

Thus, each of the prior art solutions fail to provide a robust mechanism for accessing data between domains and providing a means for synthesizing the data for graphical display.

SUMMARY OF THE EMBODIMENTS

In a first embodiment of the invention there is provided a computer-implemented schema-independent method of modeling data from a plurality of diverse sources. For example, the sources may arise in a plurality of domains. In this embodiment, a server transmits to a client a blueprint for visualizing and interacting with data, wherein the blueprint defines an application, for visualizing and interacting with data, which runs on the client. The application may operate on the client within a web browser and may include program code or scripts that operate within the web browser and transmit data and commands to and from the server. In response to receiving a data fetch message from the application running on a client computer, the server receives data from a selected one of a plurality of domains. The server then transforms the received data into a semantic data format. The transformed data is then stored by the server as a first data set. The first data set can then be transmitted to the client computer for further processing and visualization by the application using the blueprint.

In another embodiment of the invention, there is provided a computer-implemented schema-independent method of modeling data from a plurality of diverse sources. In this methodology, in response to a data fetch message from a client computer, a server receives data from a selected one of a plurality of domains and transforms the received data into a semantic data format. The server then stores the transformed data in a server semantic database in combination with data sourced from a different one of the plurality of domains that has also been transformed into the semantic data format to produce stored combined data in semantic data format. In response to a data query message received from the application running on the client computer in communication with the server, the server serves to the client computer at least some of the stored combined data from the server semantic database.

In yet another embodiment of the invention, there is provided computer-implemented schema-independent method of modeling data from a plurality of diverse sources. A client device in a first domain receives data in a semantic data format from a server in response to a sent data fetch message for retrieval of data from a second domain. The client device combines the data received from the server from the second domain with data from the first domain wherein the data from the first domain is in the semantic data format. The client device then produces a visualization of the combined data from the first domain and from the second domain on a display associated with the client device.

Embodiments of the invention may be implemented in which stored data is visualized by a plurality of distinct views. In such an embodiment, the data is associated with a stored data model. On a computer as part of a browser process, a set of data processes are run. Some of the data processes establishing a data component in a browser window, wherein the data component is coupled to the stored data. The data processes may also include a first set of visualization processes establishing a first visualization component in the browser window. The first visualization component is coupled to a stored first visualization, giving rise to a first view. The data processes may also include a second set of visualization processes establishing a second visualization component in the browser window, wherein the second visualization component is coupled to a stored second visualization, giving rise to a second view. A data processes may also include a messaging system that routes data between the data component and the first visualization component, to produce a first view of the stored data in accordance with a first configurable mapping, and between the data component and the second visualization component, to produce a second view of the stored data, in accordance with a second configurable mapping. Additionally, when changes to the stored data are made via user interaction in the first view the changes are reflected in the second view.

Embodiments of the invention may include a computer-implemented schema-independent method of modeling data from a plurality of diverse sources. The server transmits to the client a blueprint for visualizing and interacting with data from at least a first data source and a second data source, wherein the blueprint defines an application, for visualizing and interacting with data from the first data source and the second data source, that runs on the client. In response to a data fetch message from the application running on a client computer, the server receives data from the first data source. The server also receives data from the second data source. The server transforms the received data from the first data source and the second data source into a semantic data format. The server stores the transformed data as a first data set.

In another embodiment, a method for recursively updating an integrated development environment is disclosed. The development environment is established by a server in communication with a client computer by serving web pages to the client computer. The served web pages define an integrated development environment formed from a plurality of components stored within a combinatorial application framework. The combinatorial application framework may be distributed between a client and a server. The integrated development environment receives edits to a representation of a user application within the integrated development environment. The user application is composed of one or more of the components stored in the combinatorial application framework. The edits cause an event to be raised within the combinatorial application framework. In response to the event, event information is automatically transmitted to the combinatorial application framework. In response to the event information, a component associated with the event information is updated within the combinatorial application framework. The updated component forms a portion of the integrated development environment and of the user application and therefore, the changes to the component of the user application cause a corresponding change to the integrated development environment.

Embodiments of the invention also include computer programs and computer program products having computer code on a non-transitory computer readable medium for implementing the disclosed methodology on a computer system.

BRIEF DESCRIPTION OF THE DRAWINGS

The foregoing features of embodiments will be more readily understood by reference to the following detailed description, taken with reference to the accompanying drawings, in which:

FIG. 9 shows a Developer perspective of the code level view for creating an exemplary CAF Application within a HTML page.

FIG. 23 is the user-interface of adding another new component, an external data object, added to the visual environment in the RIDE and the code the visual building block represents in the code editor.

FIG. 24 shows the user-interface for the external data source from which the data object draws, an online thesaurus.

FIG. 25 shows the user-interface perspective of the data extracted by Exaptive from the online thesaurus in its native format.

FIG. 27 is the RIDE user-interface showing the addition of a second data object to the RIDE visual development component and the corresponding code.

FIG. 28 is the user-interface of the external data source from which this second data object draws, a Google spreadsheet.

FIG. 29 is the user-interface perspective of the data from this second data source extracted by Exaptive from the Google spreadsheet and still in its native format.

FIG. 30 is the user-interface perspective of the Google spreadsheet data converted to RDF triples.

DETAILED DESCRIPTION OF SPECIFIC EMBODIMENTS

Definitions

Figure 1:
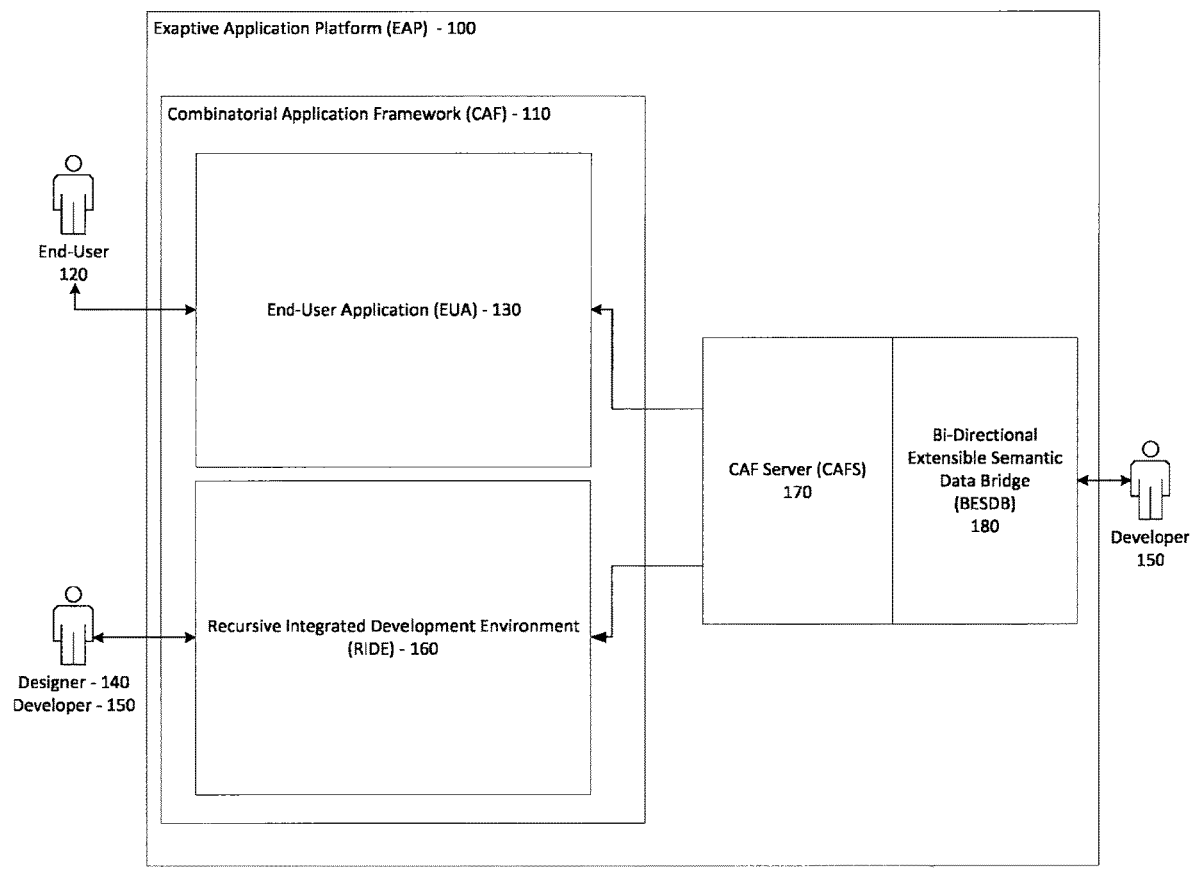
FIG. 1 is a block diagram of the five fundamental system components of the Exaptive Application Platform ("EAP"), the Combinatorial Application Framework ("CAF"), the End-User Application ("EUA"), the Recursive Integrated Development Environment ("RIDE"), the CAF Server ("CAFS"), and the Bi-Directional Extensible Semantic Data Bridge ("BESDB").

As used in this description and the accompanying claims, the following terms shall have the meanings indicated, unless the context otherwise requires:

The term "crowd-sourced" refers to an output that is the result of contributions by independent authors who are not required to be in coordinated communication about a desired end-result, or managed by any governance other than the specifications of the framework within which they contribute.

The term "exaptive" refers to the capability for something to evolve laterally as opposed to linearly. That is, the capability for something to be used in ways that are considered a departure from its original function (an exaptation) as opposed to being used in ways that are considered an improvement in its original function (an adaptation). The relationship between exaptation and adaptation is not mutually exclusive. An exaptation can lead to improvement benefits for a function's original use-case, and an adaptation, which leads to increased specialization for one particular use-case, can inadvertently introduce characteristics, which increase opportunities for exaptation.

A "semantic data format" is format for modeling data as a series of three word sentences comprised of a subject, a predicate, and an object. A semantic data format can be independent of an original format for a data set.

"Domain specific data" is data contained within a domain.

A "domain" refers to a web domain that is an identification label that defines a realm of administrative autonomy, authority, or control on the Internet, based on the Domain Name System (DNS).

A "blueprint" is a set of specifications that define an application for performing at least one of visualizing and interacting with data, wherein a blueprint optionally is the application itself. A blueprint may include a component of an application, a component definition and a data flow definition.

A given "visualization" of stored data is a series of stored processes that when executed in a computer system causes the stored data to have a given graphical appearance in a view on a display device coupled to the computer system.

The "Exaptive Application Framework" (EAP) is a software architecture and implementation for facilitating the collaborative creation of very complex data-driven interactive software applications from a set of software modules that can be re-purposed in a variety of ways by independent designers and developers to serve a wide variety of end-users.

The "Combinatorial Application Framework" (CAF) is an event-driven dynamically compiled software model for defining, implementing, and executing a software application so that it can be comprised from a plurality of independent components that interact in a coordinated fashion and support design-time and run-time component repurposing by users other than the component authors or framework authors, even if created in different programming languages and never intended to function together.

A "CAF Application" is a logical model of connected components produced by the CAF for creating a particular user interaction experience. When this logical model is hosted within an implementation-specific parent container, e.g. a web-page, its embodiment is an End-User Application.

The term "End-User Application" (EUA) is used to describe a software that either a person or other computer program can directly interact with, that is the result of a particular implementation of the logical model of a CAF Application.

A "Recursive Integrated Development Environment" (RIDE) is a specific type of EUA that is used to add functionality to the EAP and build EUAs from CAF components.

A "Combinatorial Application Framework Server" (CAFS) provides a CAF Application a means to download necessary component files, dependencies, and an entry point to access data sources through the BESDB.

A "Bi-Directional Extensible Semantic Data Bridge" (BESDB) is a module that allows CAF applications to both read and write data (bi-directional) to a variety of sources that can be easily extended by independent developers (extensible) regardless of whether they use a CAF-based RIDE or an independent IDE technology. Data that is accessed by the BESDB, can be passed back to the CAF application as received from the source, or can be transformed into a schema-less semantic data model which represents data from any source as a graph of nodes and edges. This node-link model is based on the fact that any data schema can be expressed as a set of three-word sentences of the form subject-predicate-object (semantic).

The term "end-user" is used to describe a person who interacts with a software application. The end-user may have technical subject matter expertise regarding the information presented by the application or the use-case of the application, but is not required to have any technical expertise regarding software programming or any specific understanding of the EAP system.

The term "designer" is used to describe a person who uses the RIDE to assemble EUAs within the EAP. A Designer is not required to have any software programming skills. Programming expertise differentiates a Developer from a Designer. One of the innovations of the EAP architecture is its capability to leverage Designers.

The term "developer" is used to describe a person with programming expertise who uses either the RIDE or an independent IDE technology to create CAF components that can be used by Designers to build CAF EUAs. A Developer may also be a Designer during particular aspects of CAF EUA development, and both Developers and Designers may be End-Users when they interact with the RIDE or other CAF EUAs.

The term "component" describes module of code that performs a specific visual, data-related, or algorithmic function within a CAF Application and adheres to the CAF Object Model.

The term "duffle" is a programmatic construct that encapsulates data to provide a consistent set of data-access and data-manipulation functions to CAF Components. A duffle may be formed as an object.

The term "event" represents the signal sent to the CAF Client as a result of an OutEvent function call by a CAF Component. Events fall into categories defined in the Component Definition, and always contain a Duffle which holds any pertinent data regarding the event.

"Component Definitions" specify the event types that each component can send to the CAF Client, the code functions they have for handling events that may be passed to them, and any necessary initialization code for the Component.

The term "DataFlow" applies to the general concept of facilitating communication between multiple components by mapping the types of events that each component might raise to one or more recipient functions on the other components.

A "Dataflow Definition" is a specific set of event-to-function mappings that create a particular communication pattern between components.

The term "blueprint" shall mean a combination of one or more Component Definitions with one or more DataFlow Definitions is sufficient to completely specify the behavior of a CAF Application and can be considered a Blueprint for a CAF Application.

The term "duffle data handler" refers to programmatic libraries that provide a variety of functions for accessing and manipulating the data contained within a Duffle.

A "Composite Component" is a Blueprint (Component Definitions+DataFlow Definition) that defines and connects a number of different CAF Components into a module that can be logically treated as just a single CAF Component. The CAF architecture guarantees that any CAF Blueprint will result in a Composite Component that can be treated as a single Component within another CAF Blueprint. Since the CAF architecture defines CAF Applications as the resulting logical model of a CAF Blueprint, it follows that CAF Applications can themselves be considered Composite Components, which can be treated as single Components within other CAF Applications. This hierarchal nature of the CAF architecture creates some terminology ambiguity due to the fact that a Component, a Composite Component, and a CAF Application can all correctly be referred to as just a Component, but it is this generality that give the CAF Framework its extensibility.

A "Combinatorial Application Framework Client" (CAF Client) is a code module that is responsible for creating active versions of components in computer memory based on the Component Definitions contained in the Blueprint, receiving Events from those components, and relaying the data contained in those events, via a Duffle, to the appropriate recipient Components as specified in the Blueprint's DataFlow Definition. The CAF Client is also responsible for providing integration points for Components' visual interfaces with the parent interface that is hosting the CAF Application, e.g. a webpage.

A "Combinatorial Application Framework Server" (CAFS) is the communication point for the CAF Client to ask for, and receive, information that is not immediately available to it in-memory or on disk on the Client. These requests may be regarding information related to the CAF Application itself, such as requests for Blueprints, Component Definitions, DataFlow Definitions, or Component code dependencies—or these requests may be regarding access to external sources of data.

A "Centralized Component and Application Repository" (CCAR) is storage on the CAF Server for holding Component and Dataflow Definitions in such a way as to be able to provide them as Blueprints to a requesting CAF Client.

A "Bi-Directional Extensible Semantic Data Bridge Server" (BESDB) is a component of the CAF Server, which, depending on implementation, may run on the same physical computer as the CAF Server, or on a different one. The BESDB Server acts as a proxy server and data normalization engine, communicating with other servers on behalf of a CAF Client, and making sure that the data returned is in the appropriate semantic format for packing within a Duffle to be consumed by a CAF Client.

"Remote Data Objects" (RDOs) are a particular type of CAF Component that execute server-side instead of client-side to access data sources external to the CAF Client and make them available through the BESDB.

"Remote Data Object Duffle Builder Libraries" (RDO-DBL) are code modules that allow a server-side Remote Data Object to package its data in a Duffle-compatible format. RDOs that use DBLs eliminate the need for the CAF Server to normalize their data upon receipt, and are able to exert fine-tuned control over the way their data is represented in the CAF semantic model.

"External Domain Server" is a server differentiation of particular importance in a web-based implementation of the CAF and represents a Server that is part of a different web-domain than the CAF Client/CAF Server web-domain. Security protocols within all established web-browsers enforce a "same-origin policy" which prevents the web-browser from certain types of communication with external domain servers, thus making the distinction between same-domain and external-domain servers important when discussing a web-based CAF implementation.

"Distributed Component and Application Repositories External Domain Servers" are servers that besides for housing data and/or computational capabilities that may be of interest to a CAF client, may also store CAF Component and DataFlow Definitions, similar to the CCAR. External Domain Servers that have these Definitions are considered a Distributed Component and Application Repository (DCAR).

A "Component and Application Repository" holds components and applications in a storage location. A CAF Application can be considered a Composite Component, and a Composite Component can be considered a Component. In this way a CAF Component and CAF Application Repository could be called just a Component Repository. However, CAF Components must be housed within a specific implementation such as a web-page in order from them to be accessible as an End-User Application. CAF Servers may also hold in their Repositories these End-User Applications, i.e. specific web-pages that implement CAF Applications, so we refer to their Repositories as Component and Application Repositories.

An "External Integrated Development Environment" (IDE) is an IDE that was not built in the CAF. The EAP does not require code development to be performed within a CAF-based Recursive IDE—External IDEs can be used for CAF Component development as long as they can output the files required by the CAF.

A "Document Object Model" (DOM) is set of HTML elements defined within a HTML page that are processed by the Web Browser to create an in-memory representation of the elements of the page, their properties, and their content.

"Application DOM Elements" are HTML DOM elements that have a CAF-recognized tag that alerts the CAF Client to pre-allocated areas of a HTML page for holding CAF Components' visual elements.

"Independent DOM Elements" are HTML DOM Elements that do not have a CAF-recognized tag and are ignored by the CAF Client The term "design-time" shall refer to time prior to the running execution of the software application. Design-time refers to changes to application code and/or application metadata that take effect when the application runs.

The term "run-time" shall refer to the time during the execution of the software application. Run-time usually refers to changes to application metadata that have an effect on the active behavior of the program, though if a specific CAF implementation leverages interpreted languages (e.g. Javascript) run-time changes to program code are also possible.

The term "component repurposing" shall refer to the act of configuring an application to use a component in a way not predicated or intended by the component author, by someone other than the component author, without the need for coordination with the component author or changes to the component or CAF code.

The Exaptive Application Platform ("EAP") (100) as shown in FIG. 1 is a software architecture and ecosystem for facilitating the collaborative creation of very complex data-driven interactive software applications from a set of very simple and modular software building blocks that can be re-purposed in a variety of ways by independent Designers (140) and Developers (150) to serve a wide variety of End-Users (120). FIG. 1 is a block diagram that shows the fundamental subsystems that make such a system possible. Developers and Designers use the Combinatorial Application Framework ("CAF") (110) to create both End-User Applications ("EUAs") (130) and the Recursive Integrated Development Environments ("RIDEs") (160) used to create the EUAs (130). The fact that an IDE is itself an EUA, created on the same CAF framework, is what makes it recursive, and this recursion bestows a number of architectural advantages that are explored in the figures that follow. CAF applications (EAUs or RIDEs) access data through a CAF Server ("CAFS") (170) which exposes a Bi-Directional Extensible Semantic Data Bridge ("BESDB") (180) to external data sources. The BESDB (180) is a subsystem that acts as a gateway to allow CAF applications to both read and write data (bi-directional) to a variety of sources. The architecture of the EAP (100) allows for the variety of sources that can be accessed by the BESDB (180) to be easily extended by independent developers (extensible) regardless of whether they use a CAF-based RIDE (160) or an independent development technology. Data that is accessed by the BESDB (180), can be passed back to the CAF application as received from the source, or can be transformed into a schema-less semantic data model which represents data from any source as a graph of nodes and edges. This node-link model is based on the fact that any data schema can be expressed as a set of three-word sentences of the form subject-predicate-object (hence semantic data bridge). This semantic normalization allows information from a plurality of sources to be synthesized and leveraged in the aggregate by CAF applications. While this transformation is not a necessity, semantic normalization coupled with the modularity of the components available in the CAF facilitates collaboration, reuse, and use in novel ways (exaptations), which cannot otherwise be achieved in other architectures without much more explicit developer coordination and interaction.

Figure 2:
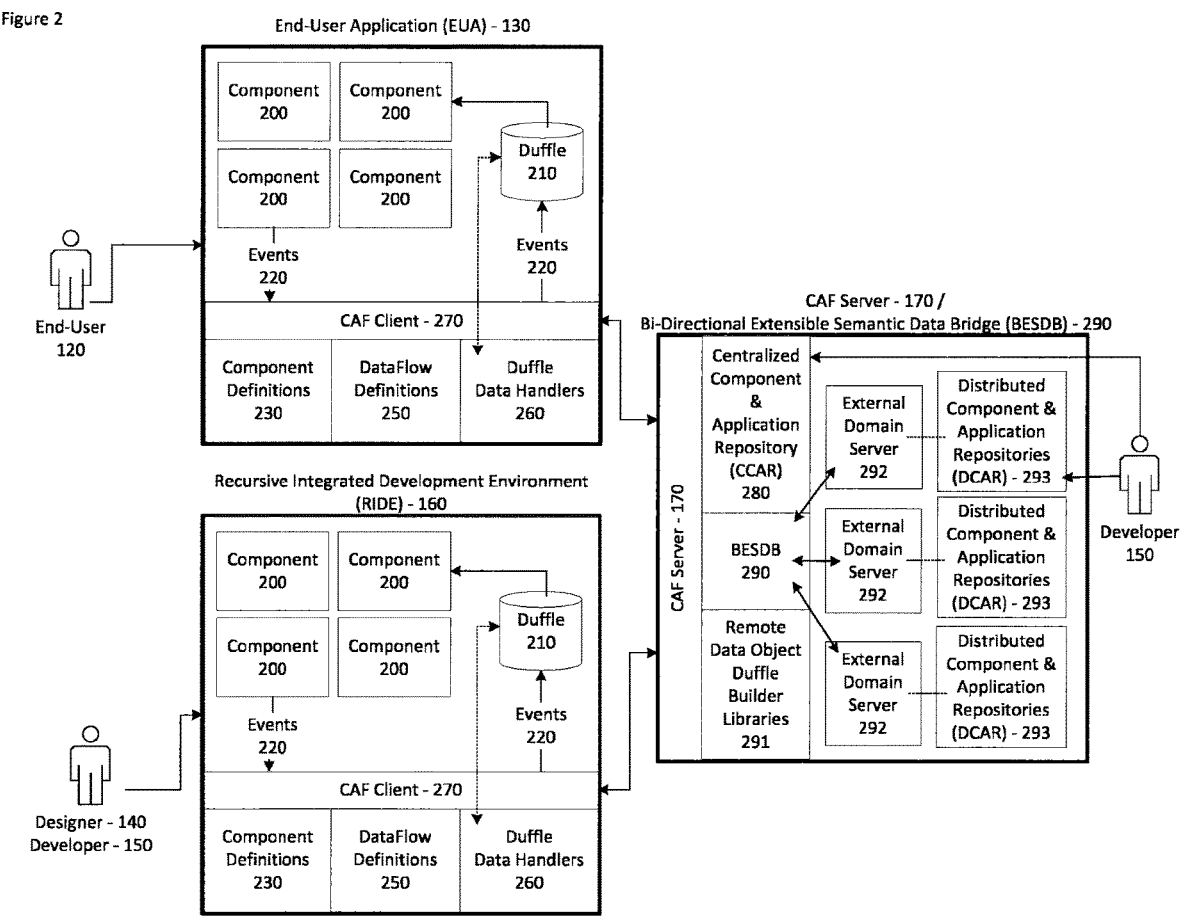
FIG. 2 shows in more detail how the CAF, EUA, RIDE, CAFS, and BESDB work, how they work together, and how the EUA and RIDE are architecturally just different use-cases of the applications configured in the CAF.

FIG. 2 show more specific architectural detail within each of the key subsystems of the EAP. EUAs (of which the RIDE is one) are managed by a CAF Client (270) which instantiates multiple Component objects (200) from a set of Component Definitions (230). These Components are loosely coupled through a messaging system of Events (220). The routing of events is controlled by the CAF Client in accordance with a set of communication rules called a DataFlow Definition (250). Component Definitions together with DataFlow Definitions can be considered a "Blueprint" for a CAF Application. The DataFlow Definition maps Component inputs and Component outputs together to form the pathways of a messaging system by defining the source events that may be raised by Components and the corresponding destination functions on other Components that handle the data produced by the source events. Because this event messaging system is defined by the DataFlow Definition and not fixed by the Components themselves, and by the fact that this event messaging system is the only means by which Components should communicate, the loose coupling mentioned earlier is achieved. This allows for flexible and dynamic communication pathways between the Components of a EUA. In addition, the CAF architecture establishes a consistent methodology, utilizing an object called a Duffle (210), for accessing all event data regardless of the source of, or destination for, the event. Every event raised by a component results in a Duffle (albeit perhaps an empty Duffle) being passed to the event handler functions of the recipient components. Once a recipient component has a Duffle, the data contents can be accessed through a variety of Data Handlers (260) that pull data out of the Duffle in more specialized formats as desired by the recipient Component.

Some events that are raised by Components may be mapped through the DataFlow to recipient Components that were marked in their Component Definition as "Remote". This designation instructs the CAF Client that the recipient component is to be accessed through the CAF Server (170). The CAF Server allows a single point of contact for CAF Clients to leverage in order to be able to gain access to a variety of destinations, including remote servers that may be outside the CAF Server's own domain (292). When the CAF Client sees that the DataFlow definition calls for event data to be routed to a Remote Component, instead of attempting to communicate to the Remote Component directly, it asks the CAF Server to do so on its behalf. The CAF Client provides the CAF Server with all necessary information about the Remote Component, and the CAF Server uses a Bi-Directional Extensible Semantic Data Bridge (BESDB) (290) to contact the specified Remote Component, either to read the remote data, or to write data to the remote source. The CAF Server also provides a set of server-side Duffle Builder Libraries (291) that allow the remote server to transform, or the BESDB to transform, the remote data into a schema-less semantic data format discussed in more detail in the later figures. This proxy feature of the BESDB, allowing for cross-domain communication, is an important feature for web-based applications where browser-based security restrictions make such cross-domain communication difficult. The set of Components available to a CAF Application can reside within the CAF Application itself, through inline definitions explained in more depth in later figures, or can be housed in a Centralized Component and Application Repository (CCAR) (280) which creates the foundation for an easily crowd-sourced ecosystem. The external servers with which the CAF Server communicate with may also house repositories of CAF components and/or applications (293), thus allowing a CAF Client to access a distributed network of CAF components beyond what may be immediately available in its own central repository.

Figure 3:
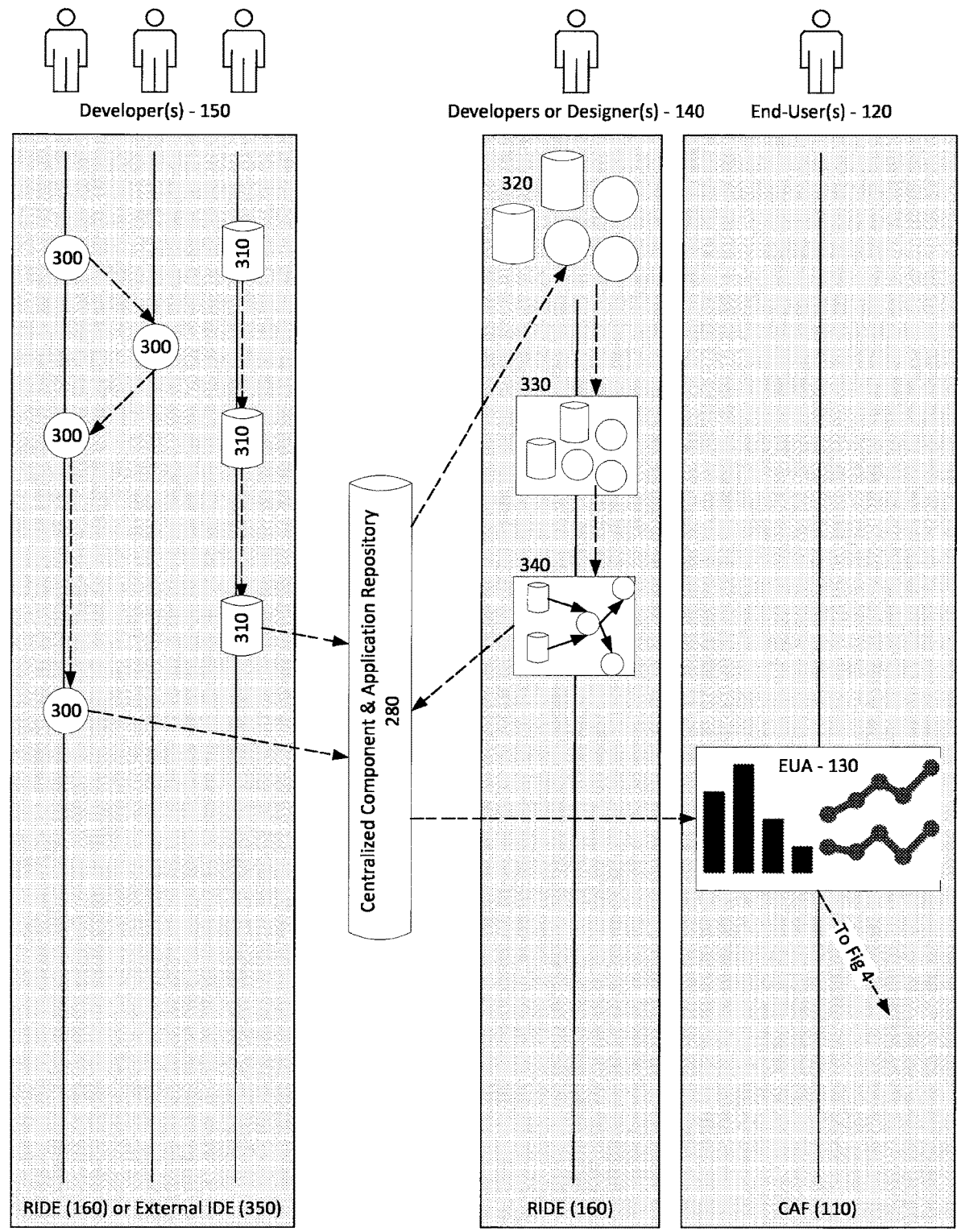
FIG. 3 demonstrates the logical flow for creation of an EUA in the EAP.

FIG. 3 shows the high-level logical flow of the Exaptive Application Platform. The leftmost column of FIG. 3 shows the creation by Developers (150) of two CAF Components (300, 310), one of which is a collaborative effort between two developers (300) and one of which is an independent effort by another developer (310). When complete, both components are placed in a Central Repository (280). A different Developer or a non-programming Designer (140) can investigate and access these CAF Components (120), and others from the Repository (280), group them together into a CAF Application (330) by defining them in the CAF Application Blueprint, and "wire" them together by defining a DataFlow (340). The DataFlow connects Component Events and Component event handler functions in a way that exhibits a desired behavior, and results in a CAF Application Blueprint (340) that can be also stored in the Central Repository (280). An End-User (120) can then request this CAF Application from the Repository, which will serve the CAF Application to the End-User within an implemented host container, such as a web-page, allowing the End-User to interact with a single software program comprised CAF Components or EUA (130).

Figure 4:
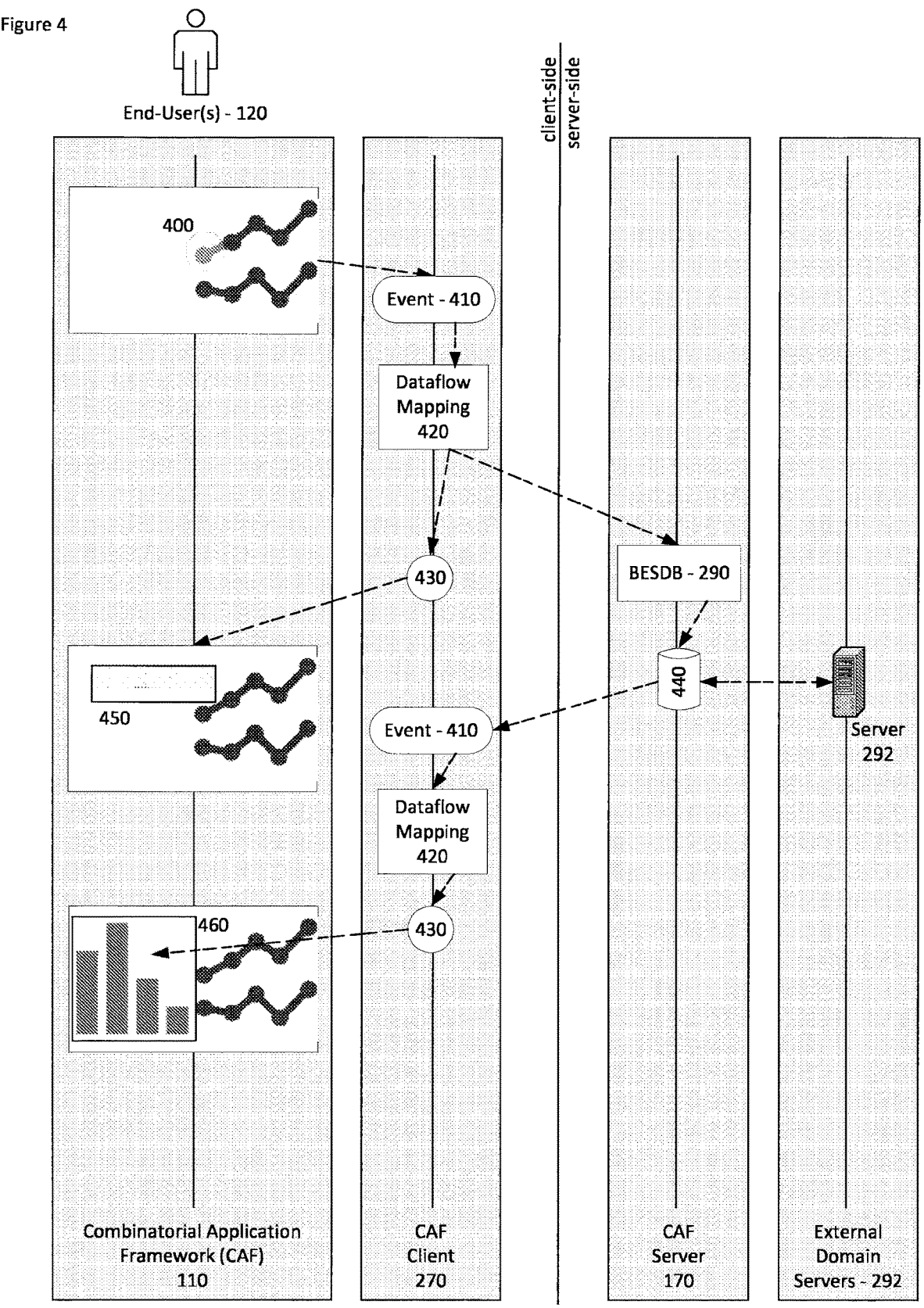
FIG. 4 demonstrates the logical flow by which the EUA functions in partnership with the CAF client and server and external domain servers.

FIG. 4 shows the logical flow of how the CAF (110) beneath an EUA works to create End-User (120) interaction and application behavior. Some CAF Components expose visual elements to the End-User through the standard user-interface functions made available by the software that is hosting the CAF application. For example, a CAF application hosted within a web-page will have access to the standard web-page methods for visual interaction, and CAF Components will be able to use these methods of the host container to create visual elements of the user-interface and receive End-User input (400) from those visual elements also through the standard methods provided by the CAF Application host implementation. When a CAF Component receives a particular user input through a visual user-interface element, the CAF Component can notify the CAF Client Library of this event (410) by calling a function of the CAF Client (270), which creates a CAF Event (410) in CAF Client memory that corresponds to the user interaction event. The CAF client then inspects its DataFlow Mapping (420) to see if the Event type is specified in the DataFlow, and if so, to which recipient Components (430) the Event must be routed. In FIG. 4, the logical flow shows an example of a DataFlow which causes a single Event (410) to be routed to two different CAF Components (430, 440), one being a client-side Component which can handle the event in such a way to create, though the standard methods made available by the Application host, a change in the visual state (450) of the End-User Application, and the second Component being a Remote Data Object Component (440) which results in the CAF Client making a call to CAF Server which activates its BESDB (290) capability. The BESDB (290) loads into server-side memory the requested Remote Data Object Component ("RDO") (440), and asks the RDO to execute based on the data provided in the client-side Event (410). The execution of the RDO may result in communication with other servers (292), which may reside in different domains than the CAF Server (170). The result of the RDO execution will be passed back from the CAF Server (170) to the CAF Client (270) where it is treated as another event to be routed in accordance with the DataFlow Mapping (420). In this example, the RDO event is routed by the DataFlow to another CAF Component (430) which uses the information contained in the Event to modify the visual aspects of the End-User Application (460).

Figure 5:
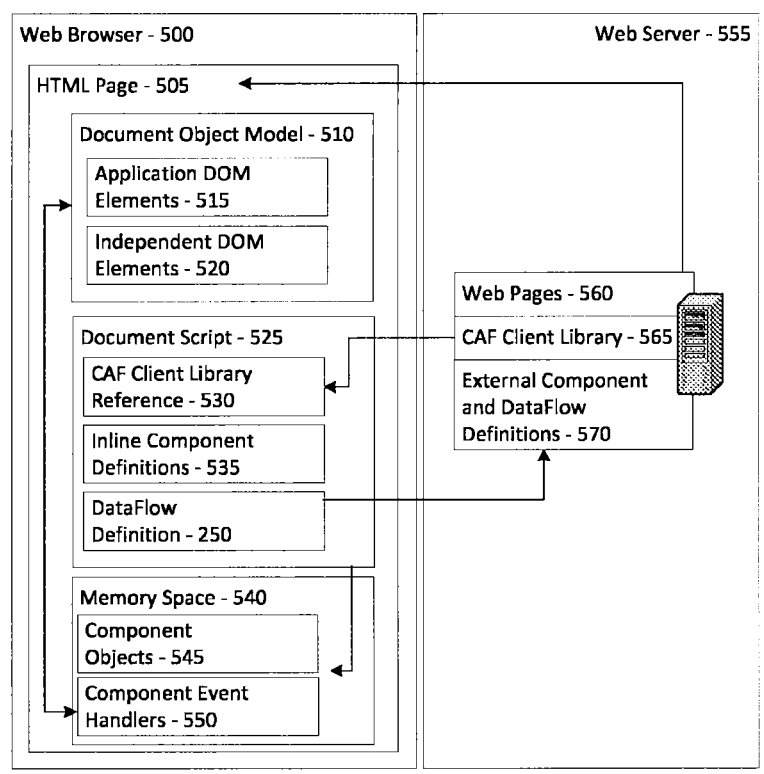
FIG. 5 shows the block-diagram architecture for a web-based implementation of a CAF application.

FIG. 5 shows the block-diagram architecture for a web-based implementation of a CAF Application. This implementation a CAF application is achieved in a web browser (500) by rendering an HTML page (505) that hosts all of the necessary elements for an HTML web page (505)—a Document Object Model (DOM) (510) that can run Document Scripts (525) that can access client-side Memory Space (540). In the exemplary implementation shown in the FIG. 5, the standard HTML web-page (505) is configured to be a CAF application host by inclusion of two items: a script reference to a web-compatible CAF Client Library (530) and a DataFlow Definition (250). The DataFlow Definition (250) may reside in a file external to the HTML page (570), or may be defined inline in the HTML file itself (535). Similarly, the DataFlow Definition (250) may reference CAF Components that are located on external servers (570), and/or may reference CAF Components defined inline (535). The CAF Client Library processes any inline Component Definitions (535) and processes the inline or external DataFlow Definition (570), dynamically loading external dependencies as required, in order to allocate memory for all the programmatic functions of the referenced components and their event handlers, within a structure that allows the CAF client to call particular functions as dictated by the event mapping of the DataFlow.

In order to provide a visual outlet for CAF components within this implementation, the CAF Client that is implemented by the CAF Client Library Reference (530) allocates space in the HTML DOM (510) for Components that request it to do so. The HTML page (505) can customize the placement and appearance of these CAF-driven visual elements by pre-allocating elements in the DOM (510) for them and marking those elements with CAF-recognized HTML tags. HTML DOM (510) elements that are tagged this way are considered to be Application DOM Elements. The HTML DOM (510) may also consist of HTML DOM (510) elements that have no CAF-specific tags and are therefore not known to the CAF Client. These are Independent DOM Elements. A HTML page's DOM can consist of any mixture of Application and Independent DOM Elements.

In the web-implementation of the CAF, CAF-compliant HTML pages are served to the client from a standard Web Server (555). External Component and DataFlow Definitions (250) are also served to the client via standard HTML/HTTP methods, from either the same server that provided the initial HTML page, or from different servers acting as Distributed Component and Application Repositories. As long as all referenced files adhere to the Object Model shown in the following figure, they will combine to form a cohesive CAF application within the host HTML page regardless of from where they were served.

Figure 6:
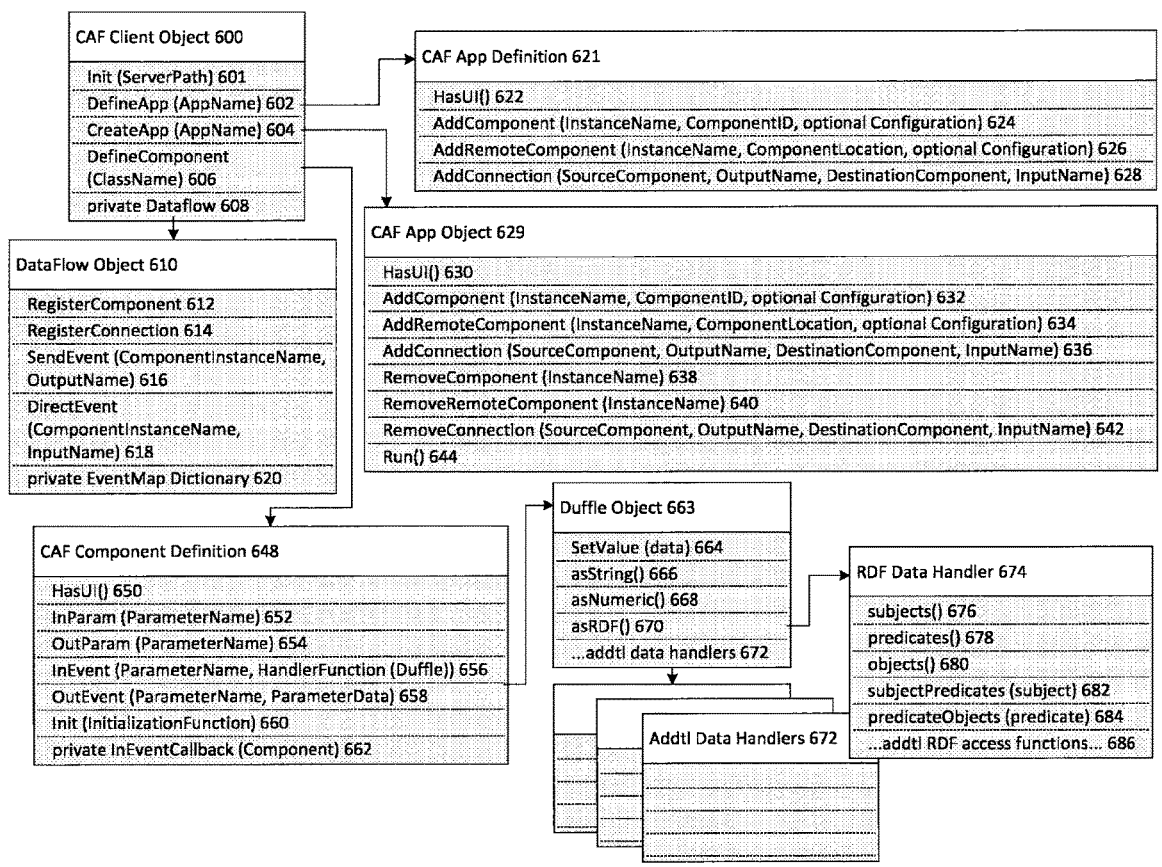
FIG. 6 is a component object model for a Combinatorial Application Framework.

FIG. 6 shows a component object model for a Combinatorial Application Framework. It includes objects (600, 610, 621, 629, 648, 663, 672, 674) and their functions (601-608, 622-628, 612-620, 630-644, 665-662, 664-672, 676-686). These exemplary objects can be used to create CAF Applications that adhere to the loosely-coupled Component and DataFlow-driven architecture of the CAF.

The CAF Client (600) stores component application definitions and uses them to create component and DataFlow instances that control the behavior of the End-User Application. The Init function (601) tells the CAF Client where it can locate the CAF Server. This is only necessary if it is desired to leverage Remote Data Object Components which require a CAF Server proxy. The DefineApp function (602) creates a CAF App Definition object. The CreateApp function (604) creates a CAF App object based on a CAF App Definition Object. The DefineComponent function (606) creates a CAF Component Definition object. The private DataFlow (608) is the CAF Client's internal DataFlow Object.

The CAF App Definition (621) stores information about the components and connections that compose a particular CAF Application. The HasUI (622) function identifies whether the CAF Application needs a place allocated for it in the user interface of the hosting application. The AddComponent function (624) maps a Component Definition to a specific Component Instance. The ComponentID can refer either to an inline Component Definition or be a reference to the location of an external Component Definition. The optional Configuration parameter identifies any starting data that should be provided to the Component after initialization but before the main Event loop. The AddRemoteComponent (626) function acts the same as AddComponent with the addition that it marks the Component instance as "Remote" which alerts the CAF client to route events to this Component via the CAF Server. The AddConnection function (628) creates a mapping between a particular output Event of a source Component to a particular input function on a destination Component.

The CAF App Object (629) is created is created by the CAF Client Object (600) from the CAF App Definition object and represents the components and connections of an actively running CAF Application. As such, it has additional methods available to it other than the CAF App Definition because it has additional run-time behavior. The HasUI (630), the AddComponent (632), the AddRemoteComponent (634), and the AddConnection (636) are inhered from the CAF App Definition (621). The RemoveComponent (638), the RemoveRemoteComponen (640), and the RemoveConnection (642) functions remove components and/or connections from the application instance to support run-time dynamic changes to the CAF Application, which allow it to diverge in behavior from its original CAF Application Definition. The Run function (644) builds a DataFlow object based on the Instance Connections and returns the DataFlow object to the CAF Client for it to initialize the running loop shown in FIG. 8.

The CAF Component Definition (648) defines the metadata for a particular component (its inputs and outputs) and defines the function calls to be used in the DataFlow event handling as well as during Initialization. The HasUI (650) function identifies whether the CAF Component needs a place allocated for it in the user interface of the hosting application. The InParam (652) function identifies that the Component can process CAF Events routed to it by a particular parameter name. The OutParam (654) function identifies that the Component can provide data as a particular parameter name that will result in raising a corresponding CAF Event. The InEvent (656) function defines the event handler function that is executed when an Event is routed to that Component as the given parameter. The OutEvent (658) function passes data to the CAF Client with the specified parameter name and requests that the CAF Client package it into a Duffle if necessary and route it as an Event in accordance with the DataFlow. The Init (660) function defines the code to execute when the Component is instantiated but before it is integrated into the DataFlow messaging. The InEventCallback (662) function provides a single entry point into each Component for request the execution of a particular Event handling function. This pointer allows the DataFlow Object to maintain a reference to each component that it needs to coordinate function calls for as part of the DataFlow.

The Duffle (663) provides a consistent wrapper around all data passed between components as a result of DataFlow-driven event communication. It can be extended though Data Handler objects that allow the information in the Duffle to be accessed in more specialized ways. The SetValue (664) function loads raw data into the Duffle and does not put any constraints on the type of object passed into it for the data argument. The asString( )(666) function converts the raw data value of the Duffle into a string value using any acceptable code method. Not all Duffle values will be easily represented as strings, and in these cases a best-attempt conversion is made. The asNumeric( ) (668) function converts the raw data value of the Duffle into a string value using any acceptable code method. Not all Duffle values will be easily represented as a number, and in these cases a best-attempt conversion is made.

The RDF Data Handler (674) is not a requirement for implementation of a basic CAF client, but is necessary for integration with the BESDB, if there is one. It exposes the raw data of the Duffle as a set of subjects (676), predicates (678) and objects (680) that can be accessed through a variety of different subject-predicate-object query functions (682, 684, 686).). If the RDF Data Handler (674) is implemented it can be accessed through the Duffle (663) by the asRDF( ) function (RDF).

Additional Data Handlers (672) arise if the Duffle provides additional "As . . . " methods to expose the data in different ways. Calling an As function on the Duffle instantiates the corresponding Data Handler for that method, passes the raw duffle value to the constructor of the Data Handler and returns the entire Data Handler Object.

The DataFlow Object (610) is created when a CAF Application object is run and allows the routing of Events from the outputs of Components to the inputs of other Components. The RegisterComponent (612) function stores the input and output parameters for a particular Component and a link to its InEventCallback function. The RegisterConnection (614) function stores a mapping between the OutParam of one component to the InParam of another Component. The SendEvent (616) function uses the InEventCallback pointer to execute a function on a destination Component, passing it a Duffle holding the data provided by the Source Component's OutEvent call. The DirectEvent (618) function allows for Duffles of data to be passed to Components with having been initiated from another Component's OutEvent call. This is how starting configuration information is passed to the Components by the CAF Client after initialization. The privateEventMap Dictionary (620) stores all of the OutEvent-InEvent connections that were registered through RegisterConnection function calls.

Figure 7:
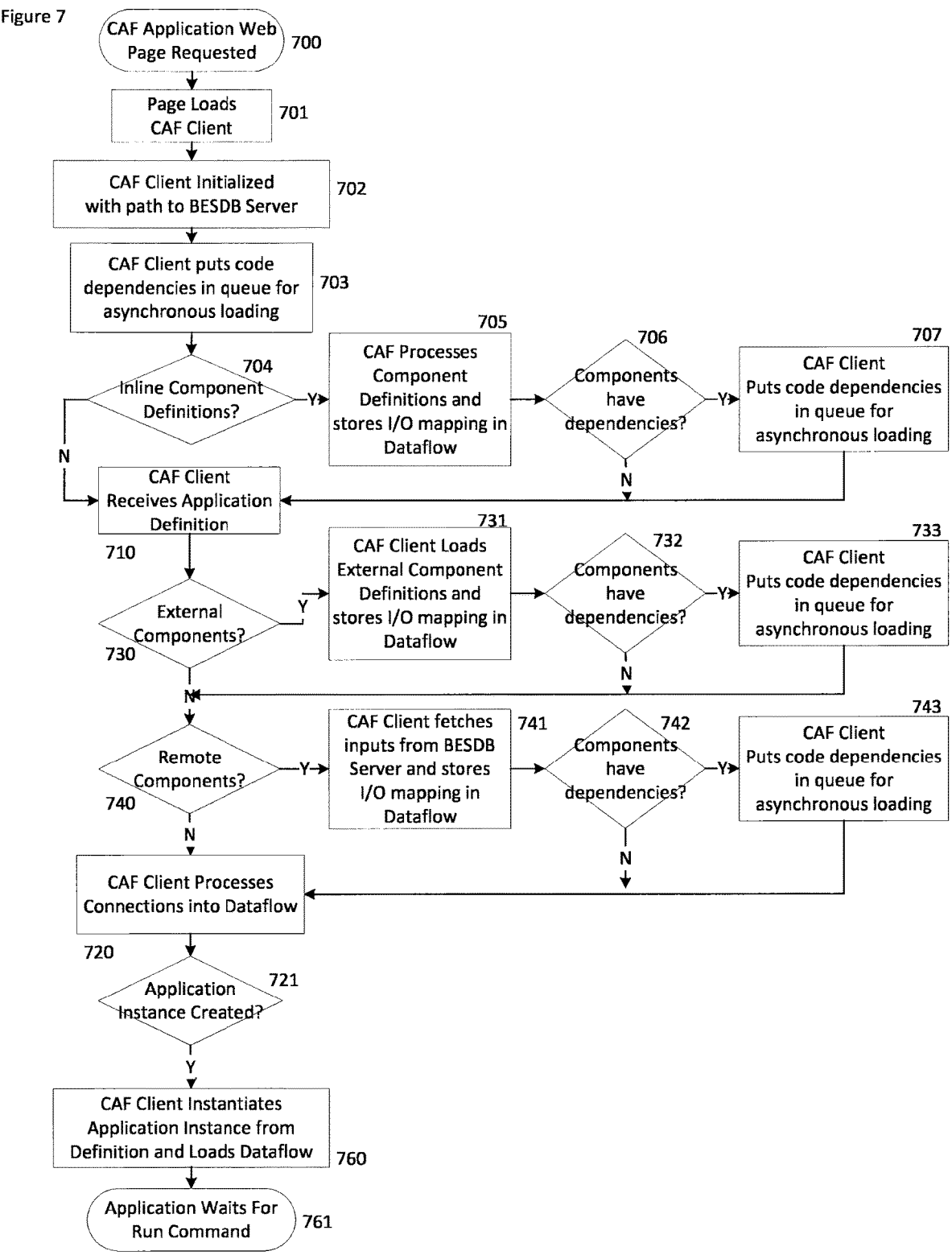
FIG. 7 shows the logical flow for the startup of a CAF Application implemented in a web-based environment.

FIG. 7 shows the logical flow for the startup of a CAF Application implemented in a web-based environment. The web page that holds the CAF Application is requested by a client computer just as any web-page is normally requested (700). As the page is loaded by the web browser, the reference to the CAF Client script is detected and the CAF Client Library is loaded into memory (701). The CAF Client is then initialized with the function call shown in the previous figure's object model, and this identifies to the CAF Client where the CAF Server, if present, is to be found (702). When initialized, the CAF Client puts any code dependencies it requires into a queue for asynchronous loading. (703) If there are inline Component Definitions (704), they are processed by the CAF Client (705), and each inline Component is inspected for code dependencies (706), which if found are added to the dependency queue (707). Next the CAF Client processes the CAF Application Definition (710). If the Application Definition references external Components (730), they must be loaded (731) and inspected for dependencies (732) to be added to the dependency queue (733). If the Application Definition references any Remote Components (740), the CAF Client calls the BESDB Server for information about their inputs and outputs for mapping into the DataFlow (741), assesses dependencies (742), and loads dependencies into the dependency queue (743). Then the CAF processes all Input/Output connections in the Application Definition (720) and waits for the Application Definition that has now been fully processed to be instantiated (721). Once instantiated the CAF Client transfers the information it processed from the Application Definition into a new Application Instance Object (760) and waits for a function to be called on the object to start the running of the application.

Figure 8:
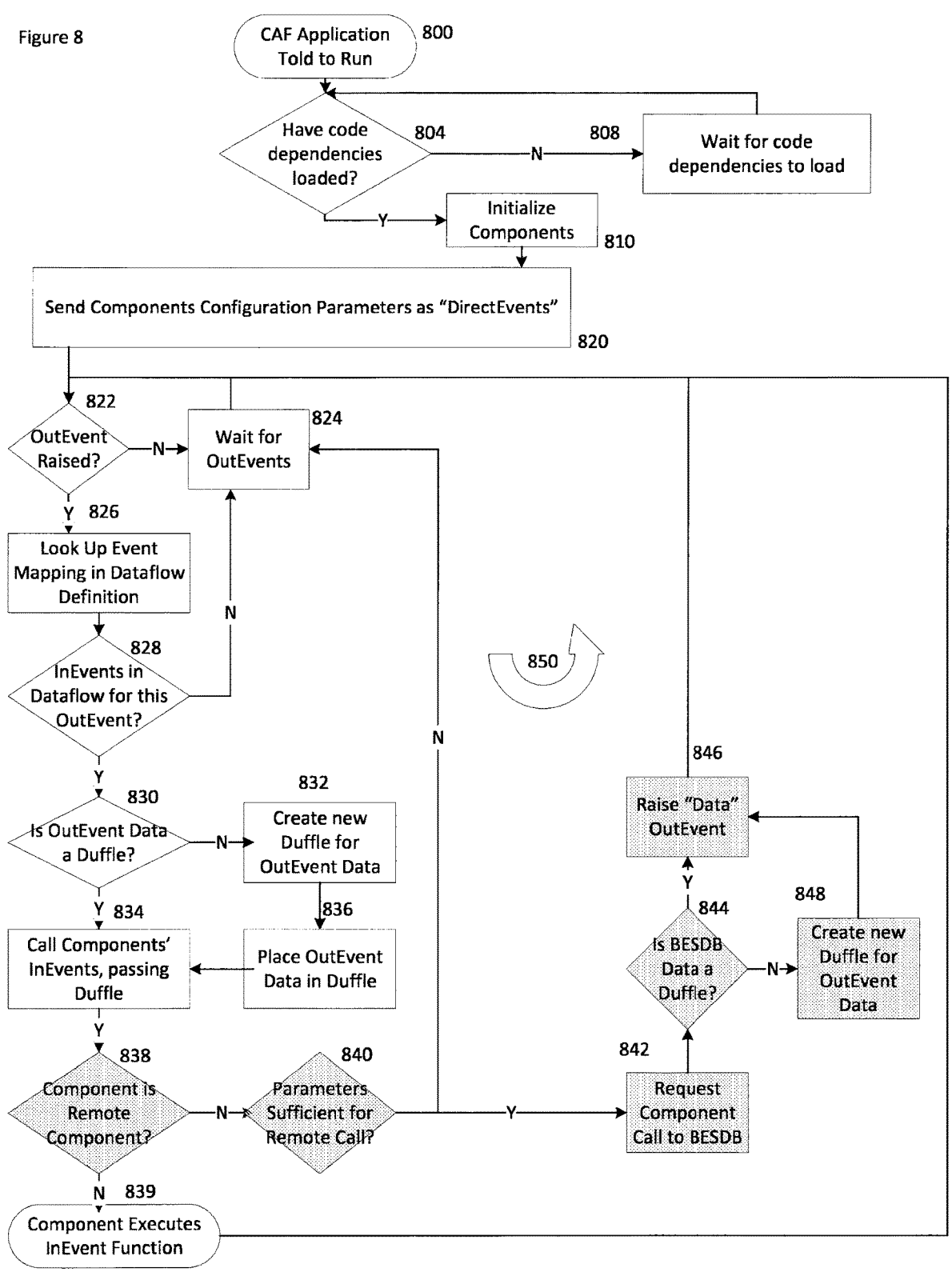
FIG. 8 shows the logical flow of a running CAF Application.

FIG. 8 shows the logical flow of a running CAF Application. After the CAF Application Object has received a function call to run it (800), the CAF Client checks to see if all the dependencies from the asynchronous dependency queue have been loaded (804), and if they have not it waits until they have (808). Then the CAF Client initializes each CAF Component by calling each one's init function (810). After initialization, the CAF Client sends any configuration values that were provided in the Application Definition to the CAF Components via Direct Event methods (820). The CAF Client then enters a message processing loop (850) in which is waits to receive an OutEvent from a Component (822, 824), and when it receives one it looks in the DataFlow (826) to see if that event is routed to any other InEvents (828). If so, it checks the format of the data object that was provided in the OutEvent to see if it is already a valid Duffle Object (830), and if it is not, creates a new Duffle (832) and stores the original OutEvent data in it (836). Then the Duffle is passed to each recipient Component via that Component's InEvents specified in the DataFlow (834). If the Component receiving the OutEvent is a Remote Component (838), the CAF Client minimizes the overhead of round-trip calls to the server by checking if it has all the parameters needed to make a BESDB call for that Component (840), and if not, it waits for more InEvents to fill the Remote Component's inputs. If so, it makes the BESDB call (842) and receives return data that may or may not be in Duffle format (844). Data that is not in Duffle format is placed into a Duffle (848) and a "Data" OutEvent is raised by the CAF Client (846) which then ripples through the CAF Application in the same way as described. After execution of a recipient component's InEvent (839) the CAF Client returns to the beginning of the message processing loop, checking for OutEvents.

FIG. 9 shows a Developer perspective of the code level view for creating an exemplary CAF Application within a HTML page. The five identified objects in this figure can be mapped to the various elements shown in FIG. 5. Object 535 shows the code that creates the script reference to the CAF Client Library and initializes the CAF Client. Object 515 shows an HTML DOM element that has been given a CAF-specific tag of "data-xap" allocating it for housing the visual elements of "CAFApplication1". Object 535 shows an inline component definition for a "Label" CAF Component. The .div( ) function call identifies the Component has requiring space in the host page for its user interface, in this case a HTML div element. The .init function specifies the function that will be called when the CAF Application is initializing the Component. The .inEvent specifies that this Component has one valid input parameter called "Text", with an associated function that takes in data. The data received by all InEvents is always in the form of a Duffle object, so the second line of the InEvent function accesses the data in the Duffle using the asString( ) method. Object 900 shows the CAF Application Definition for CAFApplication1. It also requires user-interface allocation, as indicated by the .div( ) call. Then it defines an application by adding an instance of the "Label" component defined above, as "Label1", and an instance of a remote "TextBox" component as "TextBox1". TextBox1 is also given some configuration data, a caption object. Object 910 shows the instantiation and running of the CAF Application defined in 4 through the .createXap method and .run method.

Figure 10:
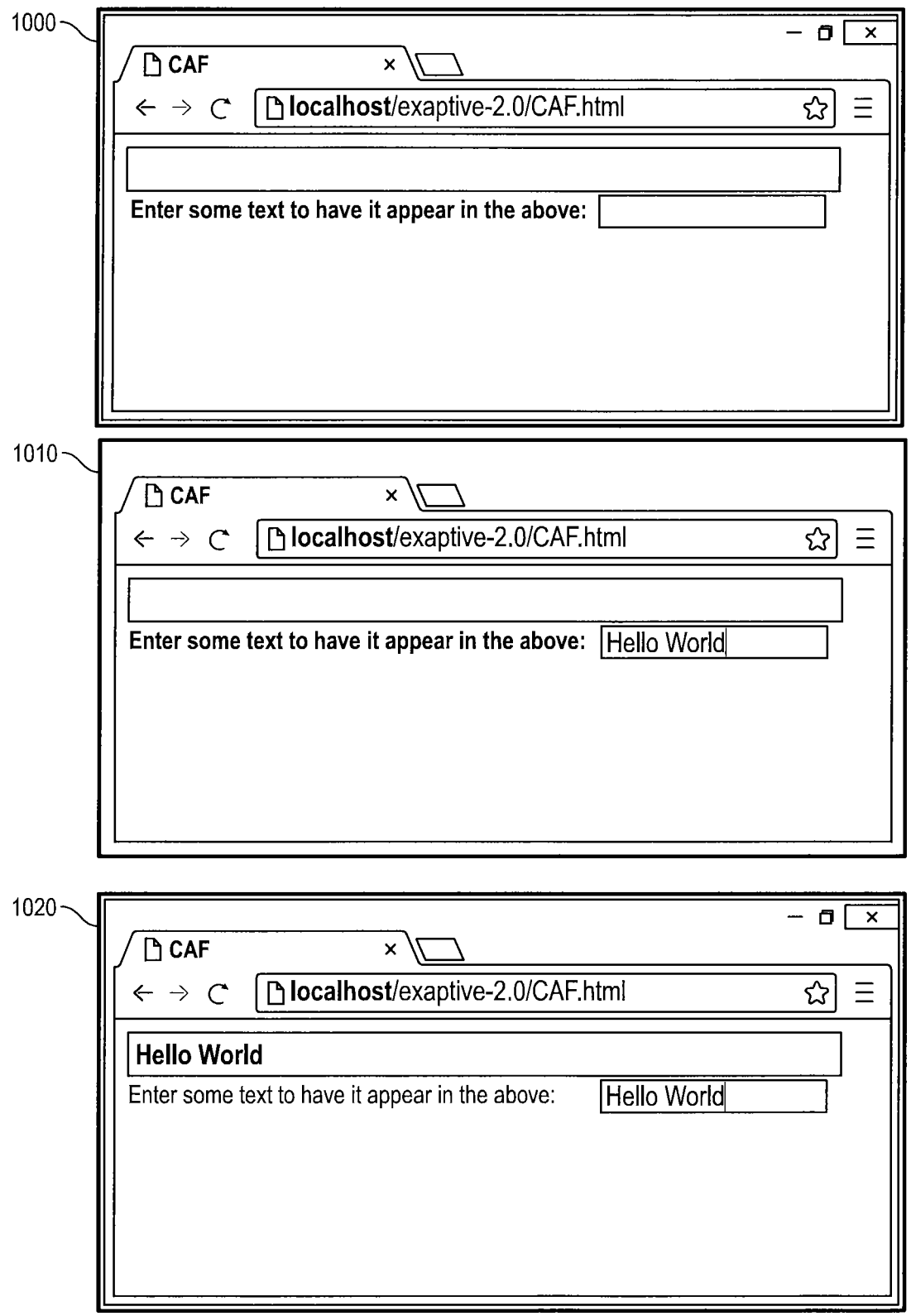
FIG. 10 shows the End-User perspective of the CAF Application that was created in FIG. 9.

FIG. 10 shows the End-User perspective of the CAF Application that was created in FIG. 9. The example is simplified in terms of End-User functionality, but it illustrates the DataFlow-driven Event method of communication that is a cornerstone of the CAF architecture and key to its combinatorial capability. The CAF Application renders includes two distinct CAF components (1000) defined and connected in dataflow definition. The grey box represents an instance of a Label component and the input box and caption to its left represent an instance of a TextBox component. By entering text in the TextBox (1010) and pressing return causes the CAF component to raise a "Value" OutEvent with the data "Hello World". The CAF traps the OutEvent, packages its data in a Duffle object, and routes the Duffle to the corresponding InEvents as defined by the Dataflow, in this case the "Text" InEvent of the Label CAF Component. The Label Component receives the InEvent and uses Data Handler libraries to extract data from the Duffle, in this case extracting the data as text and using it to update its caption (1020).

Figure 11:
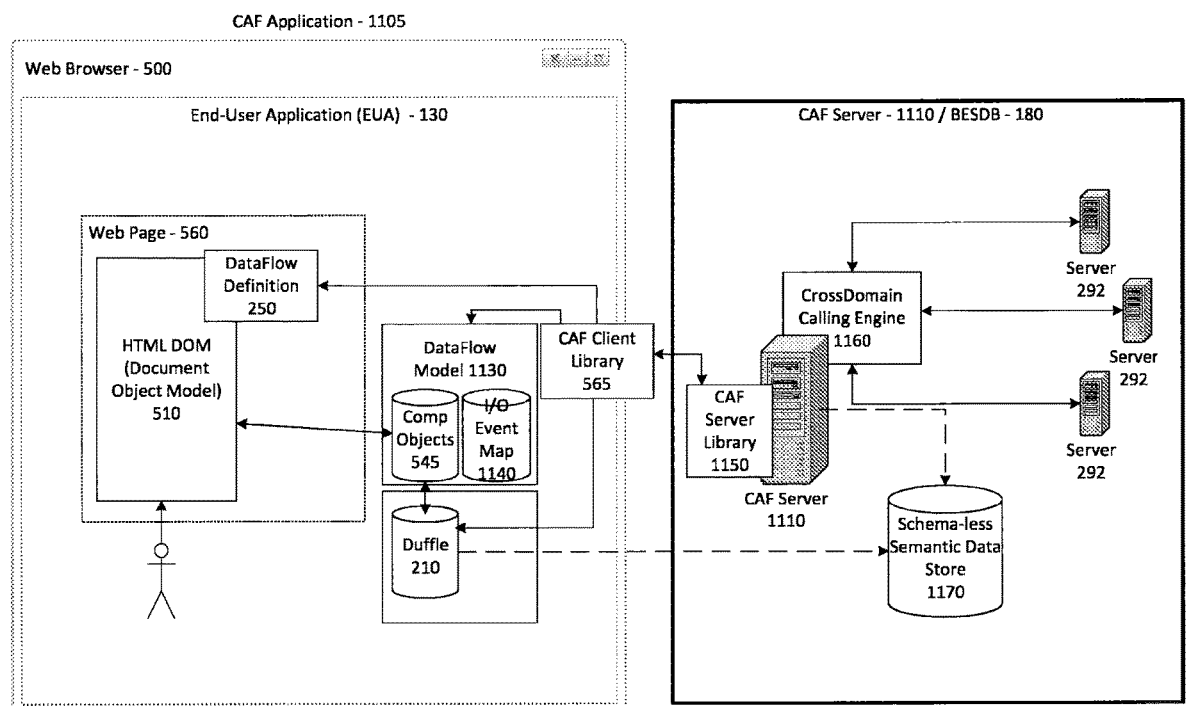
FIG. 11 is a high level block diagram of the integration of a CAF Client with a CAF Server to facilitate remote server communication through the BESDB.

FIG. 11 shows a high level block diagram of the integration of a CAF Client with a CAF Server to facilitate remote server communication through the BESDB. The CAF Application model (1105) has been explored in detail in the preceding figures. When the CAF Client Library (565) detects in its DataFlow that it must route an event to a CAF Remote Component it makes a function call to the CAF Server Library (1150). In a web-based CAF implementation this can be accomplished through standard HTTP GET/POST methods. Included in the information sent by the CAF Client to the CAF Server (1110) is the location of the Remote Component, in the web implementation, a URL. The CAF Server (1110) relays the rest of the provided information to the server located at this remote location through a CrossDomain Calling Engine (1160).

Figure 13:
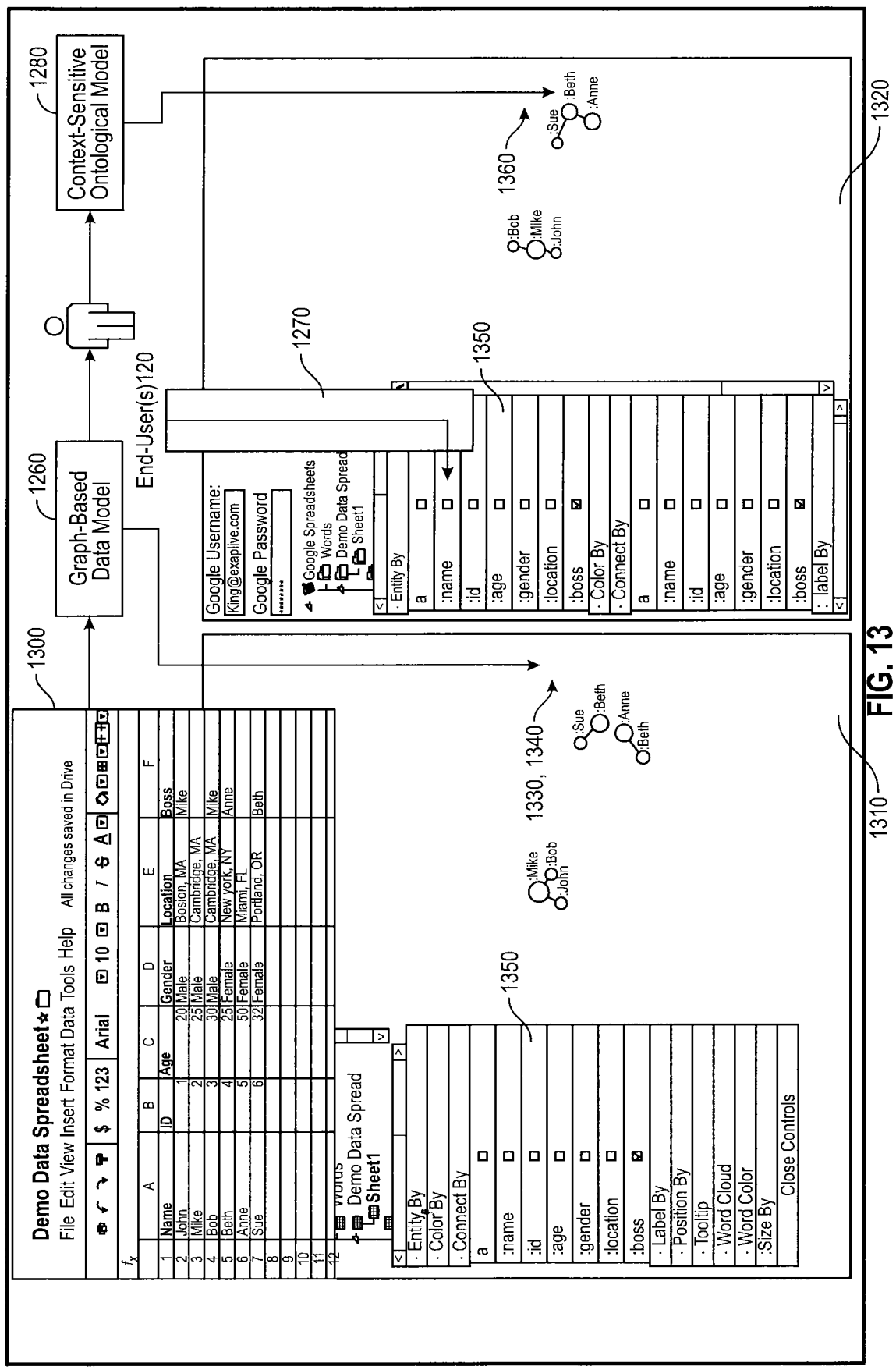
FIG. 13 shows the schema-less semantic data model from an end-user perspective from which their input can lead to a dynamically applied ontology which results in a fundamental change in the underlying data model.

There are a number of ways to implement the cross-domain calling portion of the BESDB (180), each of which will have different cost/benefit tradeoffs. The suggested implementation is a proxy server implementation in which the CAF Server (1110) opens another independent communication channel, HTTP in the case of a web implementation, and relays the information through that channel. Upon receiving a response, the response is relayed back to the CAF Client through the original communication channel established. FIG. 13 shows the logical flow for this implementation of the CrossDomain Calling Engine.

The dotted line in FIG. 11 represents an optional data-storage option for the results received by the CrossDomain Calling Engine. While the data received by the CrossDomain call may be transmitted back to the CAF Client, where it can be stored in a client-side Duffle object (210), there may be advantages to persisting the data returned by the CrossDomain call to a location, either in-memory or on-disk, server-side. Once the data is persisted this way, the CAF Server can information to the CAF Client, which identifies the location on the server where the data has been stored. Using this Token, the CAF Client builds a virtual Duffle. When components request data from a virtual Duffle, the Duffle communicates with the CAF Server to extract the data from the server-side location.

Figure 12:
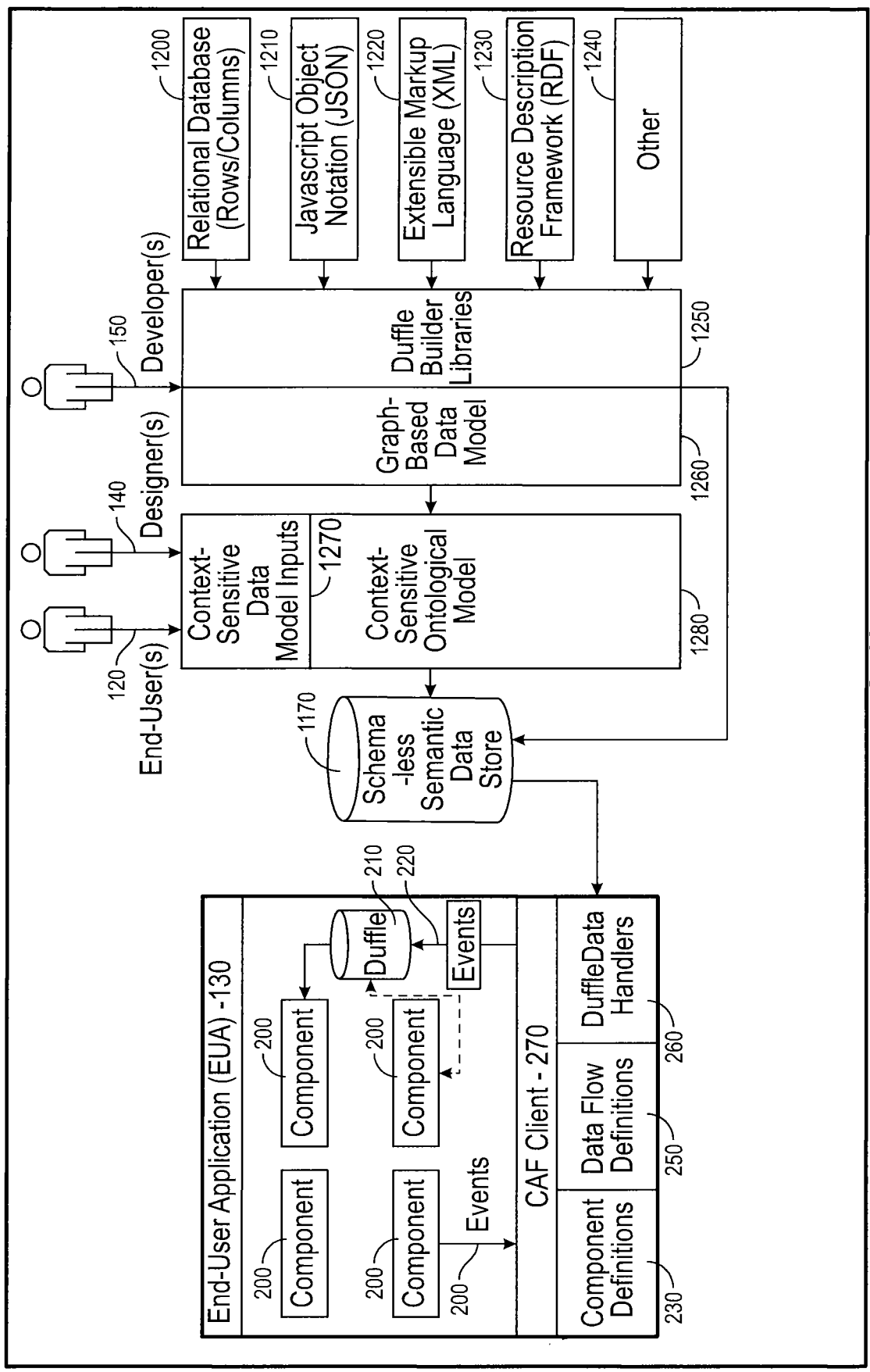
FIG. 12 shows the system architecture by which data in different formats can be converted into two types of schema-less semantic data formats.

While there is no requirement that the data stored in the Duffle, either client-side or server-side be converted into a Schema-less Semantic Format, the capability to do so is an advantage of the BESDB, and is explored in further detail in FIG. 12.

FIG. 12 shows the process by which data in different formats can be converted into two types of schema-less semantic data formats. The Developer writes code to connect and pull data from the remote data source in whatever format is accessible. This may include row and column formatted data from relational databases (1200), JSON formatted data from web services (1210), XML formatted data (1220), RDF (1230) or a variety of others (1240). The Developer then writes additional code which navigates the data that has been fetched and uses a Duffle Builder Library (1250) to add "Statements" to a Duffle Object, where each statement is comprised of a subject, predicate and object. The Duffle Builder assembles these statements into data structures that represent a logical node-link model where subjects and objects are nodes and predicates are the links between them. This Duffle data model representation is based on the Resource Description Framework data format. Once the developer has written this code into the Remote Data Object CAF Component, that component is then capable of producing a subject-predicate-object graph representation from the particular data source (1260). In some cases this process may be automated where the CAF server inspects the incoming data, detects certain known formats, make pre-established assumptions about the corresponding subjects, predicates and objects based on the known format, and automatically load statements into the Duffle. Once the data has been loaded into a Duffle like this it can be referred to as "semantic" due to the fact that it has been modeled as a set of 3 word statements. Because all data, regardless of initial schema ends up in the same 3 word sentence semantic structure, it can be said to be schema-less. In this schema-less format combining two datasets is simply accomplished by appending the statements of one to the statements of another. Other constructs for a schema-less format may be employed in embodiments of the invention. The three-word sentence semantic structure is one example of a schema-less format.

Data in this schema-less semantic format can be immediately consumed by CAF Applications through the RDF Data Handler of the Duffle. In addition, End-User (120) and/or Designer (140) input (1270) can provide context-sensitive changes to the semantic data model which has the effect of manipulating the underlying graph representation. The resulting data graph that emerges from this sort of input is considered a Context-Sensitive Ontological Model (1280) because the input that has been provided by the End-User or Designer represents a particular knowledge system, a system of beliefs about the relationships and nature of entities, that is being applied to the particular data set, and that knowledge system informs the structure of the data graph onto which is it being applied. For example, data that is represented as the following two statements: Dave HasFather Rodney, Dave HasMother Stephanie, becomes Dave HasParent Rodney, Dave HasParent Stephanie, if an End-User informs the system that HasMother and HasFather are both equivalent to HaveParent. The effects of these sorts of semantic transformations based on an end-user driven dynamic ontology are shown from an End-User perspective in the following figure.

FIG. 13 shows the schema-less semantic data model from an End-User perspective from which their input can lead to a dynamically applied ontology that results in a fundamental change in the underlying data model.

Row and column data from a spreadsheet (1300) is transformed by a Remote Data Object Component into a schema-less semantic, graph-based data model (1260, 1280) and returned to a CAF Application which renders the data model visually as a set of labeled nodes and links between them (1320). In the left screenshot of the CAF Application the network shows the node labeled "Beth" twice (1330, 1340), even though there is a single row in the spreadsheet for Beth. This is because "Beth" appears twice in the data, once in the "Name" column of row 5, and once in the "Boss" column of row 7. When an End-User interacts with the CAF Application (1270), checking the box "Name" in a user-interface component (1350), an ontological rule (1280) is created in the data model which establishes the values in the "Name" column to represent unique entities and causes the underlying data model to rebuild its graph representation to reflect this. The result is the network shown in the second CAF Application screenshot, where the two separate "Beth"

nodes have been combined into a single "Beth" node (1360) linked to both Anne and Sue.

Figure 14:
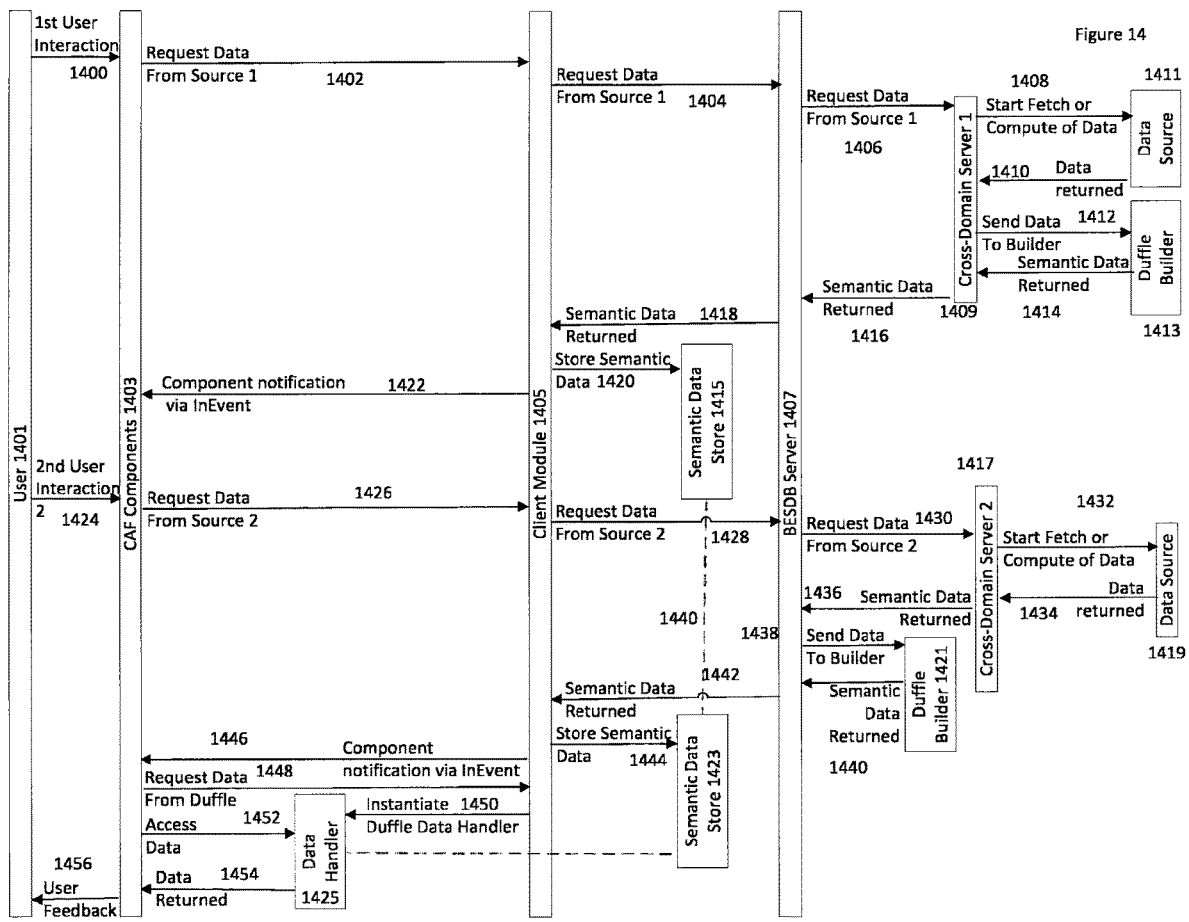
FIG. 14 shows the process through which Exaptive users request data from different sources and the data is normalized and returned to the semantic data store.

FIG. 14 shows the process through which Exaptive users request data from different sources and the data is normalized and returned to the semantic data store. In FIG. 14 the logical flow for communication between an End-User, a CAF Client, and the BESDB on a CAF Server is shown. A user interaction (1400, 1401) causes a CAF Component (1403) to request data from source 1 (1402) which exists in a different domain. This request is sent to the BESDB through a cascade of request relays: from CAF Component to CAF Client (1402), from CAF Client to BESDB (1404, 1405, 1407), and from BESDB to the appropriate CrossDomain Server (1406, 1409) via the CrossDomain Calling Engine shown in FIG. 11. Cross Domain Server 1 (1409) fetches the requested data (1408, 1411, 1410) and uses a Duffle Builder to normalize its data into a semantic format before returning it (1412, 1413, 1414, 1416), whereas Cross Domain Server 2 (1417), called in a similar cascading way (1426, 1428, 1430) as a result of a second user interaction (1425), returns its data in a native format (1432, 1419, 1434) and the BESDB Server (1407) uses a Duffle Builder (1421) to normalize it into a semantic format (1438, 1440)). In both cases the resulting semantic data is stored in the Schema-less Semantic Data Store (1442, 1444, 1423), which can reside either in-memory or on-disk, either on the client or on the server. The CAF Client (1405) notifies any CAF Components (1446) that have connections to the Data event of that Remote Data Component of the returned data (1446). Notified CAF Components can then access the returned data by requesting that the CAF Client Library instantiate a particular Data Handler (1450) and passes it back to the requesting CAE Component as the gateway to access the semantic data. This Data Handler (1425) has access to the data in the Duffle (1452), which is the combined semantic data from both cross-domain queries. In the case diagramed above the two queries were the results of two separate user interaction events, but they also could have been the result of a single user interaction event. By using the Data Handler (1425), the CAF Component (1403) can use specific data access functions (1452, 1454) in order to provide feedback to the user (1401) regarding the data returned (1456). In the flow shown in FIG. 14, this user feedback happens only after the second user interaction, but different DataFlow Definitions could result in user feedback after the first user interaction as well.

Figure 15A:
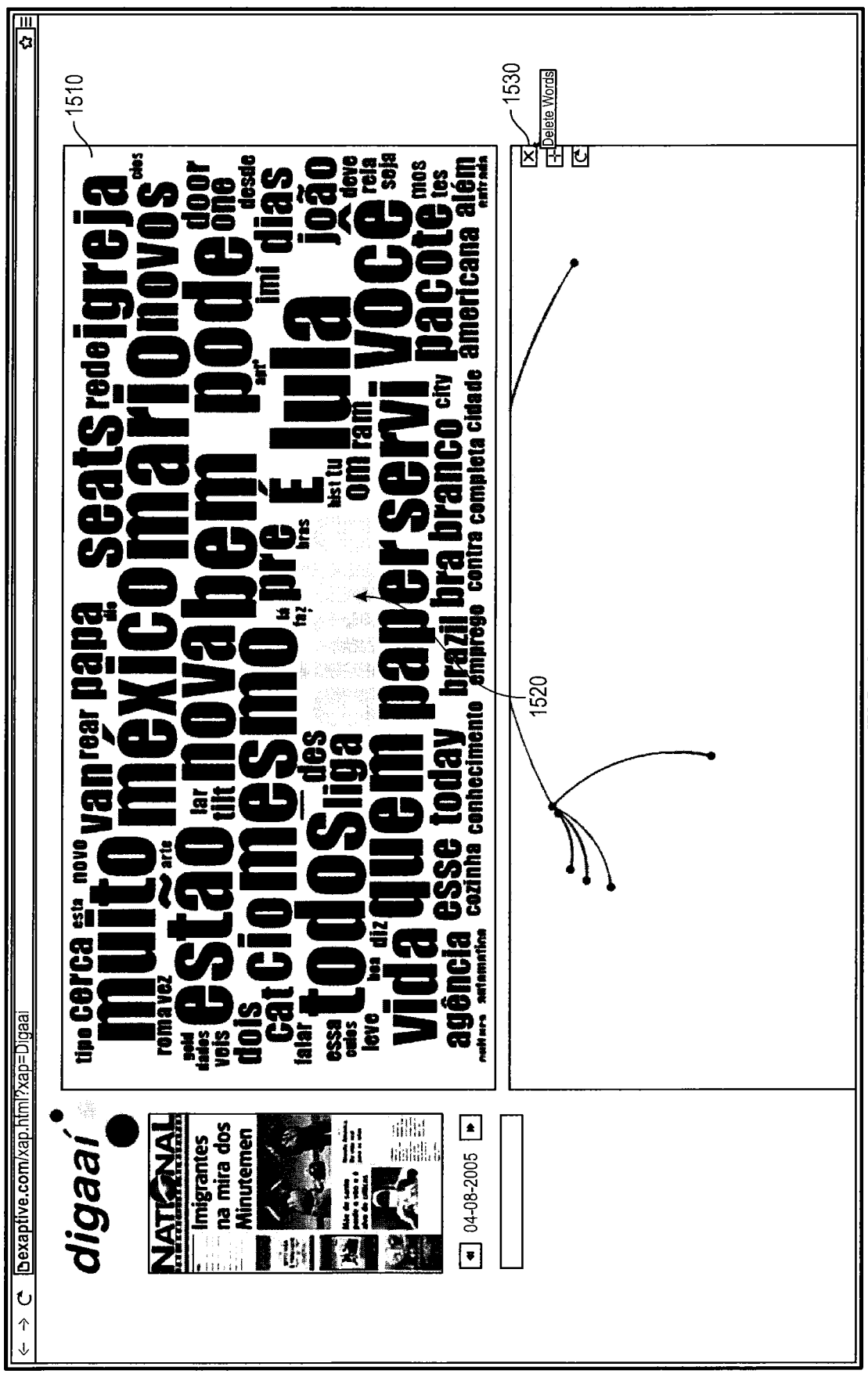
FIG. 15 shows from a user-interface how the RIDE, a configuration of the CAF, communicates in a bi-directional loop with the BESDB and EUA, other configurations of the CAF.
Figure 15B:
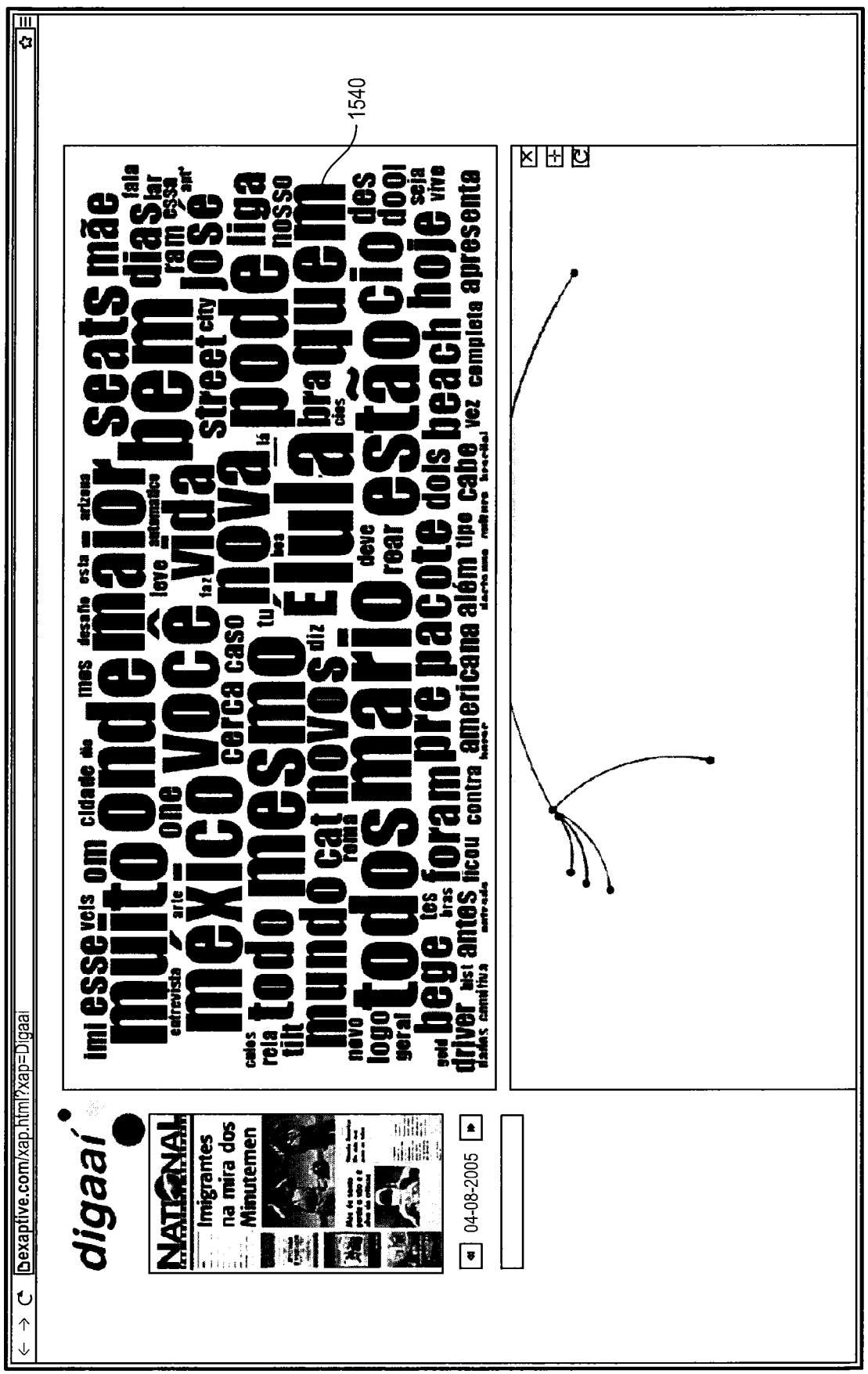

FIG. 15 shows from a user-interface how the RIDE, a configuration of the CAF, communicates in a bi-directional loop with the BESDB and EUA, other configurations of the CAF. The BESDB is called Bi-Directional because the architecture, which it uses for communicating with remote data sources, is not limited to being read-only. Using the same logical flow showing in FIG. 14, a CAF Component (1510) can raise an Event to a Remote Data Object Component (1520) which performs data-entry or data manipulation on the remote source. FIG. 15 shows the End-User perspective of this bi-directionality at work within a CAF Application. Portuguese words have been pulled from a database of words by the BESDB, placed into a Duffle, and rendered by a CAF Component as a Word Cloud (1510). The word "ainda" has been selected by the End-User (1520) and the "X" toolbar button has been clicked (1530). This sets off a DataFlow event chain which culminates in a CAF Remote Data Object Component receiving a data-entry request from the CAF Client with the data of the word "ainda". The CAF Remote Data Object Component processes this request by adding the word "ainda" to a database of words to ignore. This database is different than the database that holds the words being shown in the Word Cloud. After the data-entry is complete, the Remote Data Object Component returns a message to the BESDB which relays it back to the CAF Client, starting another DataFlow chain of events. This event chain causes the CAF Application to refresh—requesting the words to display from the first remote database and the words to ignore from the second remote database. The requests from both sources are transformed by through Duffle Builders into schema-less semantic data models, and this allows them to be packaged together in the same Duffle on the client. Now that the words to ignore include the word "ainda" it is excluded from the subsequent rendering of the WordCloud (1540).

Figure 16:
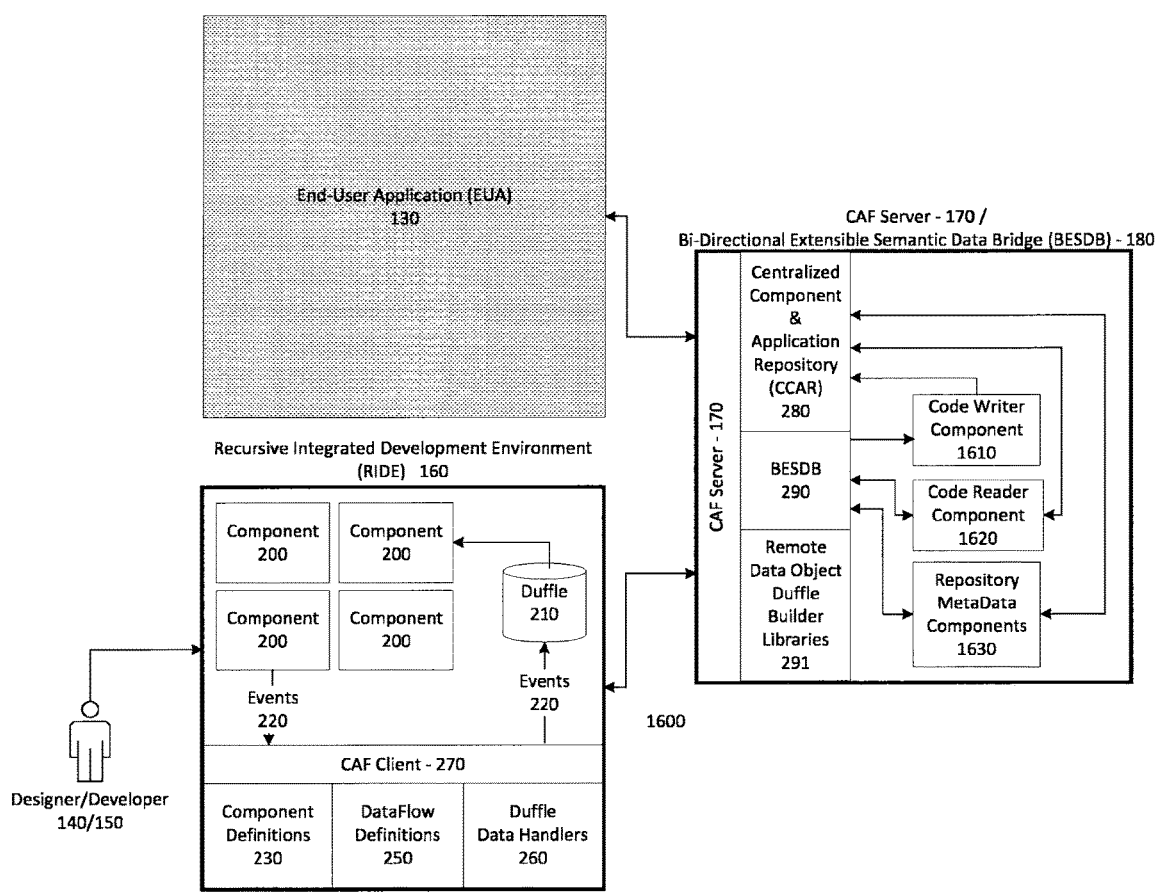
FIG. 16 shows the system architecture through which developers work in the RIDE to create application components, which are stored in a repository and can then be utilized as components in the RIDE.

FIG. 16 shows how the Recursive Integrated Development Environment (RIDE) (160) is recursive in that it is a CAF Application itself, made up of CAF Components, with the capability to edit CAF Components, including the ones from which it is composed. As such, the RIDE can be used to change the functionality of the RIDE. The BESDB makes the recursivity of the RIDE possible in that the components in it can write data as well as read data. The RIDE uses the BESDB (180) to communicate with Remote Data Object Components that both read and write code files, as well as metadata about code files, to the Centralized Component Application Repository (280) Without the ability to write data, the RIDE could not edit components and thereby be a development environment.

The Code Writer Components (1610) are CAF Remote Data Object Components that take data representing CAF code that are the result of DataFlow events on a CAF Client and persist them as code files in the Centralized Component Application Repository (280).

The Code Reader Components (1620) are CAF Remote Data Object Components that read code files in the Centralized Component Application Repository and pass data about the code within those files back to a CAF Client via CAF events (220).

The Repository MetaData Components are CAF Remote Data Object Components that read, write, and/or update data about the code files in the Centralized Component Application Repository.

Figure 17:
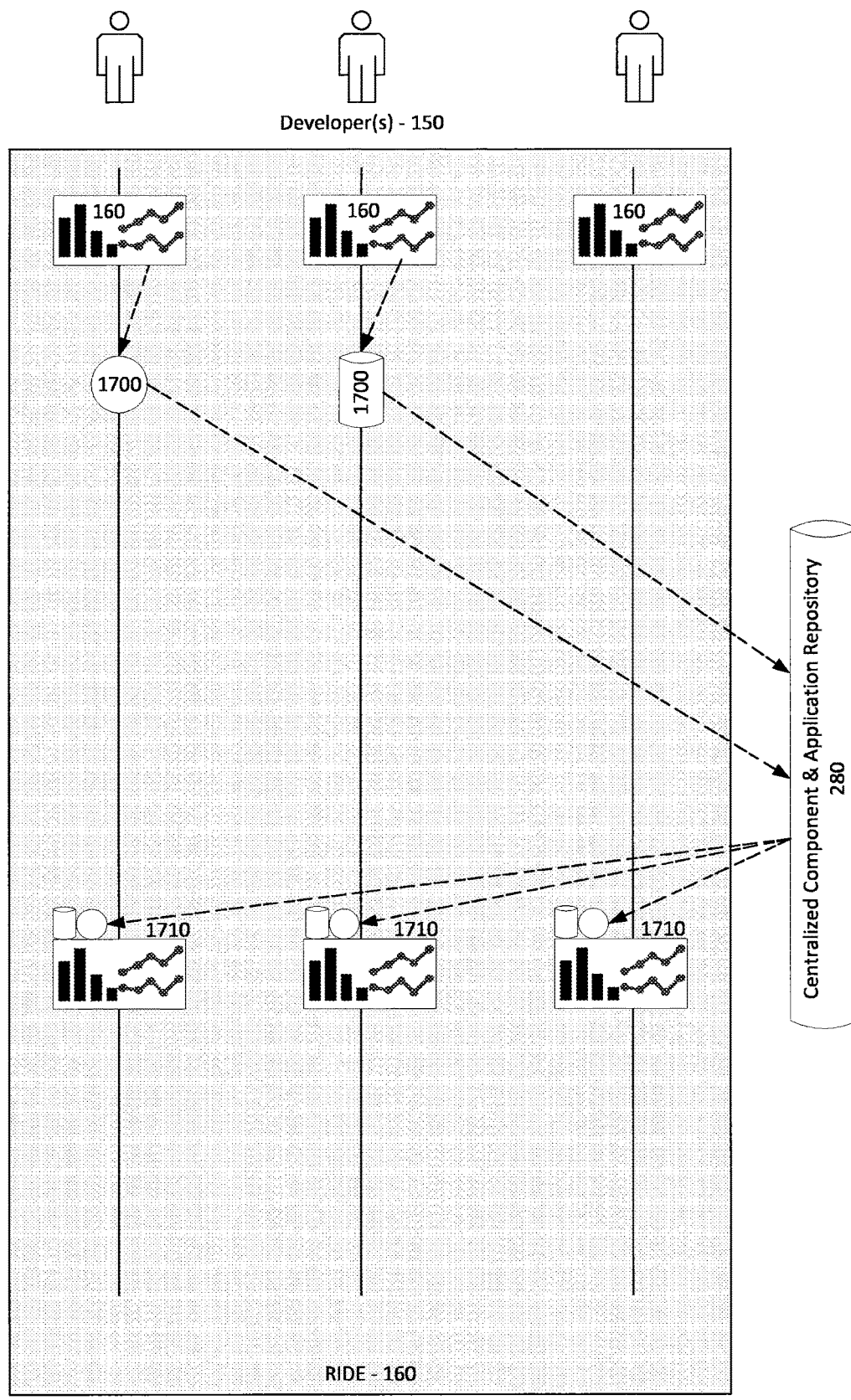
FIG. 17 is the logical flow shows the user interface of the RIDE initialized.

FIG. 17 shows the logical flow in which Developers (150) use a RIDE (160) application to create CAF Components (1700) and place them into the CCAR (280). These CAF Components can then be pulled out from the CCAR and placed inside the CAF Application Definition of the RIDE to expose new IDE functionality (1710). Improvements to existing components are immediately available in the RIDE. New components need to be wired into the RIDE to become available.

Figure 18:
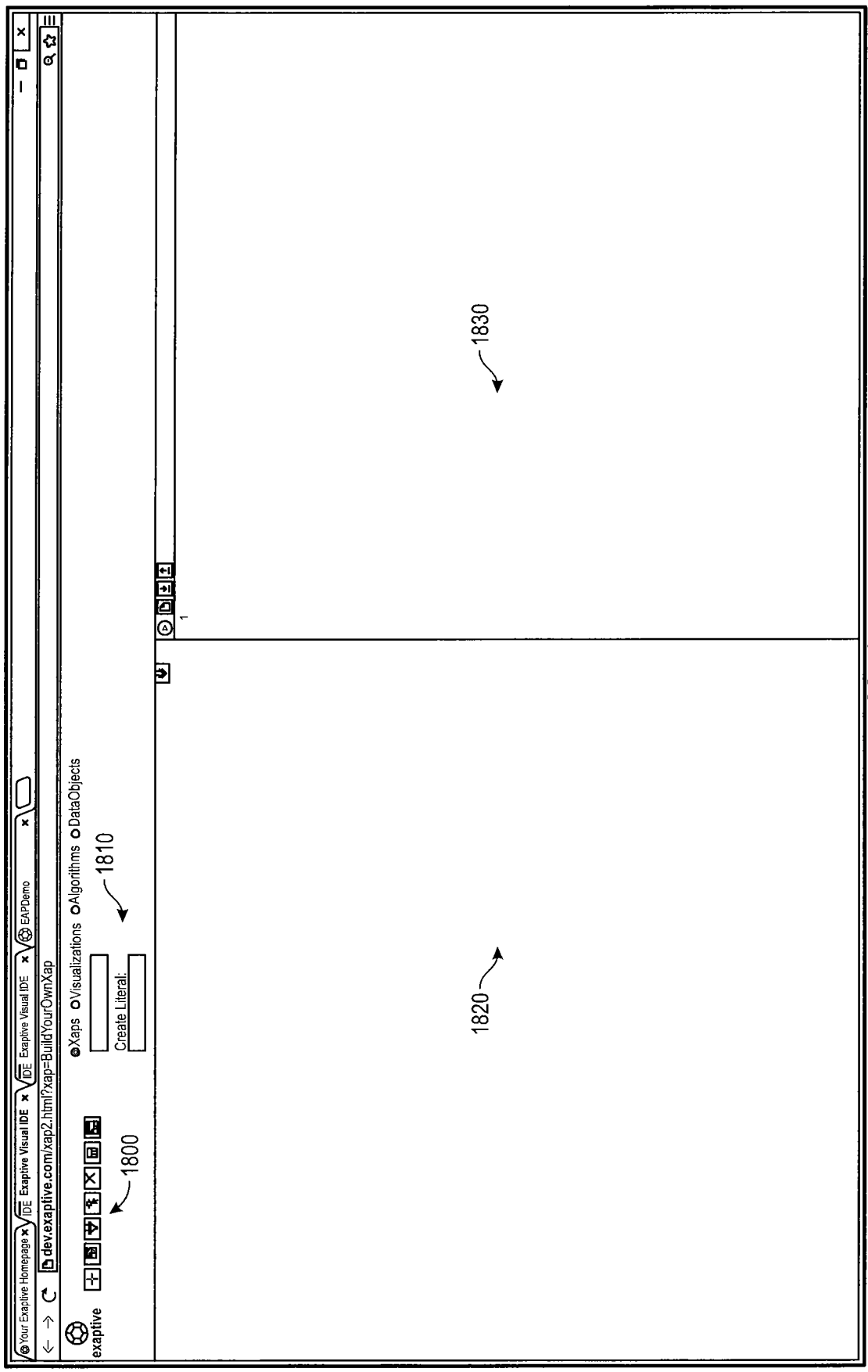
FIG. 18 shows the user-interface of the RIDE initialized.

FIG. 18 shows one implementation of a RIDE from an End-User perspective. This implementation is comprised of a toolbar (1800), a search interface (1810), a dataflow canvas (1820), and a code editor (1830), all of which are CAF Components. Because RIDEs are just CAF Applications, they benefit from the combinatorial nature of the CAF architecture, and can therefore be implemented in a wide variety of ways based on different CAF Component combinations and DataF low connections.

Figure 19:
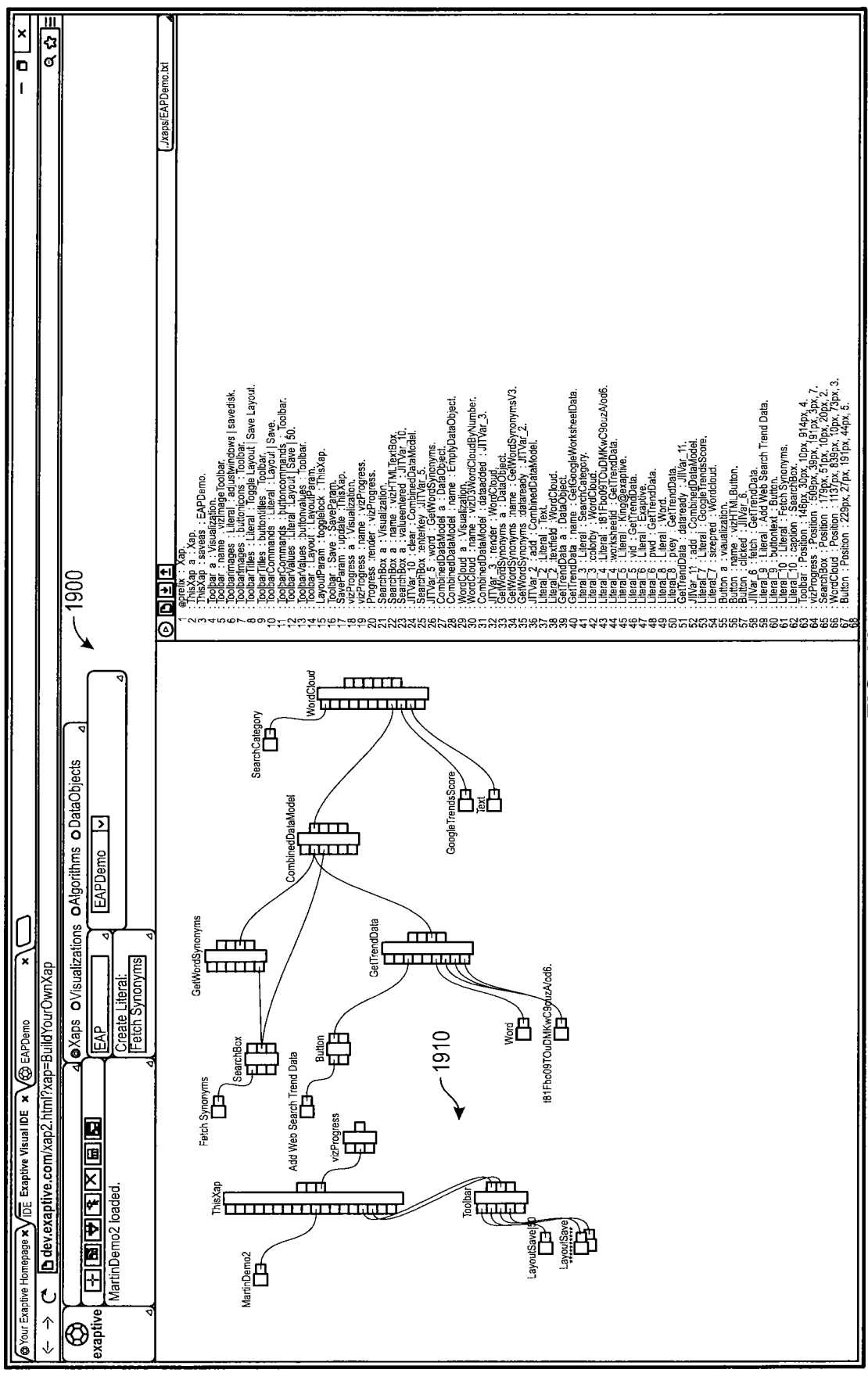
FIG. 19 shows the web-based user-interface of the separate application components that comprise the webpage that is the RIDE interface.

FIG. 19 shows the RIDE as a set of CAF Components where each individual CAF Component is identified by the fact that it has a black border around it (1900) within the CAF Application. These Components are all wired together (1910) through a CAF DataFlow Definition to communicate with Code MetaData Remote Components, Code Writer Remote Components, and Code Reader Remote Components, as showing in FIG. 16. The result is a CAF Component based application that can allow developers and designers the capability to write other CAF Components and CAF Component based applications.

Figure 20:
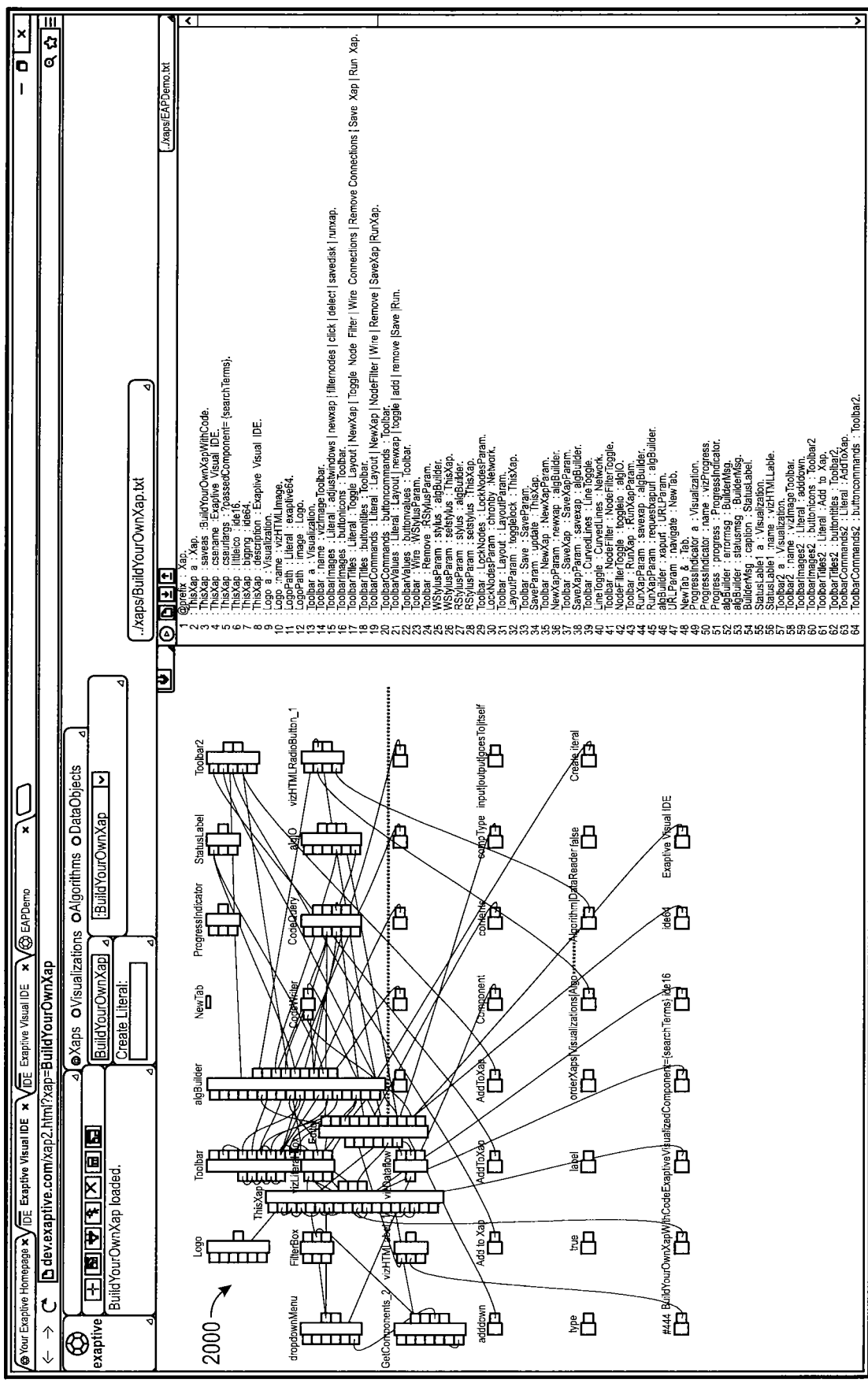
FIG. 20 shows the user-interface perspective of the component blueprint of the RIDE itself as a particular configuration of components "wired" together in the RIDE.

FIG. 20 illustrates the recursive nature of the RIDE, as described in FIGS. 16 and 19. The figure is a screenshot of the RIDE (2010), a web-based application consisting of a number of components contained in windows with black borders. The CAF application components shown wired together (2000) in visual form on the left and in code form on the right compose the RIDE itself, the same components seen in the form of a web-page (2010). The RIDE user has accessed the CAF Application Blueprint of the RIDE itself, which is composed of components available for use within the RIDE.

Figure 21:
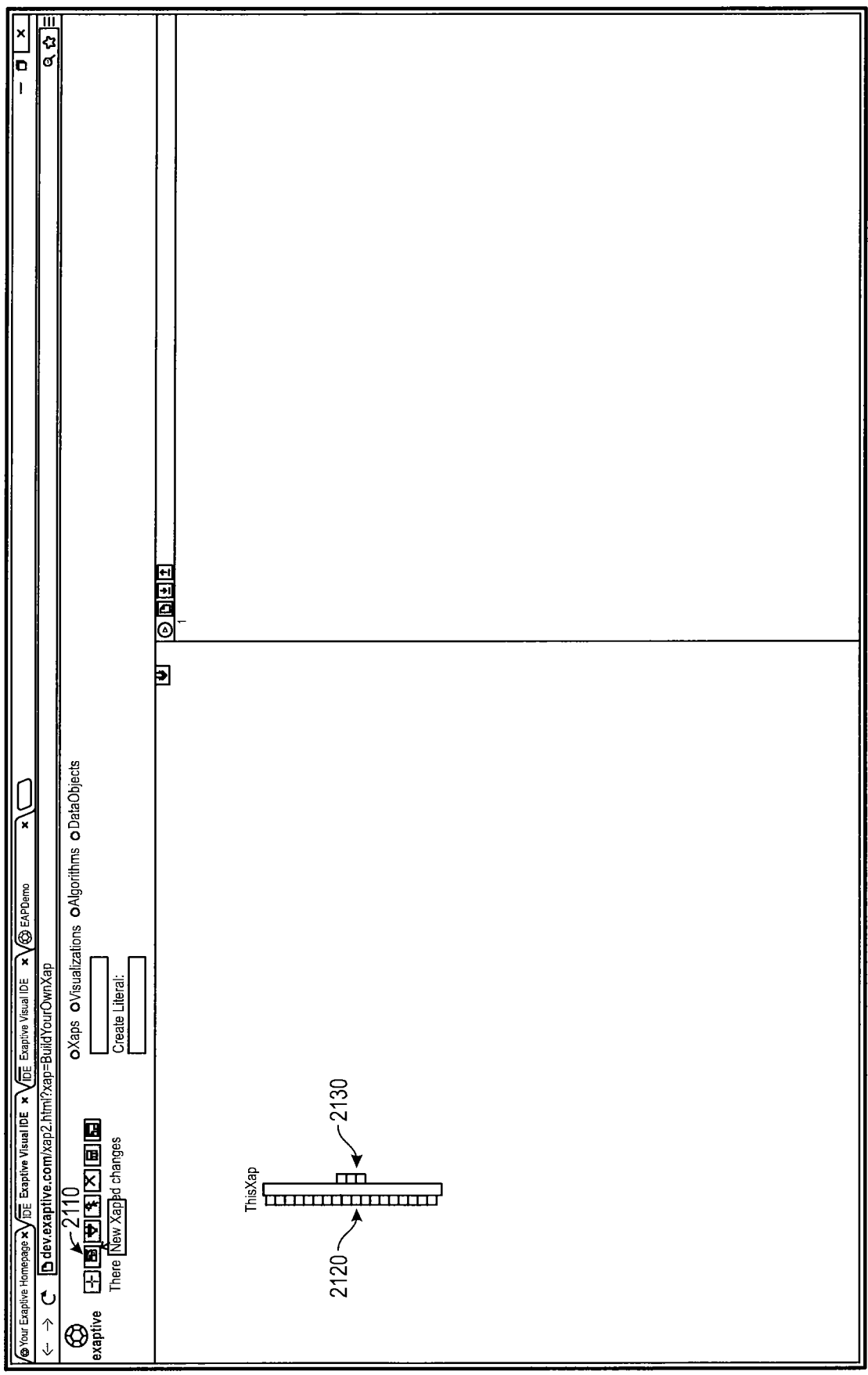
FIG. 21 shows the RIDE user-interface visually creating the first component for a new CAF application.

FIG. 21 shows the RIDE being used to create a new CAF Application. As a result of the End-User clicking the "New Xap" button on the toolbar (2110), a new CAF Application Definition is created in-memory and represented by another CAF Component as a block with input ports (2120) and output ports (2130). These inputs and outputs represent InEvents and OutEvents that can be specified in a DataFlow Definition.

Figure 22:
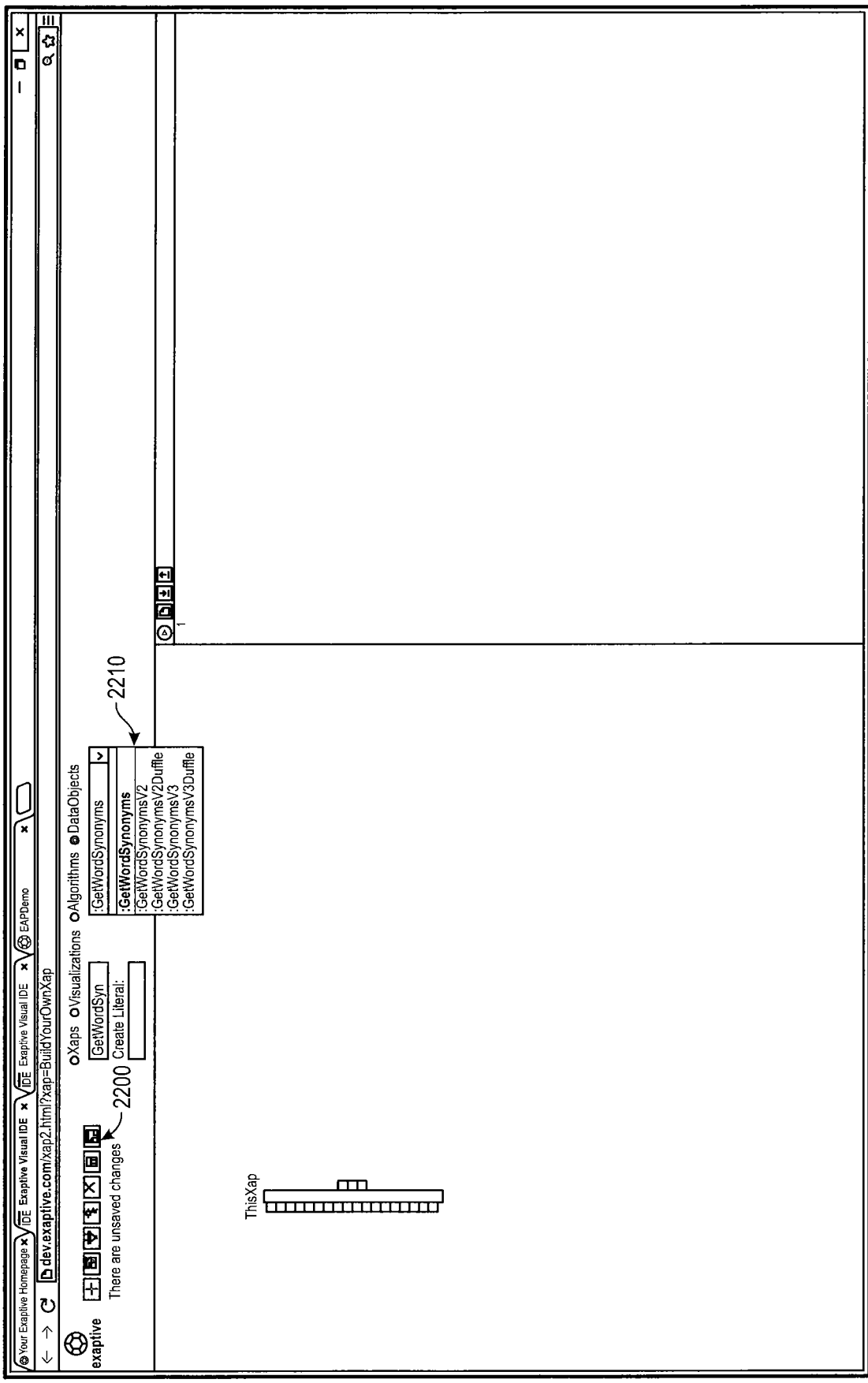
FIG. 22 is the user-interface of how a new component is searched for, selected and added to the new application using a text box search and a drop-down menu in the RIDE.

FIG. 22 shows an End-User perspective of using the RIDE to perform CAF Component Selection. The dropdown list (2210) is populated with CAF Components returned by a Repository MetaData Component that is triggered by the entry of text in the text box (2200).

Figure 23:
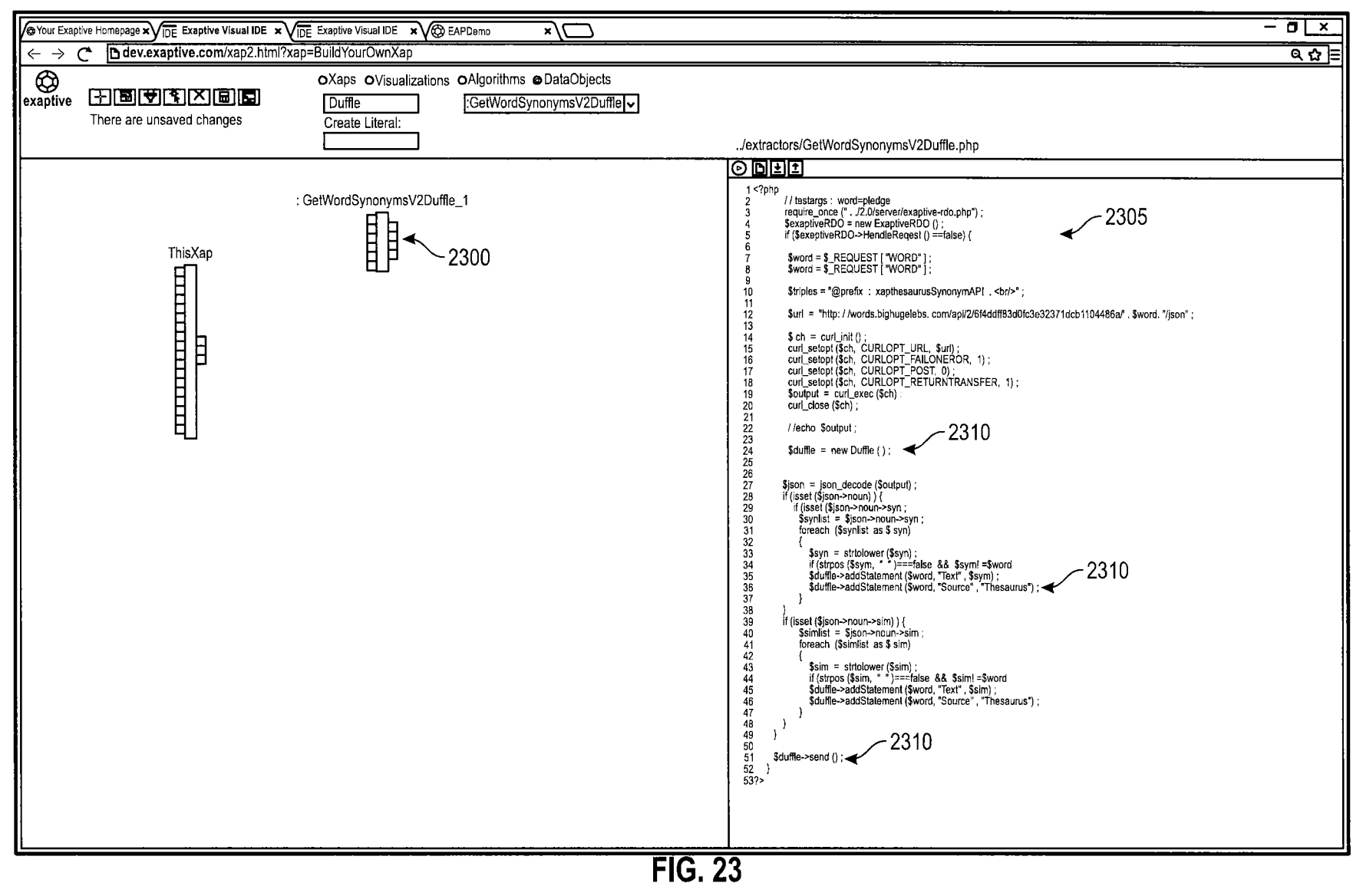

FIG. 23 shows the End-User perspective when a CAF Component is selected from the dropdown list as in FIG. 22. A new block appears in the dataflow canvas (2300) to represent the selected CAF Component, and the code for that Component is shown in the code editor (2305). This component is a Remote Data Object Component, and within its code shown in the code editor one can see the use of a Duffle Builder Library to transform data from a remote source into a schema-less semantic data model through the use of the addStatement function of the Duffle Builder Library (2310), as described in FIG. 12. Once in the dataflow canvas, the Remote Data Object can be incorporated into the CAF Application that the user is building.

FIG. 24 shows the source website (2400) from which the Remote Data Object Component shown in FIG. 23 queries for data.

FIG. 25 shows the native JSON data format (2500) returned by the Big Huge Thesaurus website (2510) shown in FIG. 24. The Big Huge Thesaurus web service takes a word and returns a list of synonyms. In this case we have called the web service with the word "car" and received a list of synonyms like automobile, compartment, etc. (2520).

Figure 26:
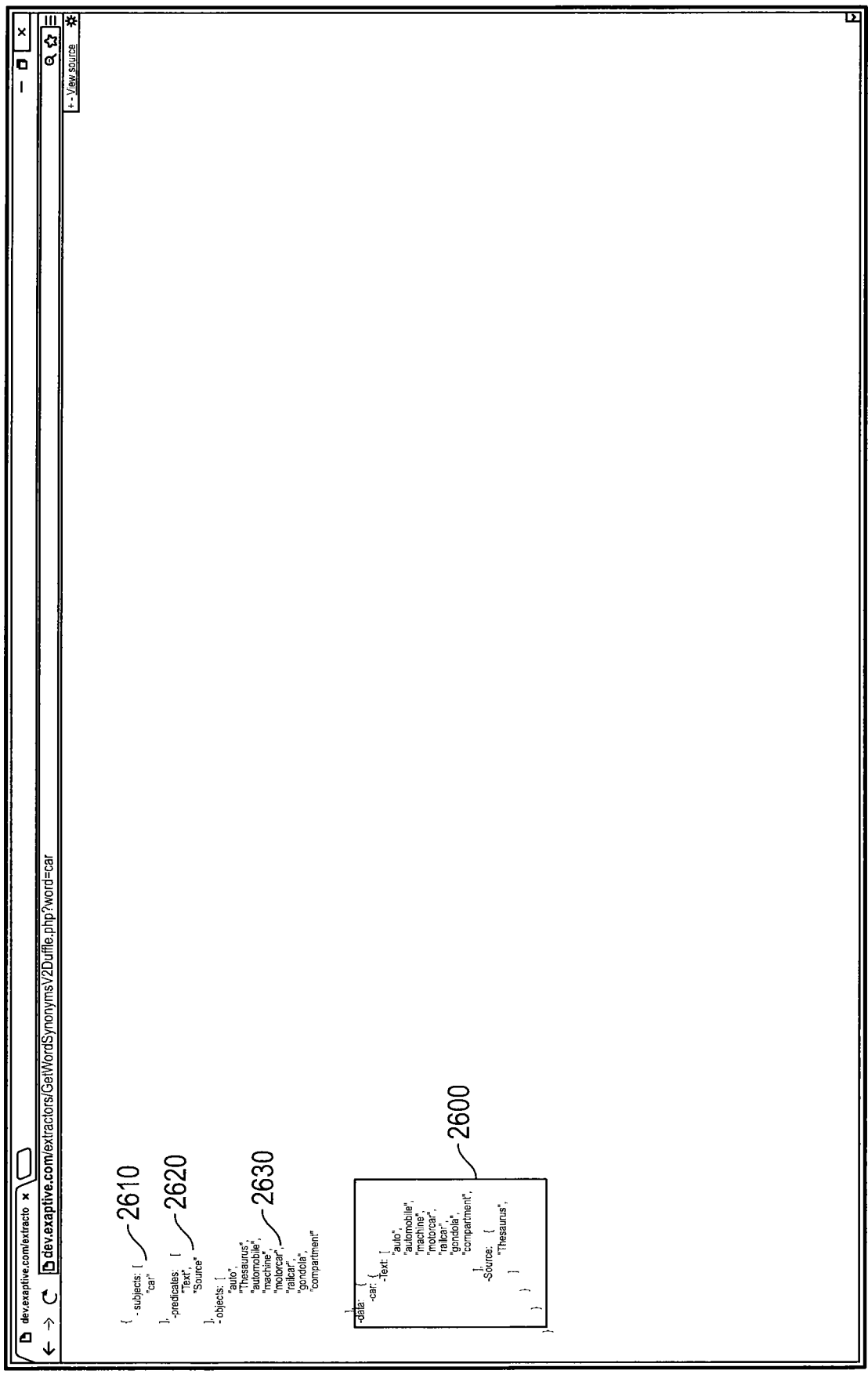
FIG. 26 shows the user-interface perspective of the online thesaurus data converted into semantic format.

FIG. 26 shows the data from FIG. 25 after transformation into a schema-less semantic data format (2600) through the use of a Duffle Builder Library, as described in FIG. 12. The data shown in this figure can be seen to observe the subject (2610)-predicate (2620)-object (2630) model also discussed in FIG. 12. The exact implementation of the subject-predicate-object representation can vary.

Figure 27:
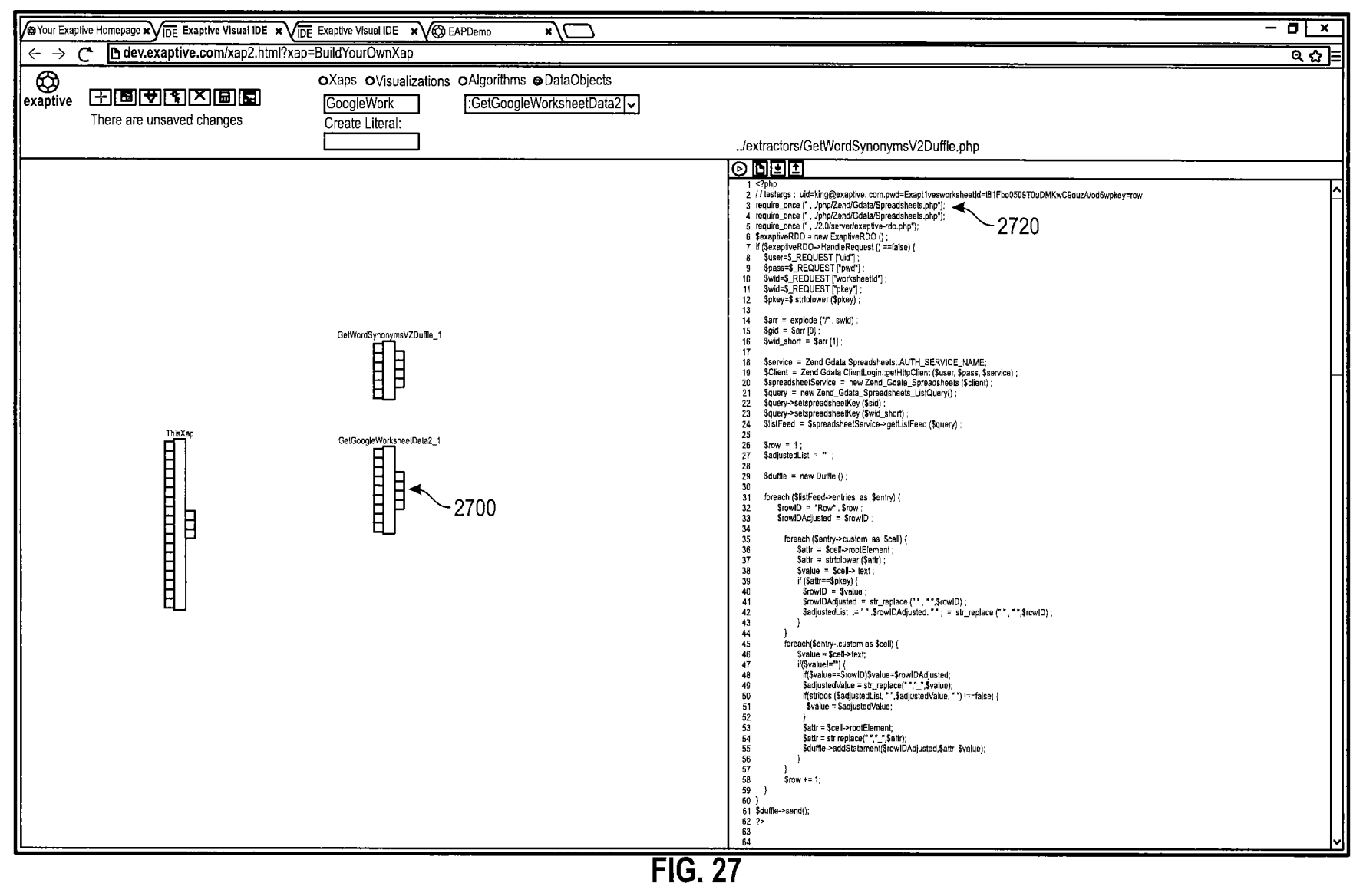

FIG. 27 shows the RIDE being used to add a second CAF Remote Data Object Component (2700) to the CAF application being built in the RIDE. The code (2720) for this second Component also shows that it is using a third-party library (ZEND) to pull data from a spreadsheet stored on Google Drive, and then using a Duffle Builder Library to normalize data to a schema-less semantic data format, as described in FIG. 12.

FIG. 28 shows the ZEND third-party library data in the Google Doc Spreadsheet which the CAF Remote Data Object is configured to access. This data contains information about various words that are searched for on the internet. The second column of data (2800) contains a score for how popular a given word is in internet searches, and the third column (2810) contains the text either "Enterprise" or "Consumer" to represent something about the demographic population searching for a particular word.

Figure 29:
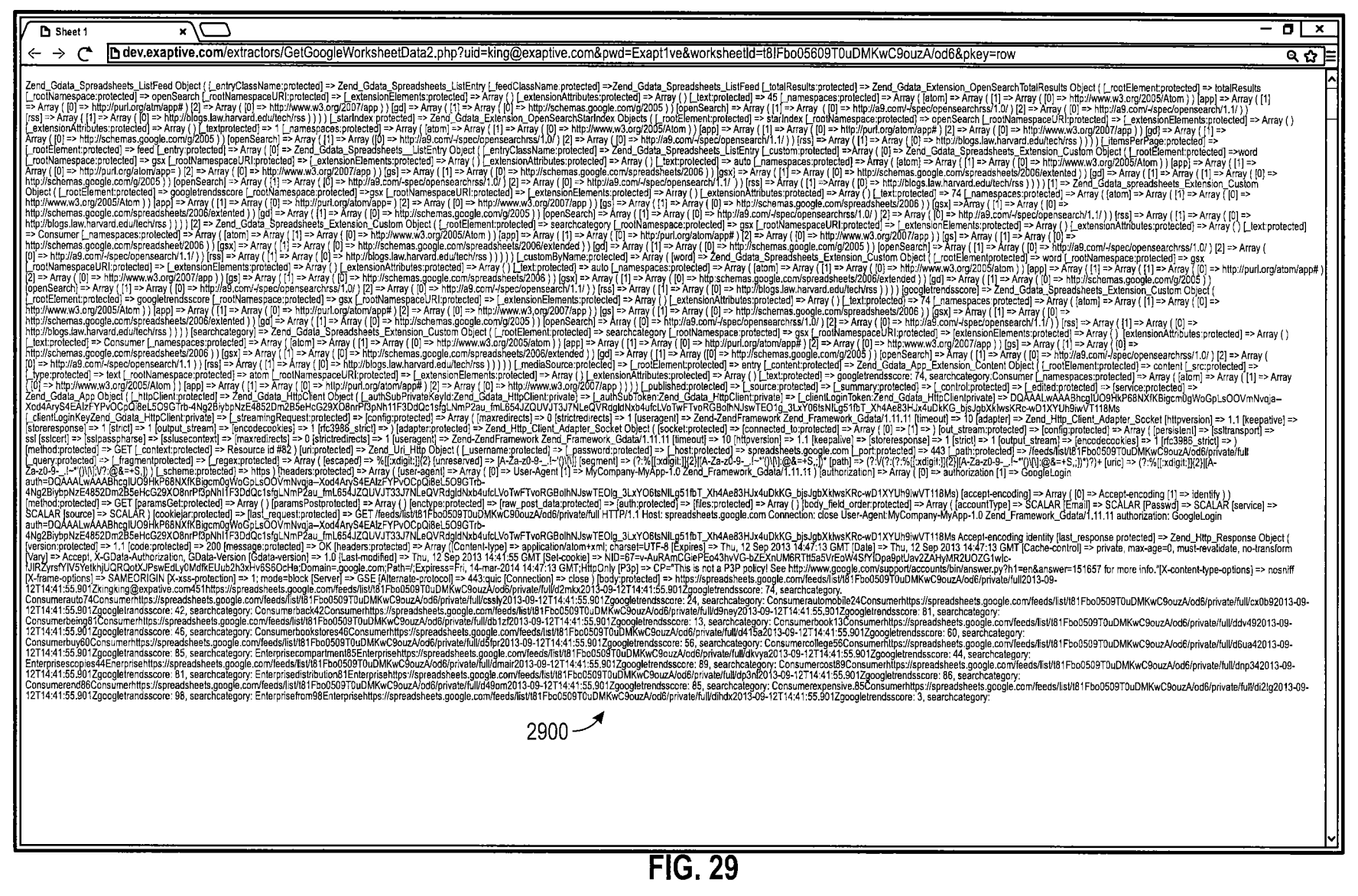

FIG. 29 shows the native data format (2900) returned by the Zend code library that is used by the CAF Remote Data Object Component to access the data contained in the spreadsheet shown in FIG. 28.

Figure 30:
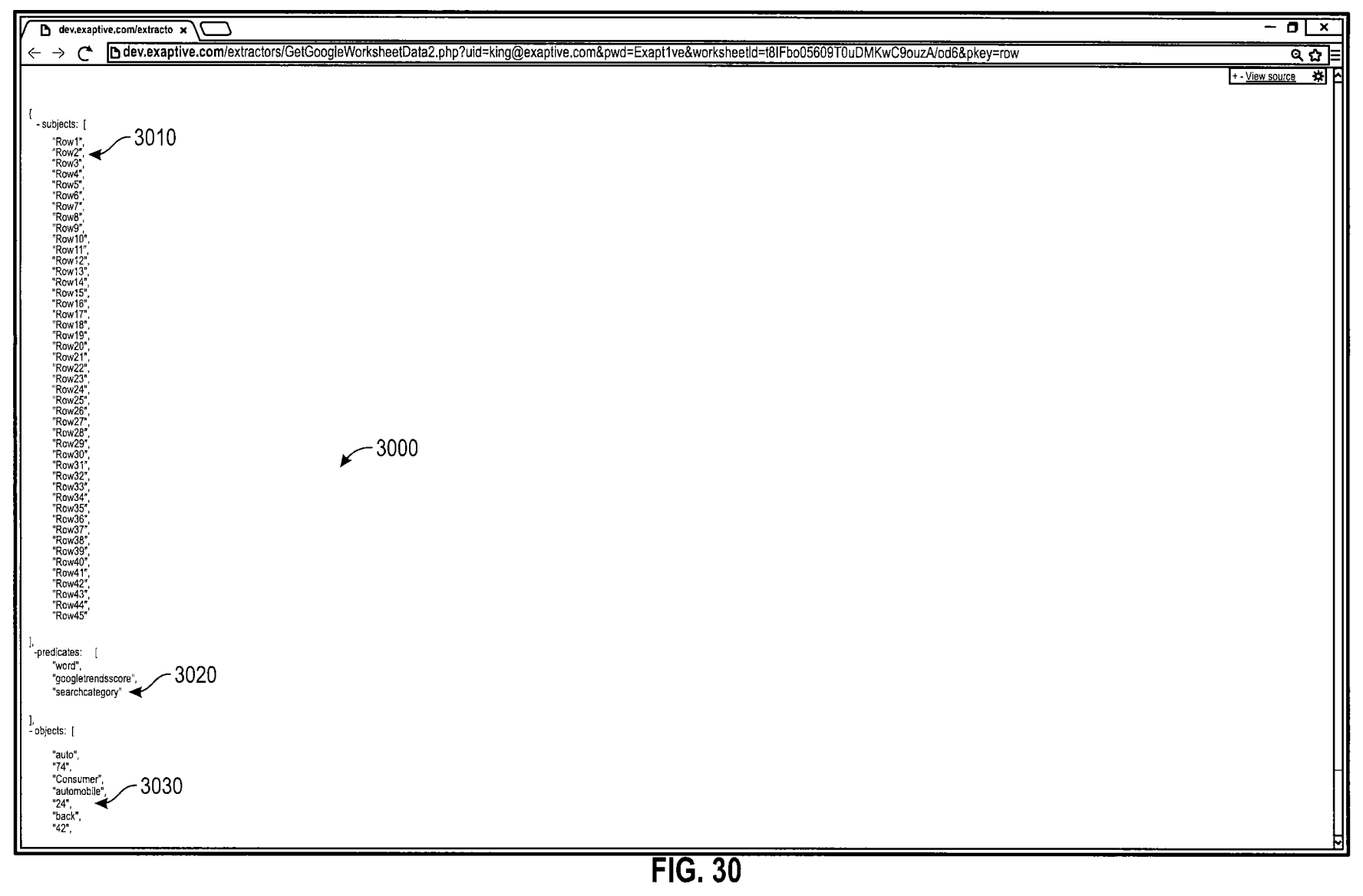

Like in FIG. 26, FIG. 30 shows the data from FIG. 29 after transformation into a schema-less semantic data format (300) through the use of a Duffle Builder Library, as described in FIG. 12. The data shown in this figure can be seen to observe the subject (3010)-predicate (3020)-object (3030) model also discussed in FIG. 12. The exact implementation of the subject-predicate-object representation can vary.

Figure 31:
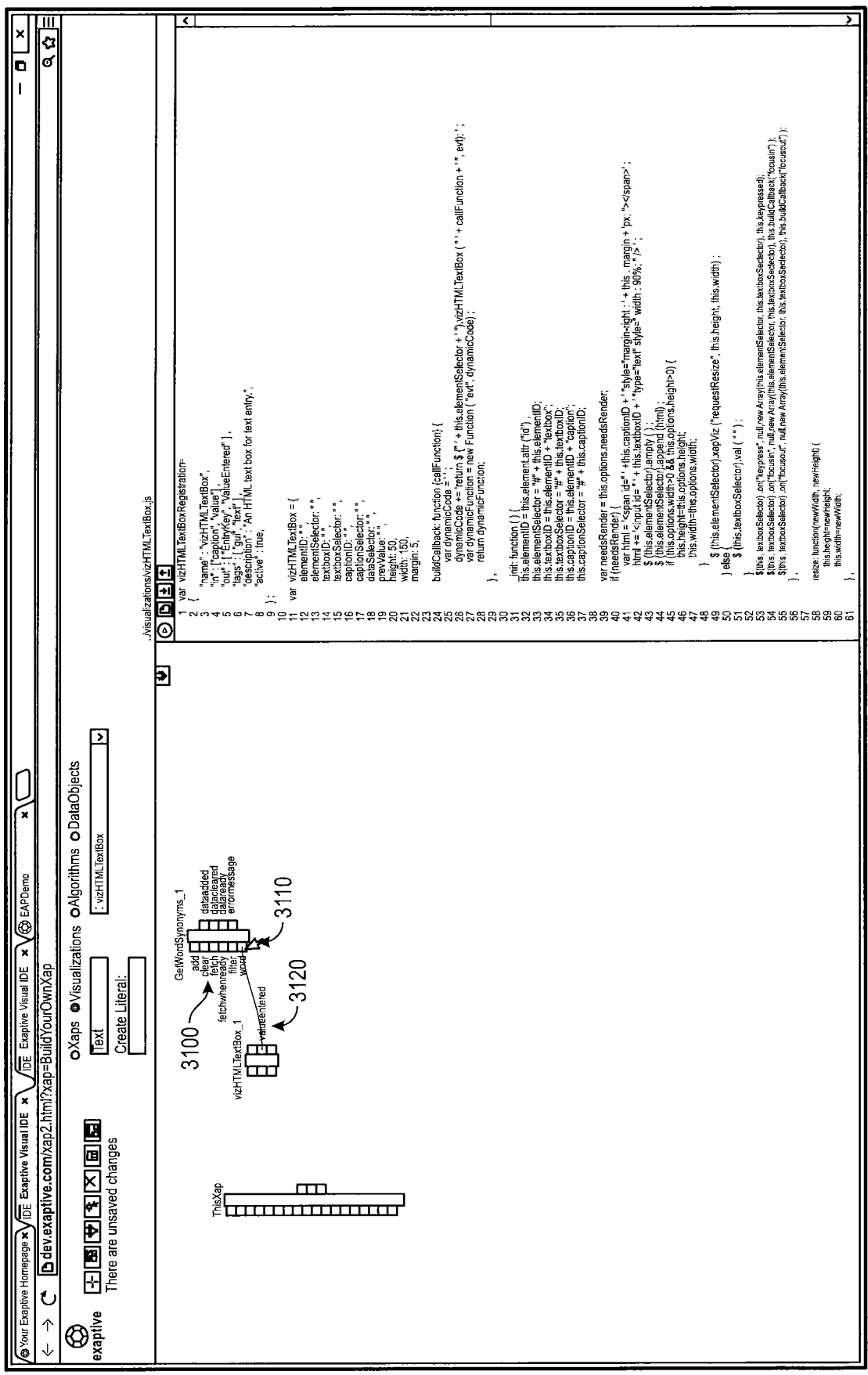
FIG. 31 shows components in the RIDE user-interface being visually connected to work together in the application.

FIG. 31 shows the RIDE being used to "wire" (3100) the output port (3120) of one CAF Component to the input port (3110) of another CAF Component. This wiring creates a DataFlow Definition, which along the Component Definitions, form the Blueprint of a CAF Application. This wiring functionality is used in FIG. 32 to create a complete CAF Application that synthesizes the two data sources that have been shown in FIGS. 23-30.

Figure 32:
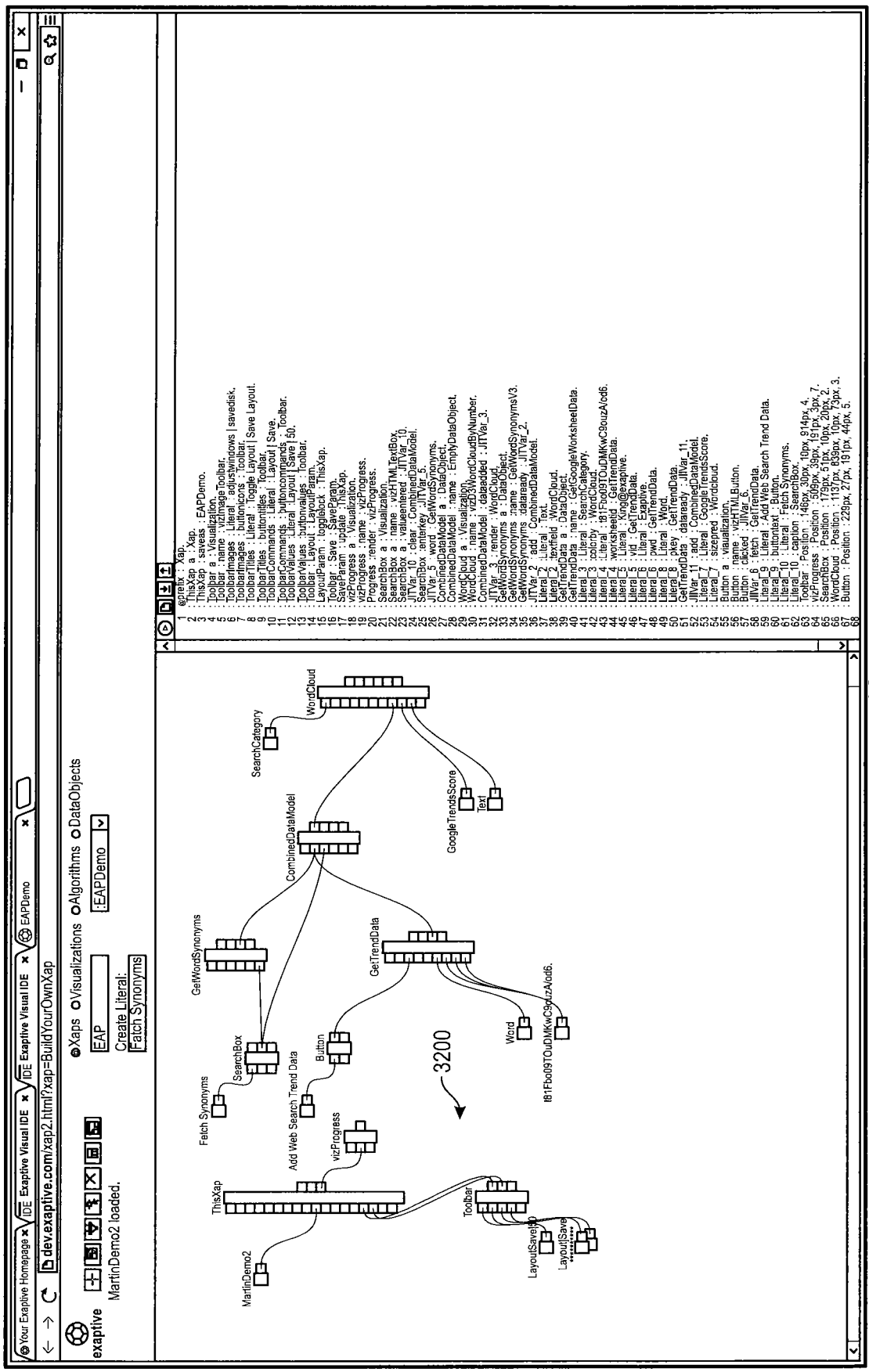
FIG. 32 shows in the RIDE user-interface a complete application built from interconnected components that were built with no knowledge of each other and remain loosely coupled and highly agnostic to how they are connected.

FIG. 32 shows the RIDE having been used to create a complete CAF Application (3200) that synthesizes the two data sources that were explored in FIGS. 23-30. In addition to the three components seen in FIG. 31, the application now has a tool bar, a progress indicator, text boxes, a button for activation of second data object, data object aggregation, word cloud, plurality of configuration values, all represented in component form with inputs and outputs and "wiring" connecting them.

Figure 33:
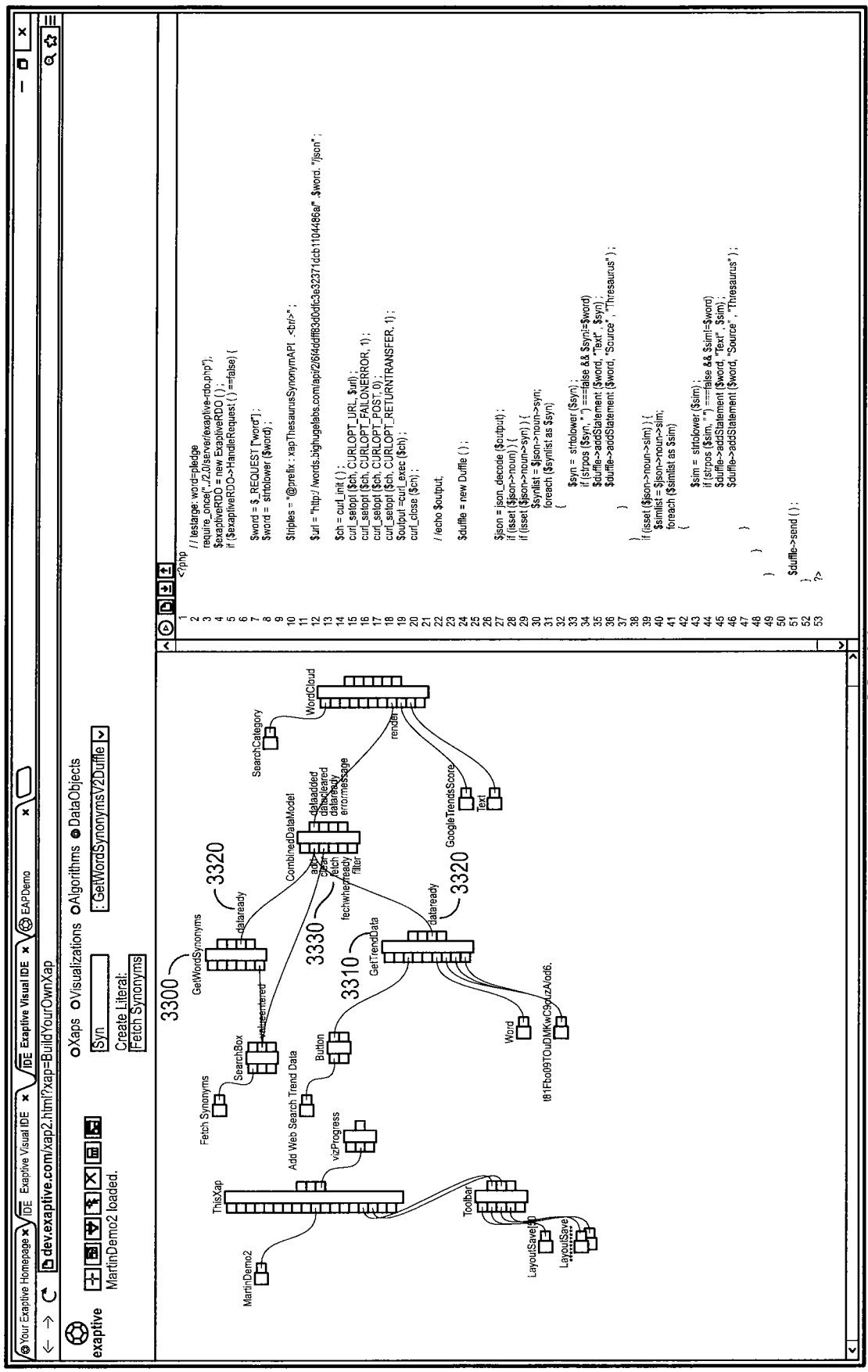
FIG. 33 is the RIDE user-interface highlighting the synthesis of data objects in the visual development environment for use in the application being built

FIG. 33 shows the same CAF Application as in the previous figure, but highlights in red the aggregation of data from the first CAF Remote Component (3300), the thesaurus component, with the data from the second CAF Remote Component (3310), the spreadsheet of internet search word information. The DataReady OutEvent from both of these Remote Components (3320) is connected to the Add InEvent of a third CAF Component (3330). Because both data sources have been normalized via Duffle Builders into a schema-less semantic format, the aggregation of both datasets is a straightforward concatenation of the statements from both sources.

Figure 34:
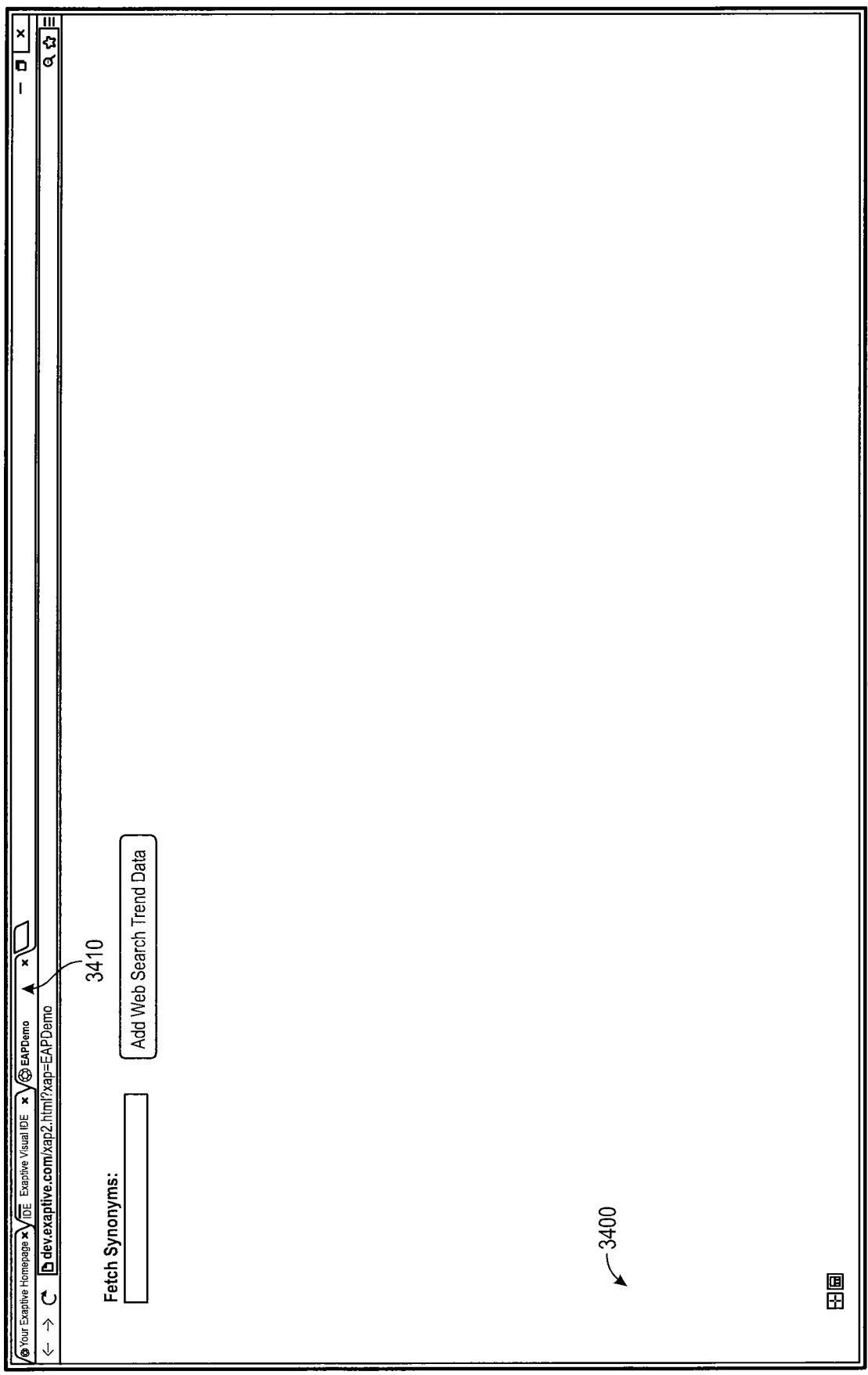
FIG. 34 shows the user-interface of the EUA initialized after being built in the RIDE.

FIG. 34 shows the End-User Application (3400) produced by the RIDE in the previous figure and stored in the Centralized Component and Application Repository. After being saved by the RIDE, the CAF Application can be accessed as a standalone web-page (3410) as described in FIG. 5.

Figure 35:
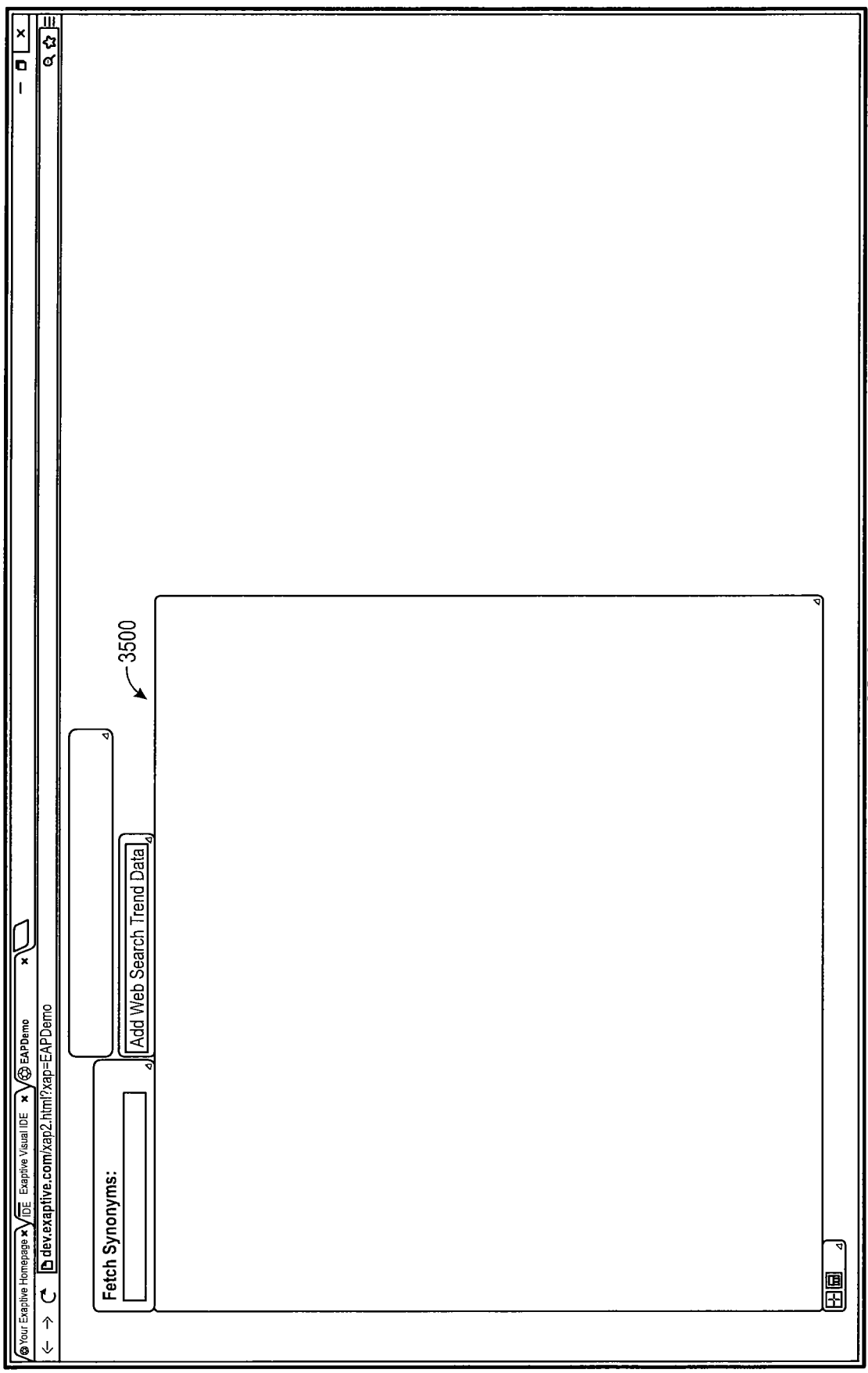
FIG. 35 shows the user-interface of the EUA as separate components that were connected in the RIDE.

FIG. 35 shows the component-based nature of the CAF Application produced by the RIDE. Each individual CAF Component that has a visual interface is represented in the web-page with a black border (3500).

Figure 36:
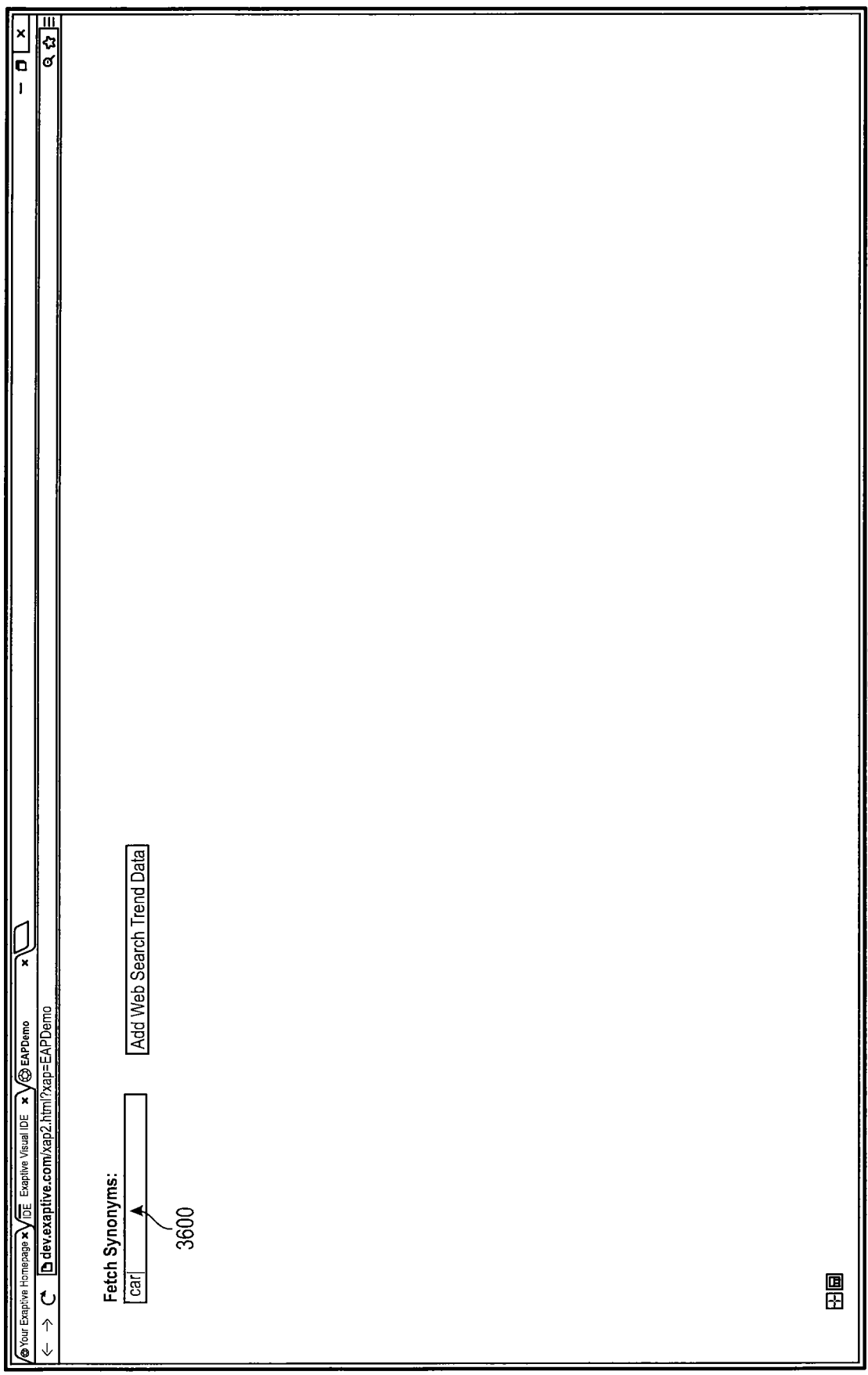
FIG. 36 shows the user-interface perspective of the end-user querying the online thesaurus data through the EUA for synonyms of the word car.

FIG. 36 shows the End-User using the CAF Application produced by the RIDE, by entering the word "car" into the text box CAF Component (3600). Hitting return in this text box will cause the CAF Component to raise a "ValueEntered" OutEvent, which will be handled by the CAF Client in accordance with the DataFlow Definition created in the RIDE to cause actions in other CAF Components.

Figure 37:
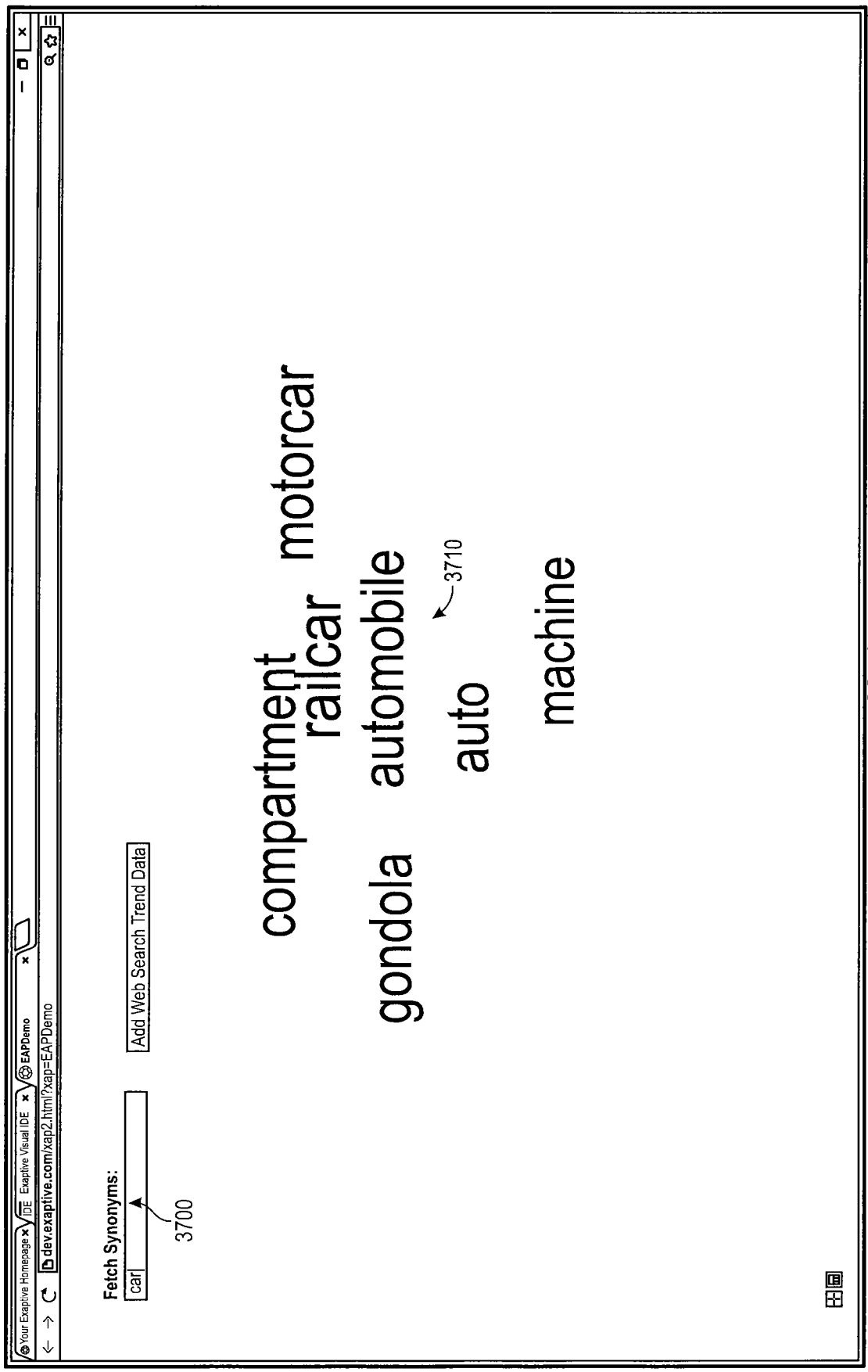
FIG. 37 displays the results of the end-user interface of the end-users search query in a data-visualization called a Word Cloud.

FIG. 37 shows the result of the End-User entering the word "car" in the text box (3700) of the CAF Application produced by the RIDE and hitting return. That user action resulted in the text box CAF Component raising an Out-Event that was routed by the CAF Client, according to the DataFlow that was wired in the RIDE, to an InEvent on the first CAF Remote Data Object Component. Because the recipient component was a Remote Component, the CAF Client used the CAF Server and BESDB to execute the code defined for that Component. This resulted in a CrossDomain call to the Big Huge Thesaurus web service, normalization of the returned data into a schema-less semantic format by the Duffle Builder Library, and the transmission of this normalized data back to the CAF Client. The return of data from the Remote Component back to the CAF Client created another CAF Event chain in which, in accordance with the DataFlow, the CAF Client packaged the returned data into a client-side Duffle Object and sent it to the "Render" InEvent Handler of the CAF WordCloud Component. The CAF WordCloud Component used a RDF Data Handler to access the information in the Duffle and used that information to render a WordCloud (3710) of the synonyms returned by Big Huge Thesaurus for the user-entered word "car". It is important to note in this figure the lack of different colors in the WordCloud, and the lack of any variation in the size of the words. All the words are the same size and the same color grey.

Figure 38:
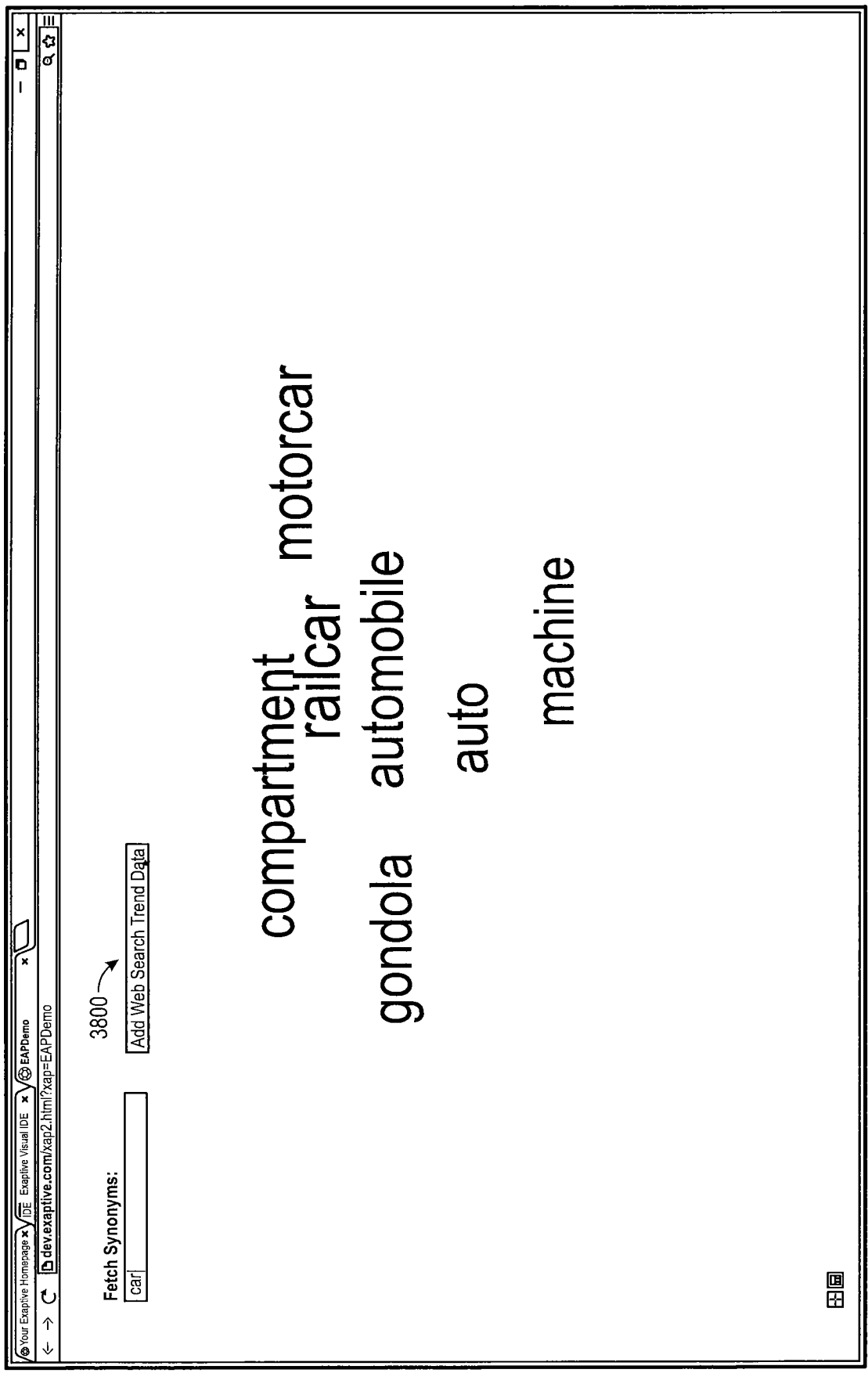
FIG. 38 shows the user-interface perspective on the end-user retrieving data about the prevalence of the synonyms of car in Google searches.

FIG. 38 shows the End-User clicking on a button captioned "Add Web Search Trend Data" (3800) in the CAF Application that was created by the RIDE in FIG. 32. This button click event causes a DataFlow chain of events just like the chain of events described in the previous figure, except in the DataFlow Definition this chain of events leads to the execution of the code in the second CAF Remote Data Object Component, the one that accesses the spreadsheet data shown in FIG. 28.

Figure 39:
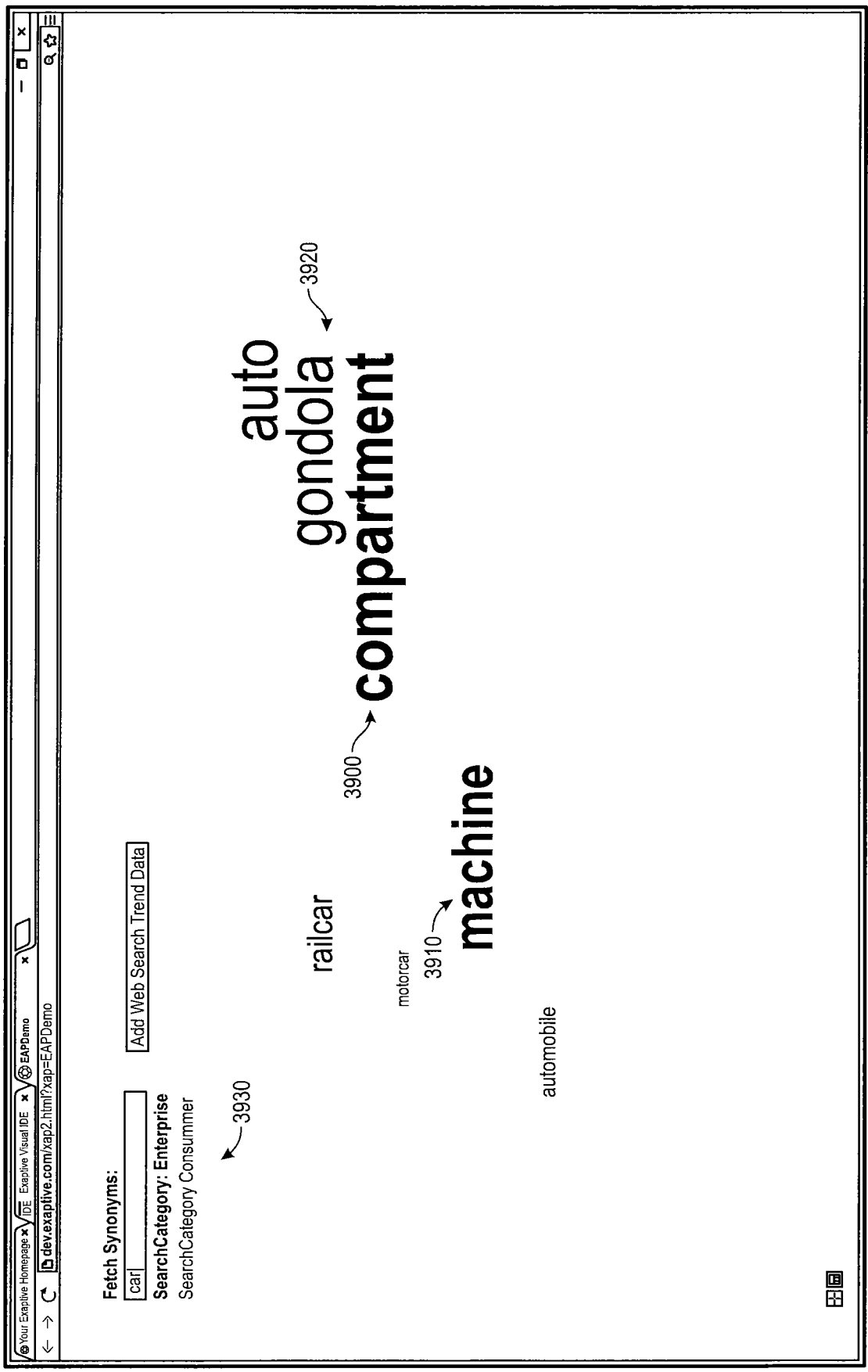
FIG. 39 shows the results from an end-user perspective of the synthesis of the two data-sources, via the semantic data bridge, in one visualization, the Word Cloud.

FIG. 39 shows the result of the DataFlow chain of events started by the button click of FIG. 37. The spreadsheet of data shown in FIG. 28 has been queried by a CAF Remote Data Object, the data normalized into a schema-less semantic data format, and returned to the CAF Client, causing the CAF Client to package it in a Duffle, send it to another CAF Component to aggregate it with the previous schema-less semantic data returned by the Big Huge Thesaurus Remote Data Object, then resulting in the aggregated data being sent to the "Render" InEvent of the WordCloud, causing the WordCloud to redraw (3900). It is important to note that the words in the WordCloud Component now show variation in both size (3910) and color (3920, 3930) unlike in FIGS. 37 and 38. This is because the CAF Application Definition that was created by the RIDE has configured the size and color of the words in the WordCloud to be based on the data fields present in the spreadsheet data. When this information was not available from the Duffle when the WordCloud component first rendered, the result was words without size or color variation, but now that the Duffle has access to this information, the words are now sized based on the values in the second column of the spreadsheet shown in FIG. 28 and colored based on the values in the third column. The state of the WordCloud in this figure is important because it represents a single CAF Component displaying the synthesized result of two CAF Remote Data Components. The content of the WordCloud, the words themselves, are being determined by the results of a query from one data source in one domain, but the size and color of the words are being determined by data that is the result of a query from another data source located in a different domain. This fairly simple looking output is actually the result of a large number of aspects of the CAF working together to make such data-driven visualization possible.

Figure 40:
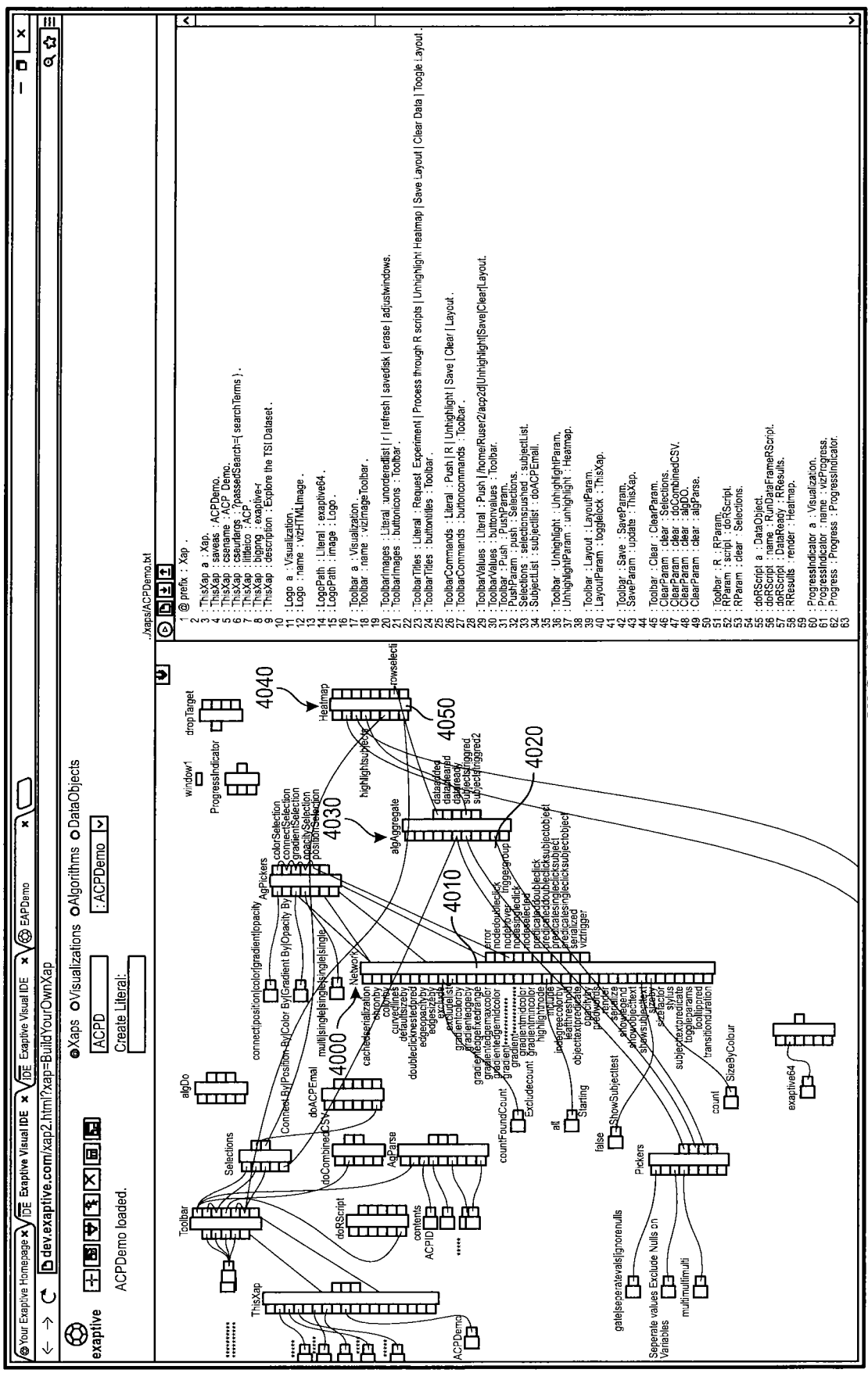
FIG. 40 shows the user-interface perspective on a different, completed CAF application blueprint and highlights the interconnected data visualizations, facilitated by the semantic data bridge.

The previous figure (FIG. 39) showed a single visual CAF Component being driven by multiple CAF Remote Data Object Components. It is also possible to use the CAF to build CAF Applications in which a single data source is bound, in different ways, to different CAF Visual Components. FIG. 40 shows the RIDE being used to create a DataFlow Definition in which an OutEvent (4010) of a Network Diagram component (4000) is linked (4020), through another CAF Component (4030), to an InEvent (4050) of a Heatmap component (4040). The resulting End-User interaction that is made possible as a result of this sort of CAF DataFlow wiring is shown in the following figure.

Figure 41:
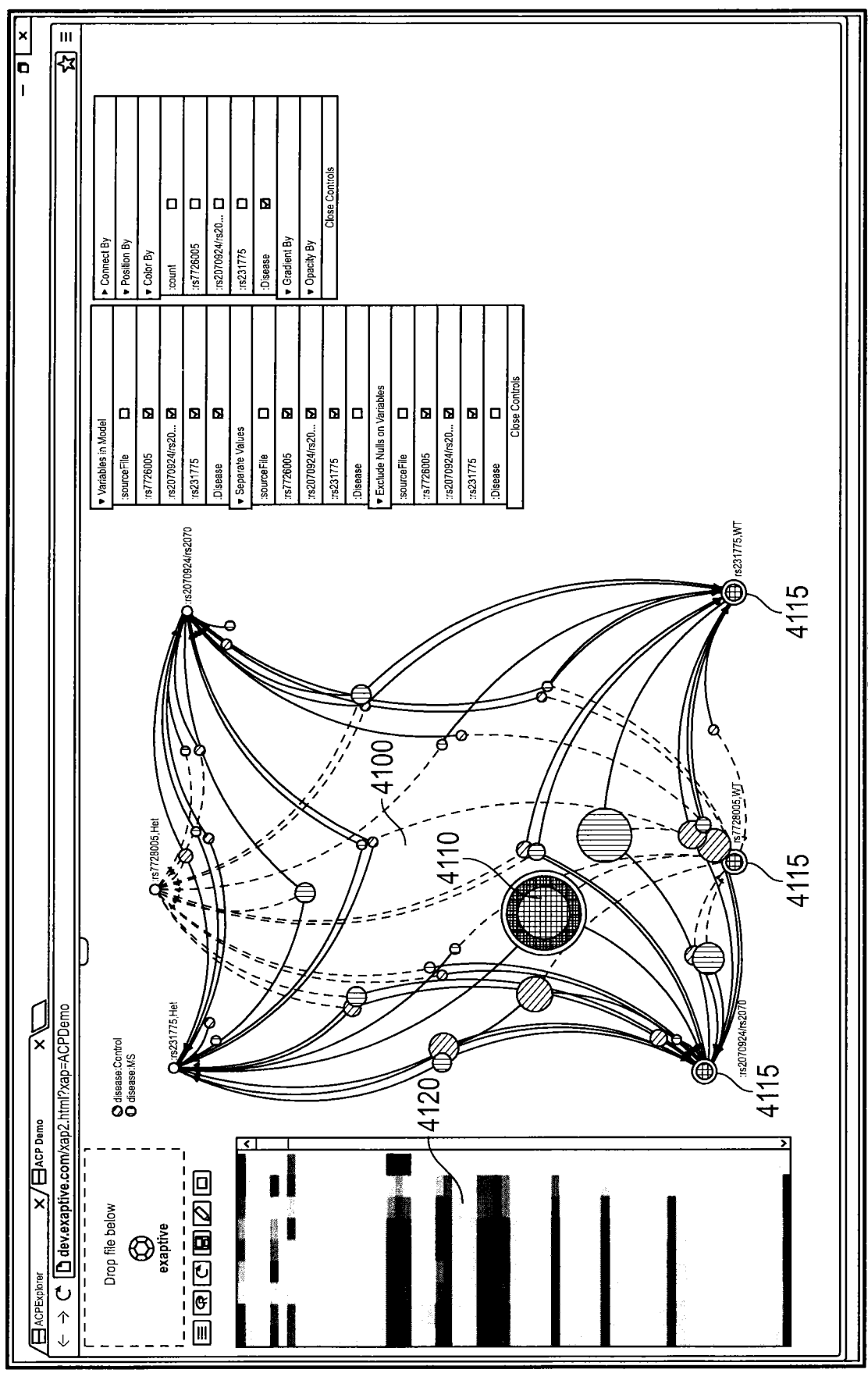
FIG. 41 shows the user-interface perspective on the initalized application from FIG. 40 and highlights the ways in which the visualizations are connected to interact.

FIG. 41 shows the End-User Application that is produced from the Blueprint created by the RIDE construction in FIG. 40. When an End-User hovers over a node (4110) in the Network Diagram (4100), not only are the linked nodes in the diagram highlighted (4115), but the corresponding rows in the Heatmap Component are highlighted also (4120). What is important about this sort of Component-to-Component interaction is that the invention of the CAF allows for this sort of complex End-User interactivity to occur between components that were developed independently, consuming data from sources that were also leveraged by developers independent from the visual component developers, and in accordance with DataFlow rules for interaction created by a Designer independently from all of the others. The console shown in this figure, which was used to analyze real data about Multiple Sclerosis patients, from a plurality of sources, with a plurality of visualizations and algorithms bound to semantically normalized data, is a good example of the type of complex End-User Application that the Combinatorial Application Framework makes possible.

The embodiments of the invention described above are intended to be merely exemplary; numerous variations and modifications will be apparent to those skilled in the art. All such variations and modifications are intended to be within the scope of the present invention as defined in any appended claims.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

What is claimed is:

1. A computer-implemented schema-independent method of modeling data from a plurality of diverse sources, the method comprising:
   transmitting by a first server, having a first domain, to a client computer accessing the first domain, a blueprint comprising a dataflow definition and a component definition of a component-based application, the dataflow definition being a specific set of event-to-function mappings that describes a communication pattern between components wherein the components are created in different programming languages, and the component definition defining particular components and event types for the particular components, code functions for handling events, and initialization codes for the particular components, wherein the blueprint is used for visualizing and interacting with the data of the definitions on the client computer;
   responsive to a data fetch message from the application running on the client computer:
      receiving, by the first server, data from a selected one of a plurality of external domains different from and outside control of the first domain and accessible by the first server wherein the first server includes communicating with the selected one of the plurality of external domains accessible by the first server by a bi-directional extensible semantic data bridge component, the received data having a first native format;
      transforming, by the bi-directional extensible semantic data bridge component of the first server, the received data from the first native format into a graph format having nodes and edges by passing the transformed data to a remote data object component for the selected one of the plurality of external domains, wherein the remote data object component comprises a statement to convert the received data from the first native format into the graph format; and
      storing, by the first server, the transformed data as a first data set into a server semantic database, wherein the server semantic database stores a plurality of graphs, including the graph format of the first data set in combination with a second graph format for transformed native data sourced from a different one of the plurality of external domains that has also been transformed from a second native format; and
   displaying the first data set in the graph format on the client computer for visualization by the application as defined by the blueprint.

2. The computer-implemented schema-independent method of claim 1 further comprising, responsive to a data post message from the application running on the client computer, wherein transmitting, by the bi-directional extensible semantic data bridge component of the first server, a second data to the selected one of the plurality of external domains different from and outside control of the first domain and accessible by the first server.

3. The computer-implemented schema-independent method of claim 1 further comprising, prior to transforming, by the first server, the received data from the first native format into the graph format, loading, by the first server, the remote data object component for the selected one of the plurality of external domains.

4. A non-transitory computer readable medium storing computer instructions that when executed by a processor cause the processor to:
   transmit by a first server, having a first domain, to a client computer accessing the first domain, a blueprint comprising a dataflow definition and a component definition of a component-based application, the dataflow definition being a specific set of event-to-function mappings that describes a communication pattern between components wherein the components are created in different programming languages, and the component definition defining particular components and event types for the particular components, code functions for handling events, and initialization codes for the particular components, wherein the blueprint is used for visualizing and interacting with the data of the definitions on the client computer;
   responsive to a data fetch message from the application running on the client computer:
      receive, by the first server, data from a selected one of a plurality of external domains different from and outside control of the first domain and accessible by the first server wherein the first server includes communicating with the selected one of the plurality of external domains accessible by the first server by a bi-directional extensible semantic data bridge component, the received data having a first native format;

transform, by the bi-directional extensible semantic data bridge component of the first server, the received data from the first native format into a graph format having nodes and edges by passing the transformed data to a remote data object component for the selected one of the plurality of external domains, wherein the remote data object component comprises a statement to convert the received data from the first native format into the graph format; and store, by the first server, the transformed data as a first data set into a server semantic database, wherein the server semantic database stores a plurality of graphs, including the graph format of the first data set in combination with a second graph format for transformed native data sourced from a different one of the plurality of external domains that has also been transformed from a second native format; and displaying the first data set in the graph format on the client computer for visualization by the application as defined by the blueprint.

5. The non-transitory computer readable medium of claim 4 further comprising, responsive to a data post message from the application running on the client computer, wherein transmitting, by the bi-directional extensible semantic data bridge component of the first server, a second data to the selected one of the plurality of external domains different from and outside control of the first domain and accessible by the first server.

6. The non-transitory computer readable medium of claim 4 further comprising, prior to transforming, by the first server, the received data from the first native format into the graph format, loading, by the first server, the remote data object component for the selected one of the plurality of external domains.

* * * * *